United States Patent [19]
Iwasaki

[11] Patent Number: 5,944,763
[45] Date of Patent: Aug. 31, 1999

[54] CONTROL APPARATUS AND METHOD FOR VEHICULAR SUSPENSION SYSTEM

[75] Inventor: Katsuya Iwasaki, Atsugi, Japan

[73] Assignee: Unisia Jecs Corporation, Atsugi, Japan

[21] Appl. No.: 08/718,981

[22] Filed: Sep. 26, 1996

[30] Foreign Application Priority Data

| Oct. 4, 1995 | [JP] | Japan | ...................................... 7-257832 |
| Oct. 17, 1995 | [JP] | Japan | ...................................... 7-268599 |
| Oct. 18, 1995 | [JP] | Japan | ...................................... 7-270202 |
| Nov. 27, 1995 | [JP] | Japan | ...................................... 7-307595 |

[51] Int. Cl.$^6$ ............................................... B60G 17/015
[52] U.S. Cl. ............................................ 701/37; 280/5.5
[58] Field of Search ................................ 701/37, 38, 124; 280/707, 5.507, 5.5, 5.504; 340/440

[56] References Cited

U.S. PATENT DOCUMENTS

| 5,072,965 | 12/1991 | Wada et al. ............................... 280/707 |
| 5,088,760 | 2/1992 | Kakizaki et al. ........................ 280/707 |
| 5,136,513 | 8/1992 | Sol et al. .................................. 364/463 |
| 5,189,615 | 2/1993 | Rubel et al. ......................... 364/424.05 |
| 5,510,985 | 4/1996 | Yamaoka et al. ................... 364/424.05 |
| 5,526,262 | 6/1996 | Kimura et al. ...................... 364/424.05 |
| 5,556,115 | 9/1996 | Heyring ................................. 280/6.12 |

FOREIGN PATENT DOCUMENTS

| 40 17 421 | 12/1990 | Germany . |
| 43 33 347 | 6/1994 | Germany . |
| 44 36 441 | 4/1995 | Germany . |
| 60-9716 | 1/1985 | Rep. of Korea . |

Primary Examiner—Michael Zanelli
Attorney, Agent, or Firm—Foley & Lardner

[57] ABSTRACT

In an apparatus and method for a vehicular system, a control gain of a control signal to be outputted to the vehicular system is varied when a change in a weight of load applied to a vehicle body between an originally designed weight of load applied to a vehicle body and a present weight of load applied to the vehicle body occurs. The change in the weight of load applied to the vehicle body is determined according to a load mounted state determination signal $R_M$ which is derived on the basis of a front road wheel side vertical status variable and a rear road wheel side vertical status variable.

39 Claims, 34 Drawing Sheets

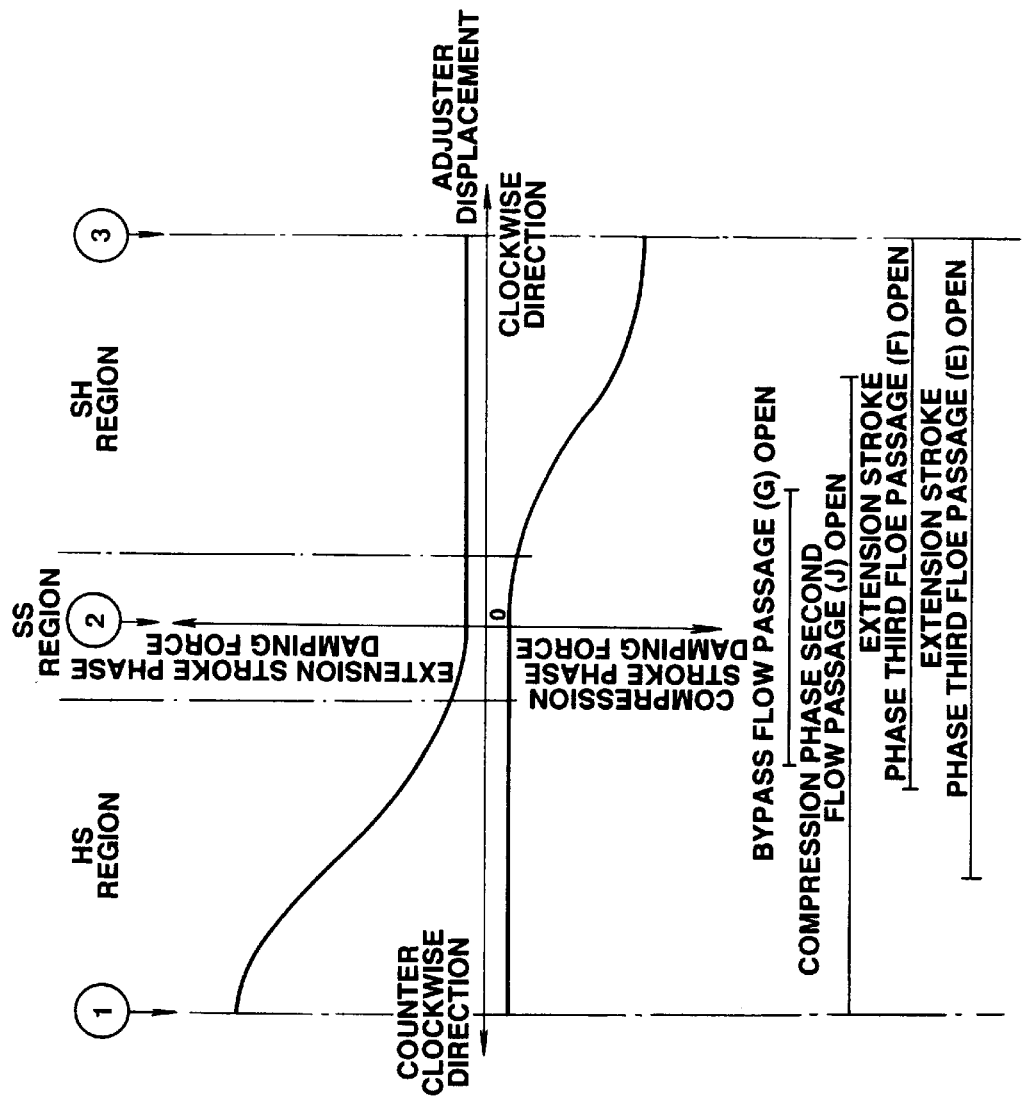

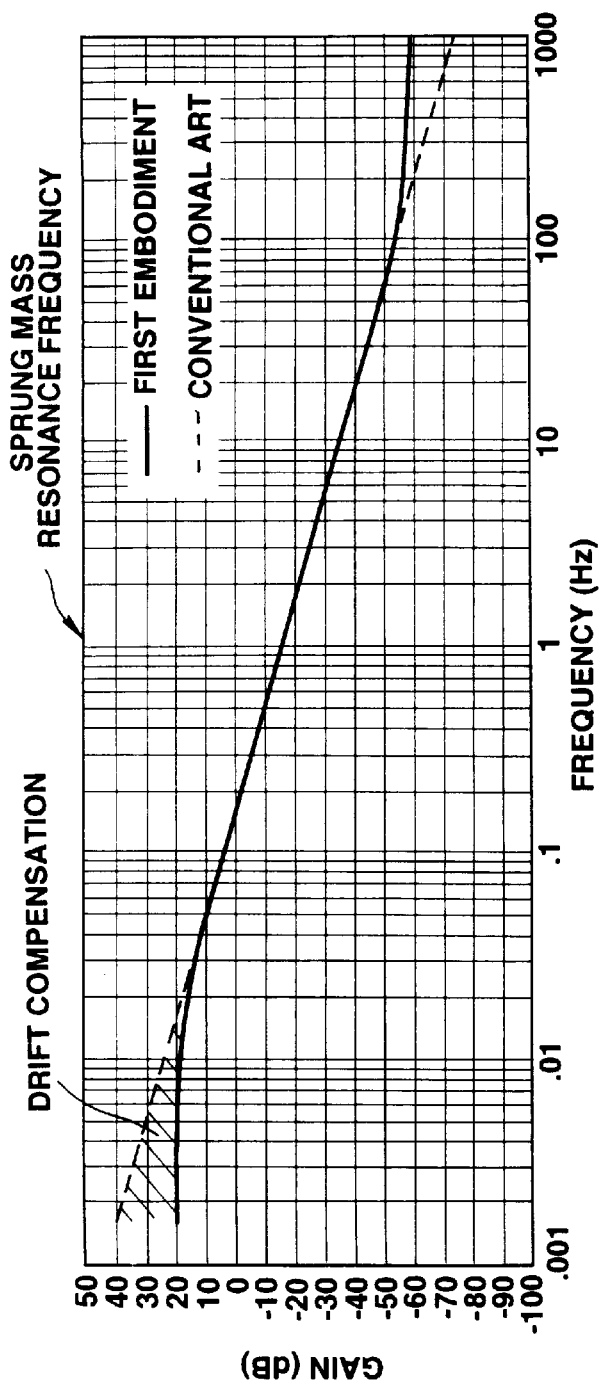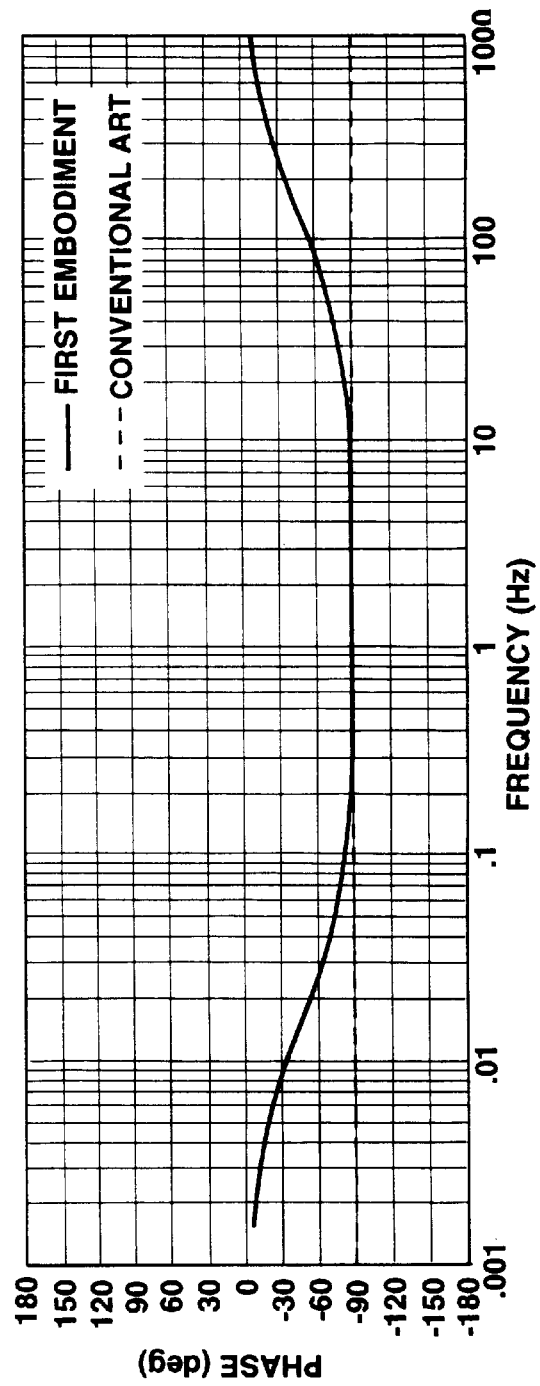
FIG.14A
FIG.14B

FIG.18
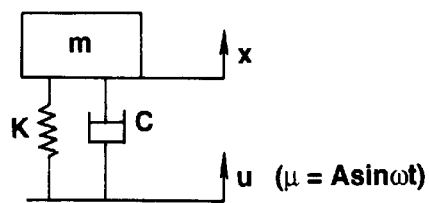
FIG.20A
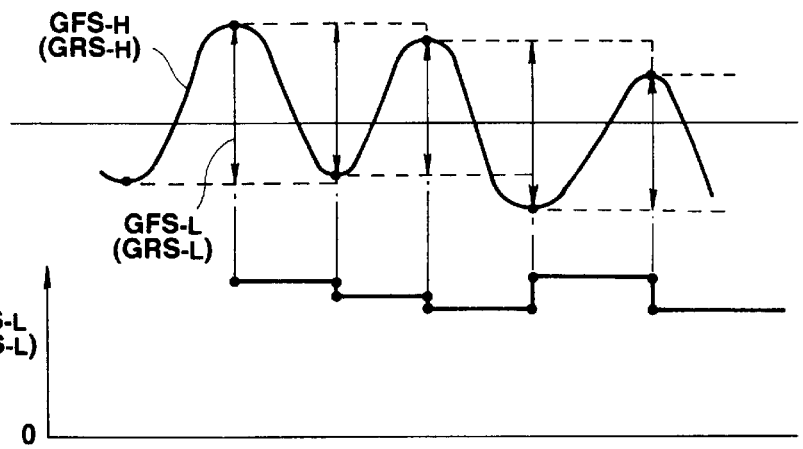
FIG.20B

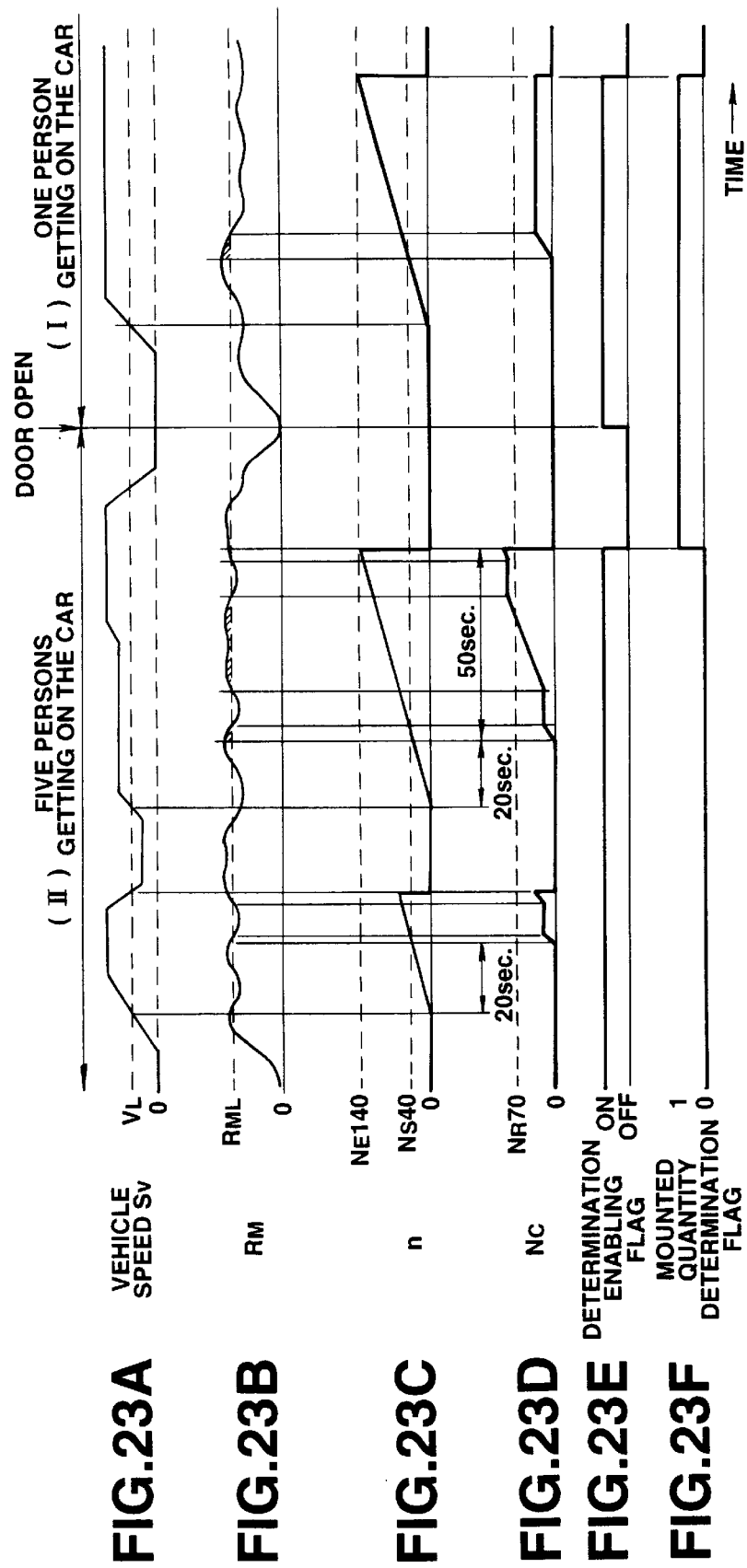

FIG.32A
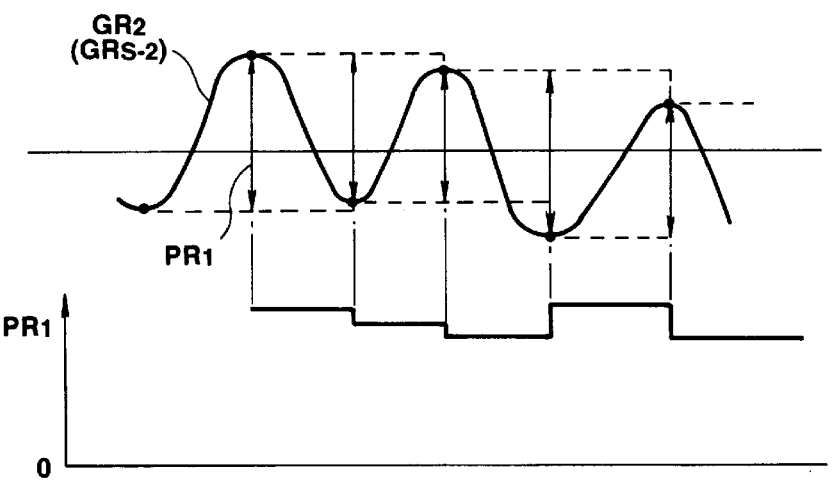
FIG.32B
FIG.33A
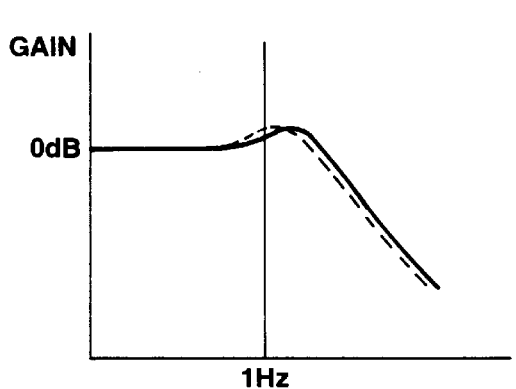
FIG.33B
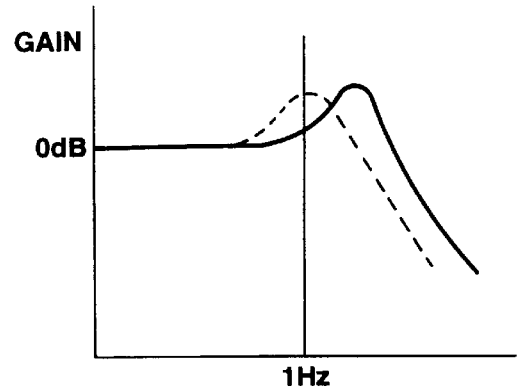

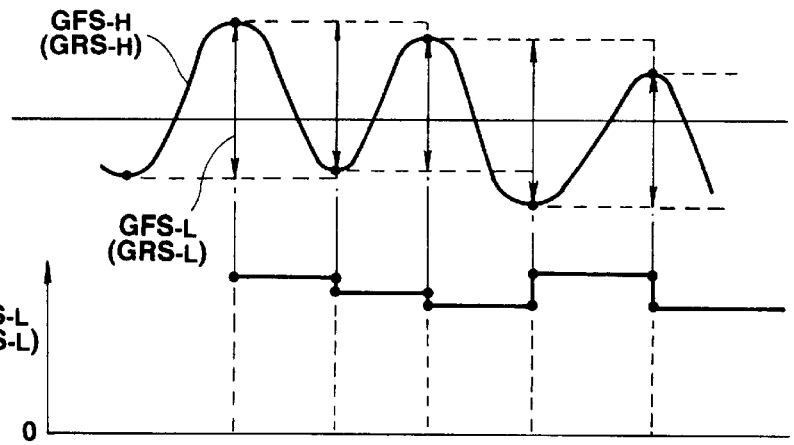
FIG.44A
FIG.44B
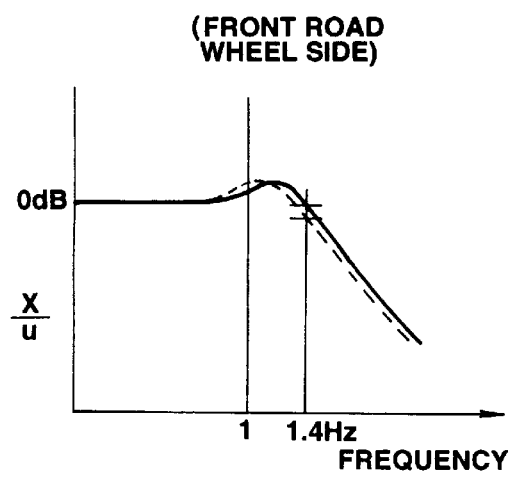
FIG.45A
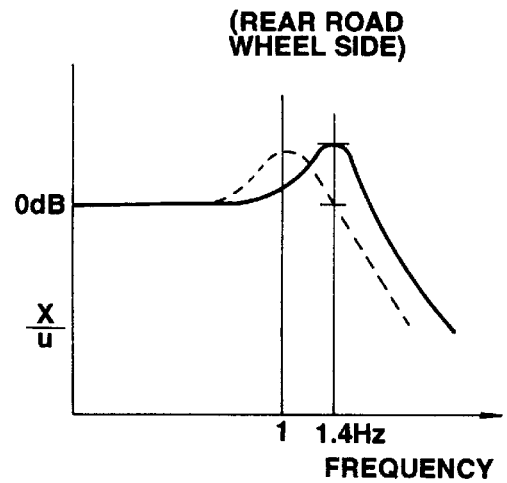
FIG.45B

CONTROL APPARATUS AND METHOD FOR VEHICULAR SUSPENSION SYSTEM

BACKGROUND OF THE INVENTION

1. Field of the Invention

The present invention relates to control apparatus and method for optimally controlling a damping force characteristic of a suspension system of an automotive vehicle, the suspension system having four shock absorbers, each shock absorber being interposed between an sprung mass of the vehicle body and an unsprung mass of a corresponding one of front left and right and rear left and right road wheels.

2. Description of Background Art

A PCT Japanese Patent Application First Publication No. Heisei 4-500490 having an international publication No. W091/00187 exemplifies a previously proposed semi-active suspension system for controlling a damping force of each shock absorber interposed between a sprung mass of a vehicle body and an unsprung mass of a corresponding one of front left and right road wheels and rear left and right road wheels.

In the disclosed semi-active suspension system, a dynamic vehicular running state is detected by means of a sensor, a control signal which is used to control the damping force of each semi-active shock absorber mounted along each road wheel of the vehicle is formed on the basis of the sensed dynamic vehicular running state, and a vehicular body behavior is controlled in accordance with the control signal value and actual damping force exerted from each of the semi-active shock absorber.

However, the disclosed suspension system is not designed to take a change in a weight of load applied to a vehicle body from an originally designed weight of load to the present weight of load applied to the vehicle body into the consideration of the control of the damping force of at least one of the semi-active shock absorbers.

Although it is possible to detect a change in the weight of load applied to the vehicle body according to a change in a vehicular height by using a vehicular height sensor, the use of the vehicular height sensor brings out an increase of cost manufacturing the vehicular semi-active suspension system.

SUMMARY OF THE INVENTION

It is an object of the present invention to provide control apparatus and method for a vehicular suspension system, the suspension system having a plurality of shock absorbers, each of the shock absorbers being interposed between a sprung mass of a vehicle body and an unsprung mass of a corresponding one of front and rear left and right road wheels, which can achieve a simpler and less expensive construction of the control apparatus without installation of vehicular height sensors and which improves a vehicular comfort and a steering stability with a change in a weight of load applied to the vehicle body taken into consideration.

According to one aspect of the present invention, there is provided with a control apparatus for a vehicular suspension system, said vehicular suspension system having a plurality of shock absorbers, each shock absorber being interposed between a sprung mass of a vehicle body and an unsprung mass of a corresponding one of front left and right road wheels and rear left and right road wheels, said control apparatus comprising:

a plurality of actuators, each actuator being connected to a corresponding one of damping force characteristic adjusters provided within said shock absorbers and being responsive to a control signal to actuate said corresponding adjuster to be rotated through a rotational angular position so that a damping position exhibiting a damping force characteristic of the corresponding one of said shock absorbers is adjusted to a target damping position exhibiting a target damping force characteristic according to a magnitude and a direction of the control signal inputted thereto;

a plurality of sensors, each sensor being located at a corresponding one of the front left and right road wheels and rear left and right road wheels and arranged for detecting a vertical status variable of the vehicle; and a control unit arranged for generating and outputting the control signal to each of the actuators on the basis of the detected vertical status variables of said sensors, the improvement wherein said control unit determines whether a change in weight of load applied to the vehicle body as the sprung mass between an originally designed vehicular weight and the present vehicular weight occurs according to the vertical status variables detected by at least two sensors located at the front and rear road wheels and determines the control signal to be outputted to the corresponding one of said actuators and having a parameter determining the control signal whose value is varied when determining that the change in weight of load applied to the vehicle body occurs.

According to another aspect of the present invention, there is provided with a control method for a vehicular suspension system, said vehicular suspension system having a plurality of shock absorbers; each shock absorber being interposed between a sprung mass of a vehicle body and an unsprung mass of a corresponding one of front left and right road wheels and rear left and right road wheels, said control method comprising the steps of:

detecting a vertical status variable of the vehicle at a portion of the vehicle located at one of the front left and right road wheels and the rear left and right road wheels;

generating and outputting a control signal to each of actuators connected to the corresponding one of the shock absorbers to actuate an adjuster to be rotated on the basis of the detected vertical status variable so that a damping position exhibiting a damping force characteristic is adjusted to a target damping position exhibiting a target damping force characteristic according to a magnitude and direction of the control signal;

determining whether a change in a weight of load applied to a vehicle body occurs between an originally designed vehicular weight and a present vehicular weight according to the vertical status variables detected by at least two vertical sprung mass acceleration sensors located at the front and rear road wheels; and changing a control parameter determining the control signal according to a determination result of the change in the weight of load applied to the vehicle body.

BRIEF DESCRIPTION OF THE DRAWINGS

FIG. 6 is a damping coefficient characteristic graph representing damping force control regions corresponding to stepped positions of an adjuster installed in the representative shock absorber SA, the adjuster being associated with a stepping motor and being pivoted (rotated) according to a stepwise rotation of the representative stepping motor shown in FIGS. 2 and 3.

FIGS. 14A and 14B are semi-logarhythmic graphs of gain characteristic and phase characteristic of the sprung mass vertical velocity signal extracted from the signal processing circuit in the first embodiment shown in FIG. 13.

FIG. 18 is a model view for one road wheel of the vehicle for explaining a derivation of a transfer function from each sprung mass vertical acceleration to a corresponding one of relative velocities between a sprung mass and an unsprung mass.

FIGS. 20A and 20B are explanatory graphs for explaining the derivation of low pass filtered signal components ($G_{RS-M}$ and $G_{FS-L}$).

FIGS. 23A, 23B, 23C, 23D, 23E, and 23F are timing charts for explaining the switching control operation of the damping force characteristic (control gain) based on the variation in the weight of load applied to the vehicle body in the first embodiment.

FIGS. 32A and 32B are explanatory waveform charts for explaining a derivation of a low pass filtered signal component $PR_1$ in the circuit E3 of FIG. 30.

FIGS. 33A and 33B are characteristics of gains of the sprung mass transmissibilities at the portions of the vehicle body at which the front left or right road wheel is mounted and at which the rear left or right road wheel is mounted.

FIGS. 44A and 44B are characteristic graphs of the low pass filtered signal components ($GF_{s-L}$ and $GR_{s-L}$) used in the tenth embodiment.

FIGS. 45A and 45B are characteristic graphs of the front road wheel side and rear road wheel side sprung mass transmissibilities for explaining dead frequencies.

BEST MODE CARRYING OUT THE INVENTION

Reference will hereinafter be made to the drawings in order to facilitate a better understanding of the present invention.

First Embodiment

Figure 1:
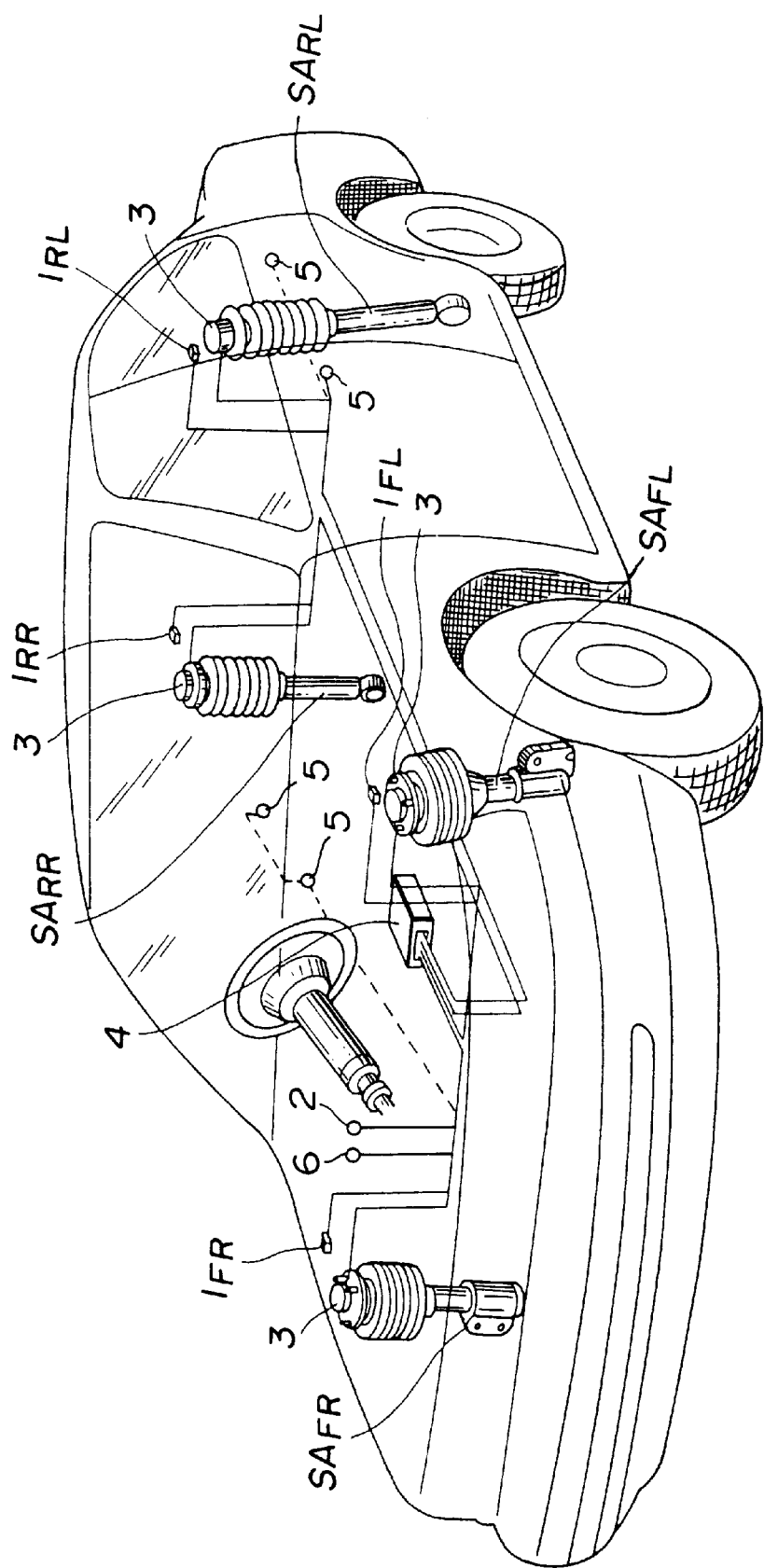
FIG. 1 is an explanatory view of an arrangement of a control apparatus for a vehicular suspension system in a first preferred embodiment according to the present invention.
Figure 2:
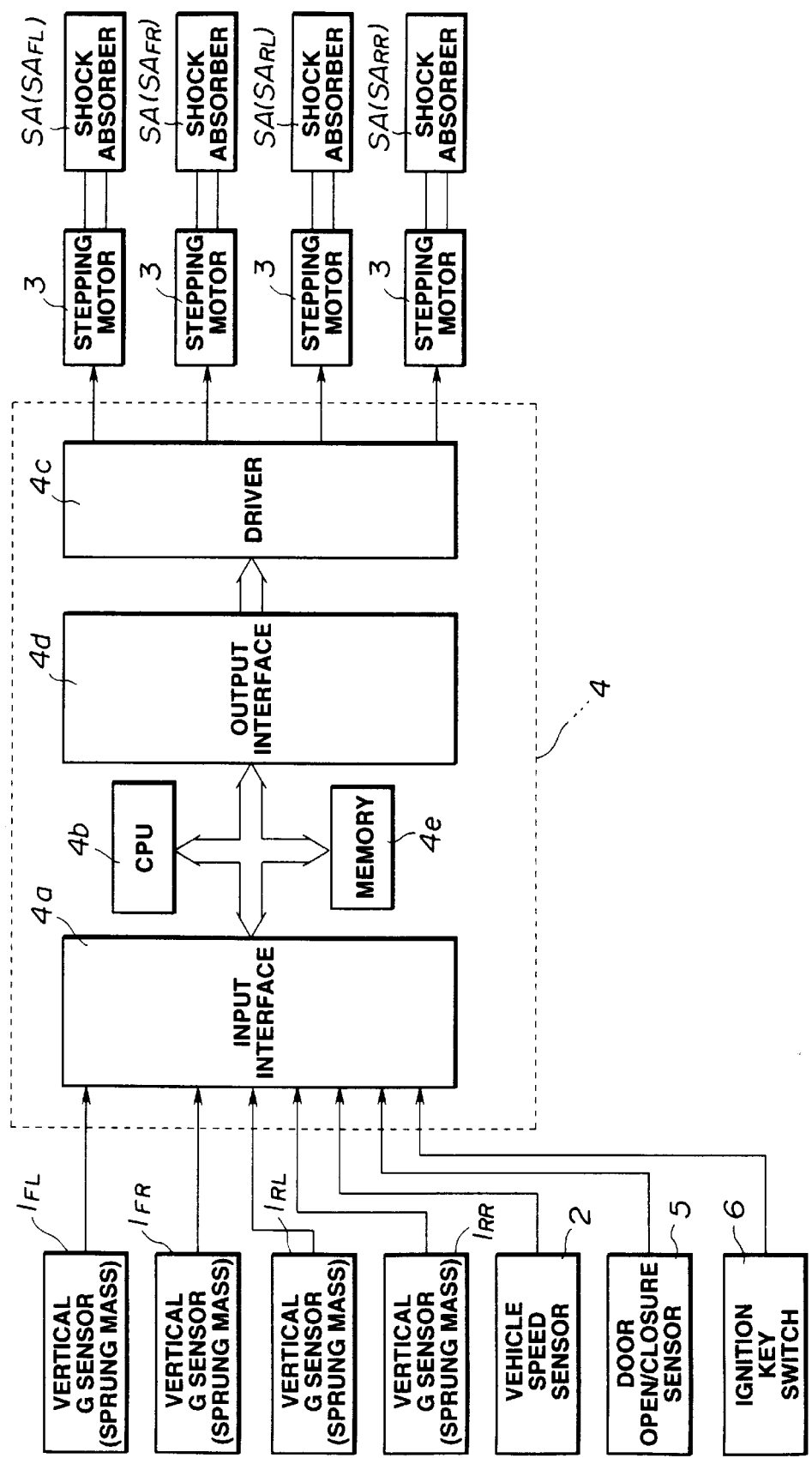
FIG. 2 is a circuit block diagram of a control unit and its peripheral circuits of the control apparatus for the vehicular suspension system shown in FIG. 1.

FIGS. 1 and 2 show a whole system configuration of a vehicular suspension system to which a control apparatus in a first preferred embodiment according to the present invention is applicable.

Four shock absorbers $SA_{FL}$, $SA_{FR}$, $SA_{RL}$, and $SA_{RR}$ (it is noted that subscripts FL denotes a front left road wheel side (position), FR denotes a front right road wheel side (position), RL denotes a rear left road wheel side (position), RR denotes a rear right road wheel side (position), and a representative shock absorber is simply denoted by SA since all shock absorbers (having the mutually same structures) are interposed between given parts of a vehicular body (sprung mass) and respective road (tire) wheels (unsprung mass). The road wheels comprise front left road wheel, front right road wheel, rear left road wheel, and rear right road wheel of the vehicle. It is noted that the above-described given parts of the vehicular body indicate front left and right road wheel positions and rear left and right road wheel positions.

As shown in FIG. 1, four vertical (,i.e., upward and downward) sprung mass acceleration (G, G; gravity) sensors $1_{FL}$, $1_{FL}$, $1_{FR}$, $1_{RR}$ are attached onto given parts (also called, tower positions) of the vehicular body adjacent to the front left and right road wheel side shock absorbers SA (namely, $SA_{FL}$, $SA_{FR}$, $SA_{RL}$ and $SA_{RR}$), each being provided to detect a vertical sprung mass acceleration acted upon the sprung mass (vehicle body). A vehicle speed sensor 2 is provided which detects a vehicle speed (Sv) of the vehicle.

A control unit 4 is installed at a given part (generally below a driver's seat of the passenger compartment) of the vehicle to receive signals derived from the four vertical acceleration sensors $1_{FR}$, $1_{FL}$, $1_{RR}$, and $1_{RL}$, from the vehicle speed sensor 2, from a door open/closure sensor 5, and from an ignition key switch 6, processes these signals, and outputs finally drive (control) signals to respective actuators (,i.e., stepping motors 3) for the respective four shock absorbers SA ($SA_{FR}$, $SA_{FL}$, $SA_{RL}$, and $SA_{RR}$).

Referring to FIGS. 1 and 2, the control unit 4 is installed on a portion of the vehicular body near to the driver's seat. The control unit 4 includes: an input interface circuit 4a; a CPU (Central Processing Unit) 4b; a memory 4e having a ROM (Read Only Memory) and a RAM (Random Access Memory); an output interface 4d, and an actuator driver circuit 4c; and a common bus.

It is noted that, in the first embodiment, no stroke sensor used to determine a relative velocity between the sprung mass and the unsprung mass at any of the front and rear road wheel positions is used.

The control unit 4 is provided with the driver 4c connected between the output interface 4d and the stepping motors 3.

Figure 13:
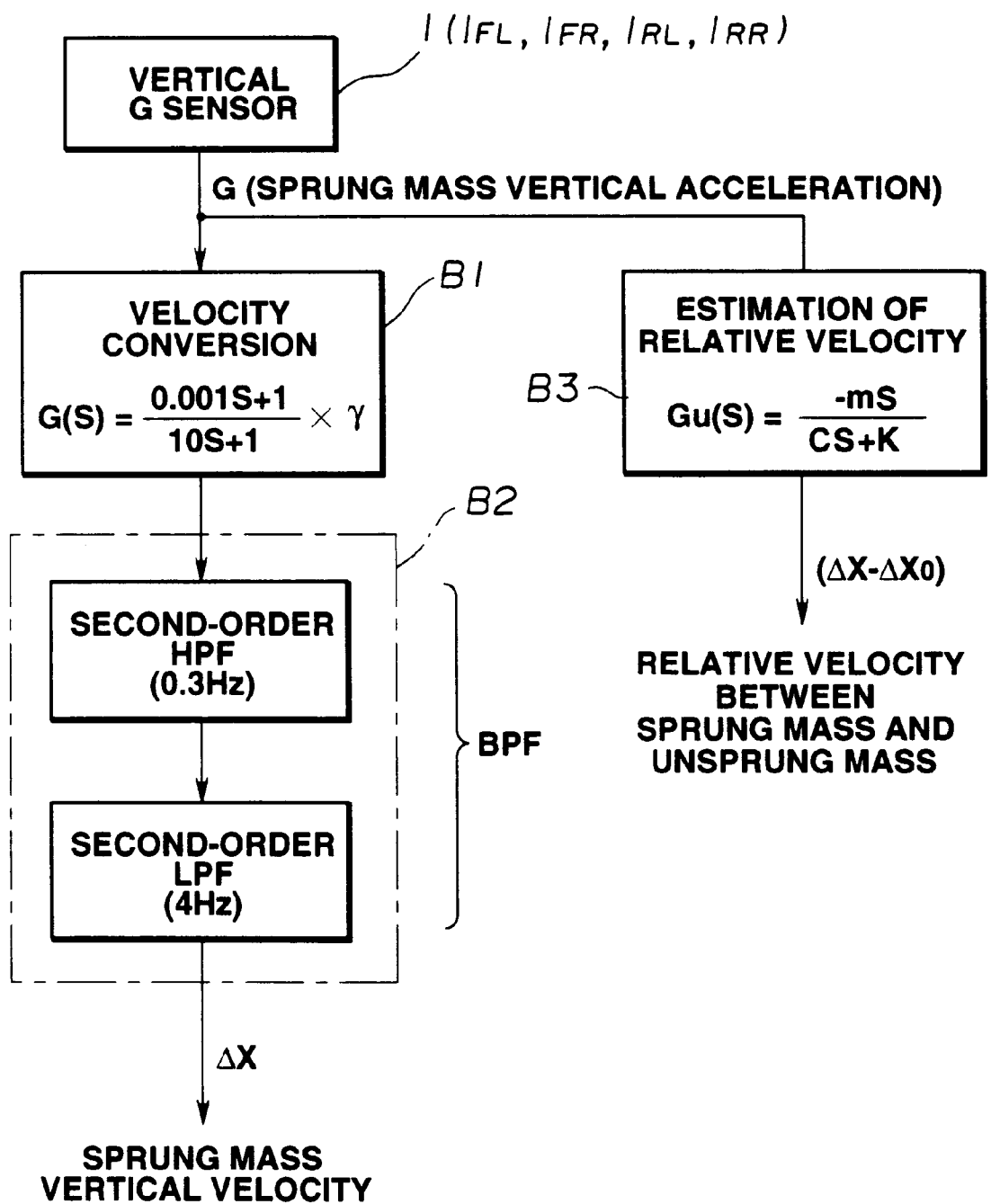
FIG. 13 is a circuit block diagram of a signal processing circuit in a control unit of the control apparatus for the vehicular suspension system in the first embodiment according to the present invention shown in FIG. 1 used to derive a sprung mass vertical velocity and to derive a relative velocity between a sprung mass and an unsprung mass.

The control unit 4 shown in FIG. 2 is provided with a signal processing circuit in terms of its hardware structure as shown in FIG. 13. The signal processing circuit derives each control signal V (including each target damping force characteristic position P) used to perform a damping force characteristic control for each shock absorber SA. The explanation of FIG. 13 will be described later.

Figure 3:
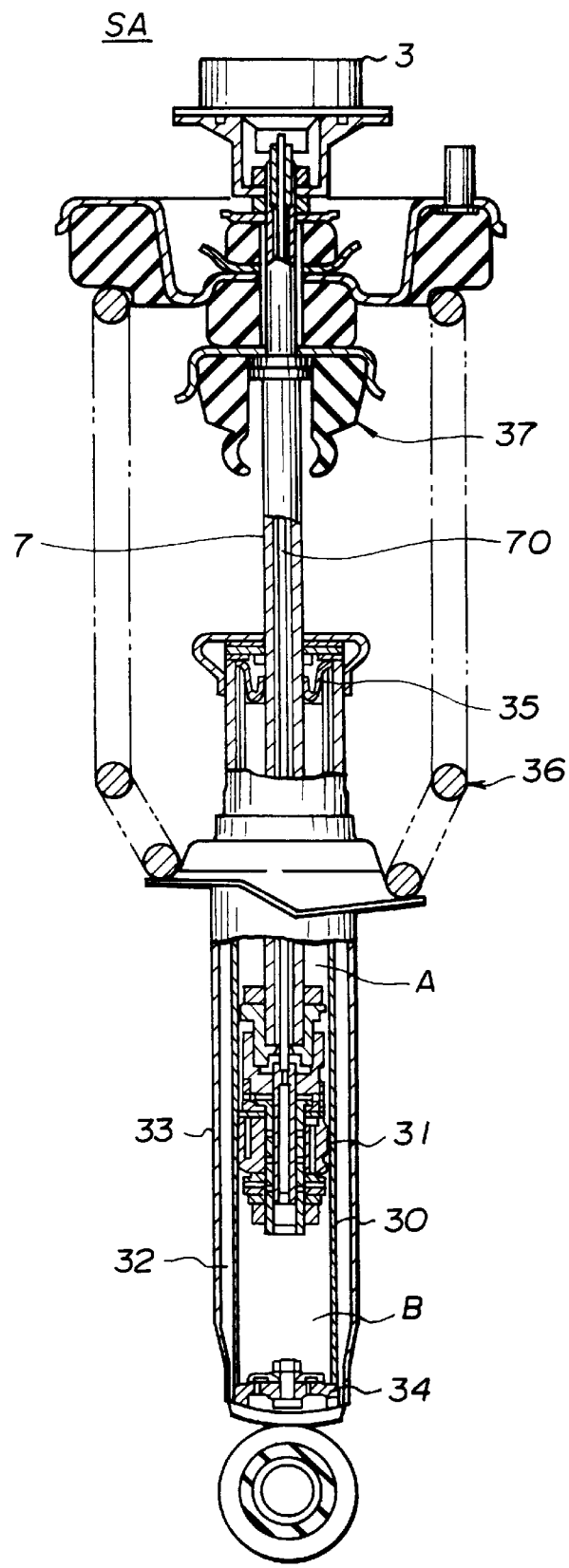
FIG. 3 is a partially sectional view of each shock absorber SA used in the first embodiment shown in FIGS. 1 and 2.

Next, FIG. 3 show a cross sectional view of each shock absorber SA shown in FIGS. 1 and 2.

The shock absorber SA, as shown in FIG. 3, includes: a cylinder 30, a (movable) piston 31 defining an upper portion chamber A and a lower portion chamber B; an outer envelope 33 in which a reservoir chamber 32 is formed on an outer peripheral end of the cylinder 30; a base 34 which defines the lower portion chamber B and the reservoir chamber 32; a guide member 35 which guides a sliding motion of a piston rod 7 with the other end of which the movable piston 31 is linked; a suspension spring 36 interposed between the outer envelope 33 and vehicle body; and a bumper rubber 37.

Each stepping motor 3 shown in FIGS. 1 and 2 is installed in an upper position of the corresponding one of the shock absorbers SA, as shown in FIG. 3, so as to operatively rotate an adjuster 40 (refer to FIG. 4) via a control rod 70 in response to a rotation drive signal from the corresponding one of the actuator drivers (circuits) 4c. A rotating shaft of the corresponding one of the stepping motors 3 is mechanically connected to the corresponding adjuster 40 within each shock absorbers SA via the control rod 70.

Figure 4:
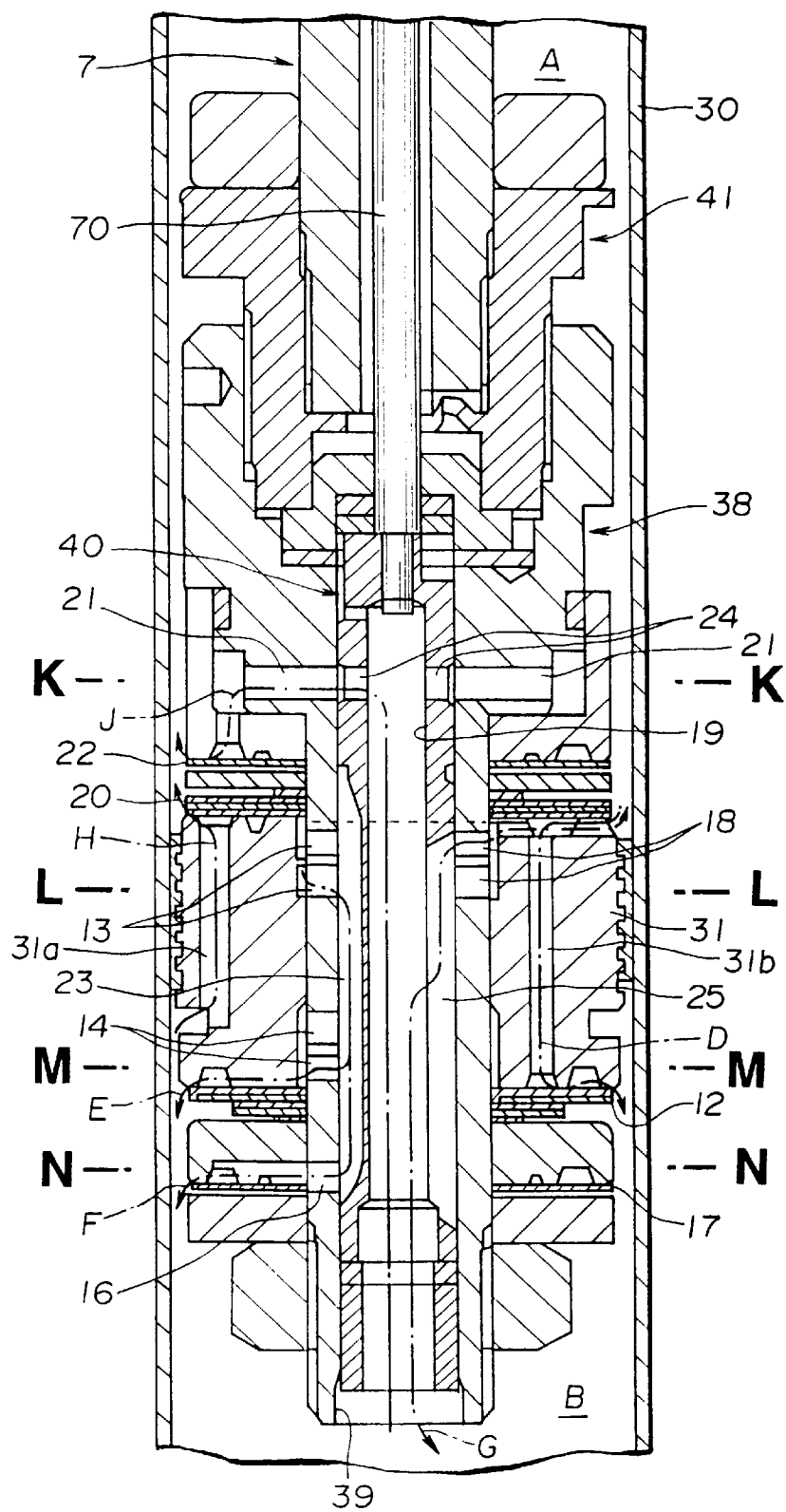
FIG. 4 is an enlarged, partially sectional view of the representative shock absorber SA shown in FIG. 3.

FIG. 4 shows an enlarged cross sectional view representing a part of the piston assembly 31 and its surrounding part of each of the shock absorbers SA.

As shown in FIG. 4, the piston 31 is formed with penetrating holes 31a and 31b therethrough. In addition, the piston 31 is provided with a compression phase attenuation valve 20 and an extension phase attenuating valve 12, both of the valves 20, 12 respectively opening and closing the respective penetrating holes 31a and 31b. A stud 38 is spirally meshed with and fixed to a bound stopper 41 spirally meshed with and fixed to a tip end of the piston rod 7.

The stud 38 is penetrated through the piston 31. In addition, the stud 38 is formed with a communication hole 39 so as to communicate the upper portion chamber A and the lower portion chamber B, the communication hole 39 forming flow passages (an extension phase second flow passage E, extension phase third flow passage F, bypass flow passage G, and compression phase second flow passage J as will be described later). Then, the adjuster 40 which changes flow passage cross sectional areas of the above-described flow passages is provided within the communication hole 39.

Furthermore, an extension stroke side (phase) check valve 17 and a compression (or contraction) stroke side (compression phase) check valve 22 are also installed on an outer periphery of the stud 38, which enable and disable the fluid flow through the above-described flow passages formed by the communication hole 39 in accordance with a direction of the flow of the fluid. As shown in FIG. 3, the adjuster 40 is rotatable by means of the corresponding one of the actuators (stepping motors) 3 via the control rod 70.

It is noted that the stud 38 is formed with a first port 21, a second port 13, a third port 18, a fourth port 14, and fifth port 16, respectively, in an upper order.

On the other hand, referring to FIG. 4, the adjuster 40 is formed with a hollow portion 19, a first lateral hole 24, and a second lateral hole 25, both lateral holes communicating the internal and external portions of the adjuster 40. A longitudinal groove 23 is formed on an outer peripheral portion. Hence, four flow passages are formed between the upper portion chamber A and lower portion chamber B as the fluid flow passages when the piston stroke indicates the extension phase: that is to say, 1) an extension stroke side (phase) first flow passage D such that the fluid passes the penetrating hole 31b, a valve opened internal side of the extension stroke side (phase) attenuation valve 12, and reaches the lower portion chamber B; 2) an extension stroke side (phase) second flow passage E in which the fluid flows through the second port 13, the longitudinal groove 23, the fourth port 14, a valve opened outer peripheral side of the extension stroke side (phase) attenuation valve 12, and reaches the lower portion chamber B; 3) an extension stroke side (phase) third flow passage F in which the fluid passes through the second port 13, the longitudinal groove 23, and the fifth port 16; and 4) a bypass flow passage G in which the fluid passes through the third port 18, the second lateral hole 25, and the hollow portion 19 and reaches the lower portion chamber B.

In addition, the three fluid flow passages through which the fluid can be caused to flow during the compression stroke side (phase) of the piston 31 include: 1) a compression stroke side (phase) first flow passage H in which the fluid flows through the penetrating hole 31a and valve opened compression stroke side (phase) attenuation valve 20; 2) a compression stroke side (phase) second flow passage J in which the hollow portion 19, the first lateral hole 24, the first port 21, and the opened compression stroke side (phase) check valve 22 and reaches the upper portion chamber A; and 3) the bypass passage G in which the fluid flows through the hollow portion 19, the second lateral hole 25, and the third port 18.

Figure 5:
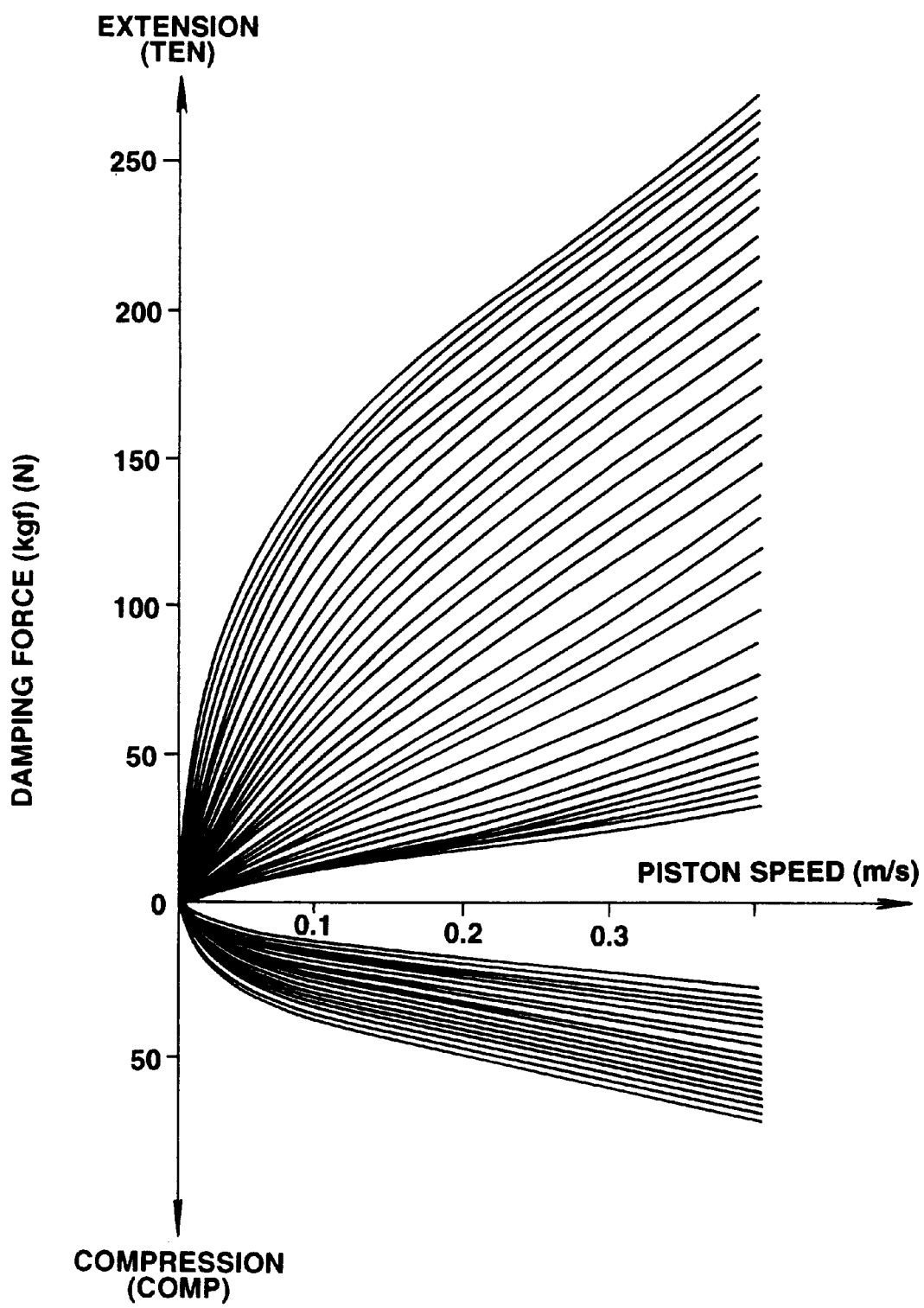
FIG. 5 is a characteristic graph representing damping forces with respect to a piston speed of the representative shock absorber SA shown in FIGS. 3 and 4.

In summary, the shock absorber SA is so arranged and constructed as to be enabled to change the damping force characteristics at a multiple stage in its damping characteristic, as shown in FIG. 5, either in the extension phase or compression phase when the adjuster 40 is pivoted according to the rotation of the corresponding one of the stepping motors 3.

FIG. 6 shows relationships between the rotated position of the adjuster 40 and damping force characteristics at both the extension stroke (phase) and compression phase with respect to the piston 31.

In details, as shown in FIG. 6, when the adjuster 40 is pivoted in a given counterclockwise direction from a generally center position at which both of the extension and compression phases are in soft damping force characteristic positions (hereinafter, referred to as a soft region (soft control mode) SS), the damping force coefficient at the extension stroke side (phase) can be changed at the multiple stage from a maximum hard to a minimum hard characteristic but the compression stroke side is fixed at a soft position (hereinafter, referred to as an extension stroke side (phase) hard region HS). On the contrary, when the adjuster 40 is pivoted in a given clockwise direction therefrom, the damping force coefficient at the compression stroke side (phase) is only changeable to a hard region from the maximum hard to the minimum hard characteristic at the multiple stages and the damping force characteristic at in the compression stroke side is fixed to the soft position (hereinafter, referred to as a compression hard region (compression phase hard) SH).

Figure 7A:
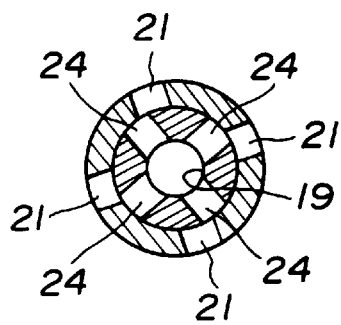
FIGS. 7A, 7B, and 7C are cross sectional views cut away along a line K—K of FIG. 4 representing an essential part of the representative shock absorber shown in FIG. 4.
Figure 7B:
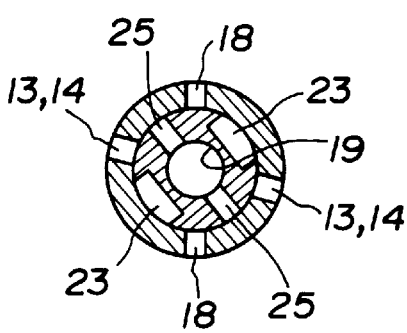
Figure 7C:
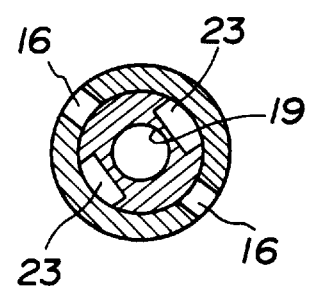
Figure 8A:
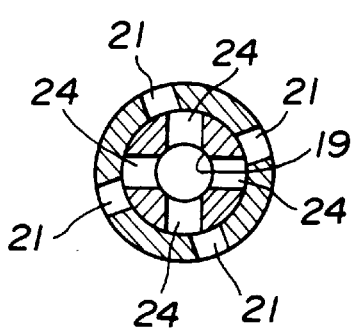
FIGS. 8A, 8B, and 8C are cross sectional views cut away along lines L—L and M—M of FIG. 4 representing an essential part of the representative shock absorber SA shown in FIGS. 3 and 4.
Figure 8B:
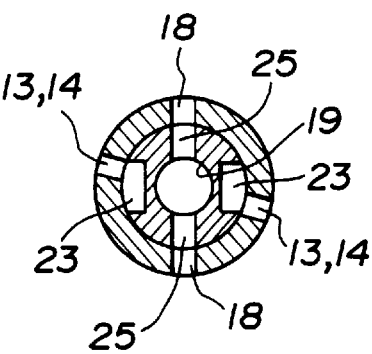
Figure 8C:
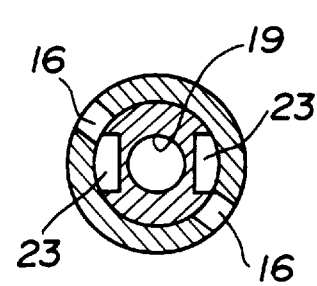
Figure 9A:
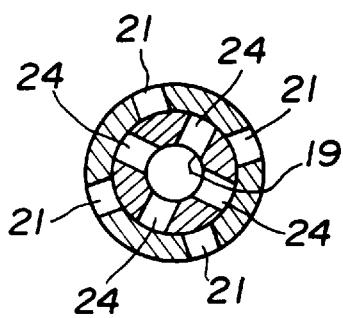
FIGS. 9A, 9B, and 9C are cross sectional views cut away along a line N—N of FIG. 4 representing an essential part of the representative shock absorber shown in FIGS. 3 and 4.
Figure 9B:
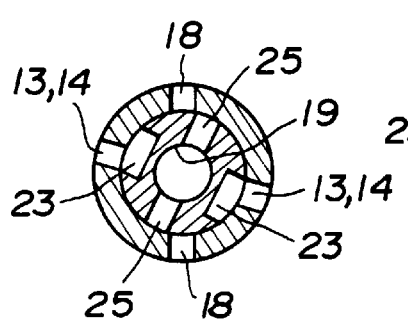
Figure 9C:
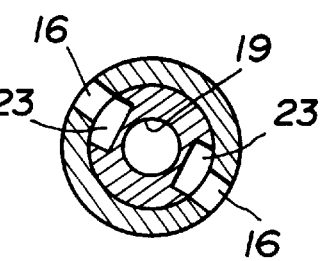

When, as shown in FIG. 6, the adjuster 40 is pivoted at any one of positions ①, ②, and ③, cross sections of the piston assembly portions cut away along lines K—K, L—L, M—M, and N—N of FIG. 4 are respectively shown in FIGS. 7A (①), 7B (②), and 7C (③) (K—K), 8A (①), 8B (②), and 8C (③) (L—L, M—M), 9A (①), 9B (②), and 9C (③) (N—N), respectively.

Figure 10:
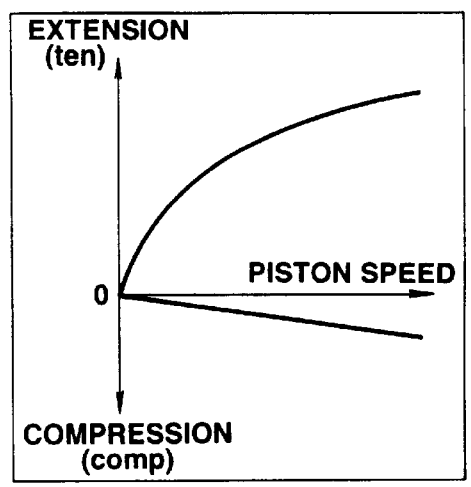
FIG. 10 is a damping force characteristic graph when an extension stroke side (phase) is in a hard (damping force) characteristic with respect to the piston of the representative shock absorber SA shown in FIG. 4 (HS control mode).
Figure 11:
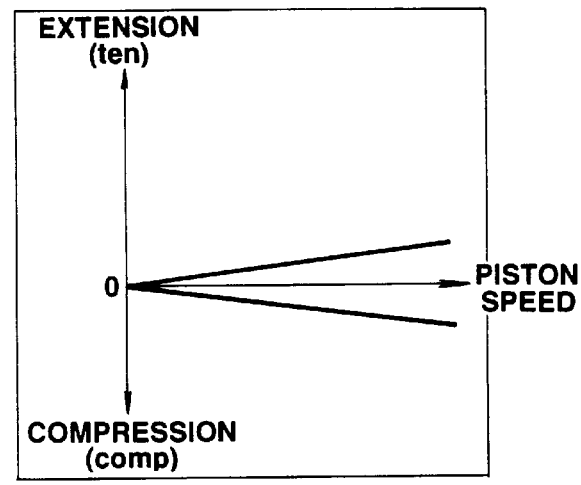
FIG. 11 is a damping force characteristic graph when both extension and compression stroke sides (phases) are in soft damping force states (SS control mode).
Figure 12:
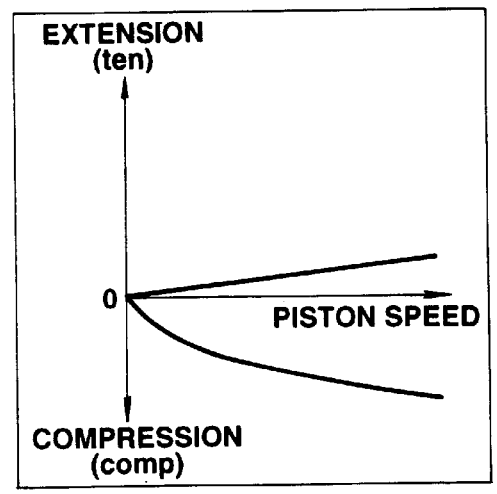
FIG. 12 is a damping force characteristic graph when the compression stroke side (phase) is in a hard damping force state (SH control mode).

The damping force characteristics at the respective positions ①, ②, and ③ shown in FIG. 6 are shown in FIGS. 10, 11, and 12, respectively.

FIG. 10 shows the damping force characteristic of the representative shock absorber SA when the adjuster 40 is positioned at ① of FIG. 6.

FIG. 11 shows that when the adjuster 40 is positioned at ② of FIG. 6.

FIG. 12 shows that when the adjuster 40 is positioned at ③ of FIG. 6.

Next, FIG. 13 shows a signal processing circuit arranged within the control unit 4 for determining each sprung mass vertical velocity ($\Delta x - \Delta x_0$) between the sprung mass and the unsprung mass and each sprung mass vertical velocity ($\Delta x$) from the corresponding one of the vertical acceleration sensors $1_{FR}$ to $1_{RL}$.

At a block B1 shown in FIG. 13, each sprung mass vertical acceleration G ($G_{FL}$, $G_{FR}$, $G_{RL}$, $G_{RR}$) detected by means of each vertical G sensor 1 ($1_{FL}$, $1_{FR}$, $1_{RL}$, and $1_{RR}$) is converted into a corresponding one of sprung mass vertical velocity signals at a corresponding one of four tower positions (front left and right and rear left and right road wheels) using a phase lag compensation equation.

It is noted that, a general formula of the phase lag compensation is expressed in the following transfer equation (1).

$$G_{(S)} = (AS+1)/(BS+1) \quad (1)$$

(A<B)

Thus, in a case of the first embodiment where the following transfer function equation (2) is used as the phase lag compensation equation such as to have the same phase and gain characteristics as an integration (1/S, S: Laplace operator) in a frequency band (0.5 Hz to 3 Hz) required for the damping force characteristic control and as reducing the gain at a lower frequency band (~0.05 Hz).

$$G_{(S)} = (0.001S+1)/(10S+1)x\gamma \quad (2).$$

It is noted that $\gamma$ denotes a gain used to match the signal for the velocity conversion with the gain characteristic of the block B1 using the integration of 1/S. In the first embodiment, $\gamma=10$. Consequently, as shown in the gain characteristic of FIG. 14A and in the phase characteristic of FIG. 14B, the gain only at the lower frequency component of the converted sprung mass vertical velocity signal is reduced without worsening the phase characteristic at the frequency band (0.5 Hz to 3 Hz) required for the damping force characteristic control. It is noted that dotted lines denoted in FIGS. 14A and 14B represent the gain and phase characteristics of the sprung mass vertical velocity signal velocity converted through the integration of 1/S.

At the subsequent block of B2, the band pass filtering is carried out to cut off the signal components except a target frequency band to be controlled.

That is to say, the band pass filter block B2 (BPF) includes: a second-order high pass filter (HPF) having a cutoff frequency of 0.3 Hz and a cascade-connected second-order low pass filter having a cutoff frequency of 4 Hz. Thus, the band pass filter block B2 derives the sprung mass vertical velocity of $\Delta x$ ($\Delta x_{FR}$, $\Delta x_{FL}$, $\Delta x_{RR}$, and $\Delta x_{RL}$) in the target frequency band corresponding to a sprung mass resonance frequency band.

On the other hand, at a block B3, the relative velocity between the sprung mass and the unsprung mass ($\Delta x - \Delta x_0$) located at each of the front left and right and the rear left and right road wheels is derived (($\Delta x - \Delta x_0)_{FL}$, ($\Delta x - \Delta x_0)_{FL}$, ($\Delta x - \Delta x_0)_{RR}$, and ($\Delta x - \Delta x_0)_{RL}$) using a transfer function $Gu_{(S)}$ from each sprung mass vertical acceleration to the relative velocity defined above.

$$Gu_{(S)} = -mS/(cS+k) \quad (3)$$

It is noted that as shown by a one wheel model of FIG. 18, m denotes a sprung mass, C denotes a present damping coefficient of each shock absorber SA, K denotes a suspension spring constant, and S denotes a Laplace operator.

Figure 15:
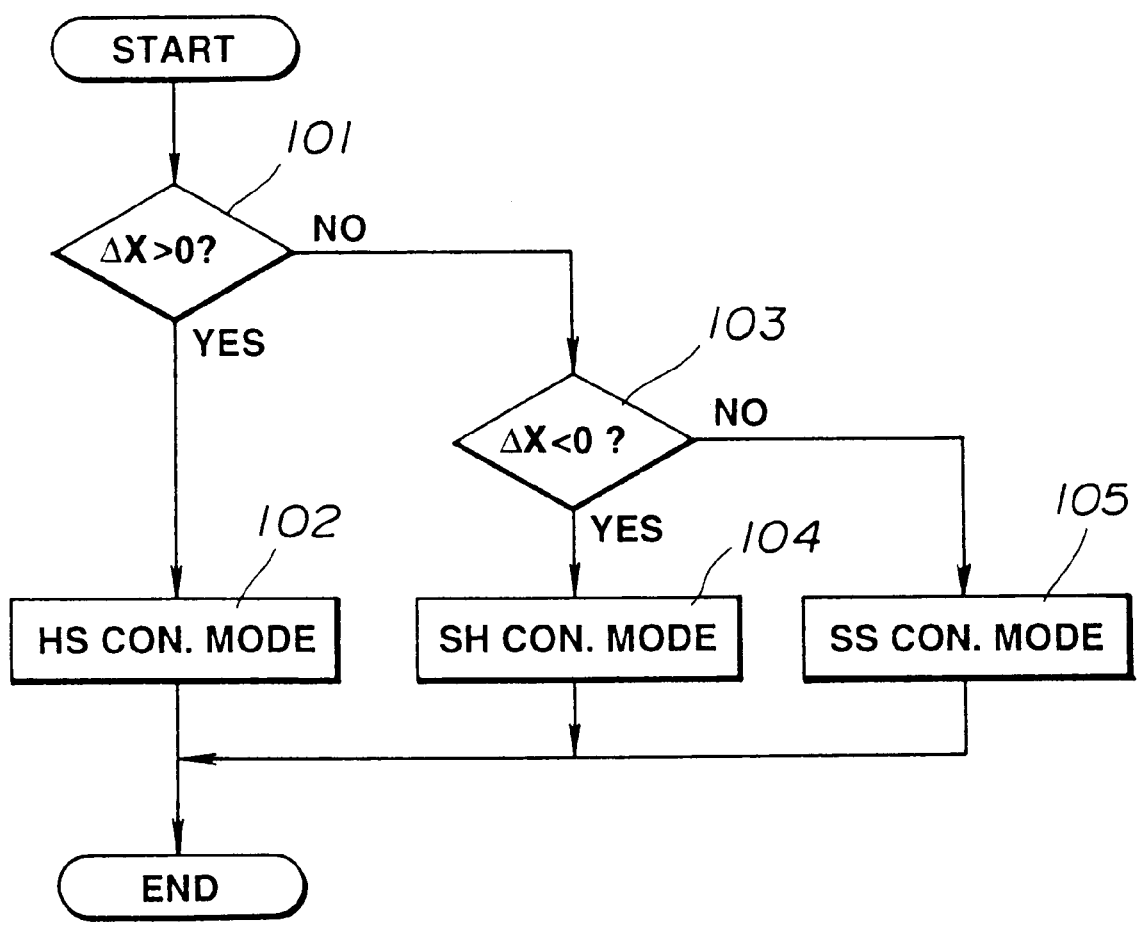
FIG. 15 is an operational flowchart executed in the control unit in the case of the first embodiment according to the present invention.
Figure 16:
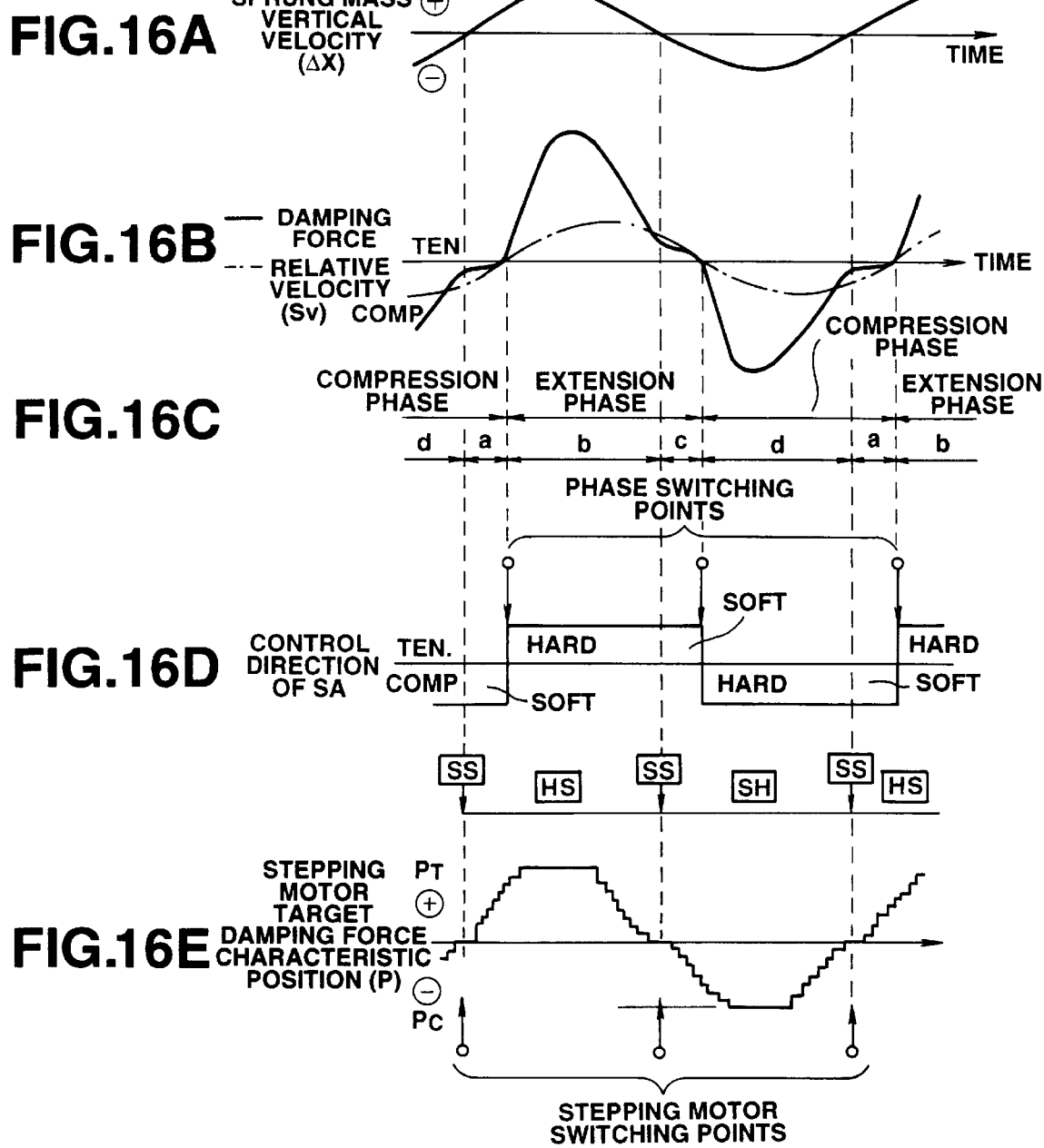
FIGS. 16A, 16B, 16C, 16D, and 16E are integrally a timing chart indicating a damping force characteristic control operation of the control unit in the first preferred embodiment according to the present invention.

Next, FIG. 15 shows an operational flowchart for explaining the content of the damping force characteristic control operation for each shock absorber SA executed in the control unit 4. It is noted that this basic control of FIG. 15 is carried out for each shock absorber $SA_{FL}$, $SA_{FR}$, $SA_{RL}$, and $SA_{RR}$.

At a step 101, the CPU 4b determines whether the formed vertical sprung mass velocity signal $\Delta x$ (for each one of the shock absorbers SA) is increased and exceeds zero (a predetermined positive threshold value $\delta_T$, it is noted that, in this embodiment, $\delta_T=0$). If Yes at the step 101, the routine goes to a step 102 in which the corresponding one of the shock absorber SA is set to as an extension phase hard region HS.

If NO at the step 101, the routine goes to a step 103 in which the CPU 4b determines whether the sprung mass vertical velocity signal $\Delta x$ exceeds and is below zero (a predetermined negative threshold value $-\delta_c$, it is noted that, in this embodiment $\delta_T = -\delta_c = 0$).

If YES at the step 103, the routine goes to a step 104 in which the damping force characteristic of the corresponding one of the shock absorbers SA is set to as a compression phase hard region SH.

If NO at the step 103, the routine goes to a step 105, namely, if the CPU 4b determines that the value of the sprung mass vertical signal $\Delta x$ gives zero, the corresponding one of the shock absorbers SA is set to as each of the respective extension and compression phases being in the soft region SS.

FIG. 16A through 16E show integrally a timing chart for explaining the operation of the control unit 4 and shock absorber(s) SA in the case of the first embodiment.

When the sprung mass vertical velocity signal $\Delta x$ is varied with time as shown in FIG. 15A and the vertical sprung mass velocity signal $\Delta x$ indicates zero, the corresponding one of the shock absorbers SA is controlled in the soft region SS. That is to say, each shock absorber SA, at this time, is controlled in the SS mode in which both of the extension phase and compression phase exhibit the predetermined fixed low damping force characteristics.

On the other hand, if the magnitude and direction of the vertical sprung mass velocity signal $\Delta x$ indicates positive, the corresponding one of the shock absorbers SA is controlled so that the extension phase hard region HS is provided and the compression phase is fixed at a predetermined low (soft) damping force characteristic. At this time, the damping force characteristic at the extension phase is increased to provide a target damping force characteristic position PT in proportion to the magnitude of the sprung mass vertical velocity signal $\Delta x$ as follows:

$$P_T = \alpha \cdot \Delta x \cdot k \cdot \delta \quad (4)$$

It is noted that $\alpha$ denotes a constant at the extension phase of each shock absorber, k denotes the gain variably set according to the relative velocity ($\Delta x - \Delta x_0$), and $\delta$ denotes a control gain (control parameter) variably set according to a change in a weight of load applied to the vehicle body. The content of the control parameter $\delta$ will be described later.

If the direction of the sprung mass vertical velocity signal $\Delta x$, in turn, indicates negative, the compression phase hard region SH is provided so that the extension phase damping force characteristic is fixed to the low predetermined damping force characteristic and the damping force characteristic at the compression phase is varied to provide a target damping force characteristic position $P_C$ in proportion to the value of the sprung mass vertical velocity signal $\Delta x$.

$$P_C = \beta \cdot \Delta x \cdot k \cdot \delta \quad (5),$$

wherein $\beta$ denotes a constant at the compression phase of each shock absorber.

Next, a symbol a of FIG. 15C denotes a region in which the direction of the sprung mass vertical velocity signal $\Delta x$ is inverted from the negative value (downward) to the positive value (upward).

In the region a, the relative velocity ($\Delta x - \Delta x_0$) still provides the negative value (the phase of the shock absorber SA is at the compression phase) so that the corresponding shock absorber SA is controlled at the extension phase hard region HS on the basis of the direction of the sprung mass vertical velocity signal $\Delta x$ and the phase of the corresponding shock absorber SA is at the extension phase. Hence, at this region a, the extension phase from which the piston 31 of the shock absorber SA is moved away provides the hard characteristic which is proportional to the value of the sprung mass vertical velocity signal Δx.

A region b denotes a region in which the direction (direction discriminating sign) of the sprung mass vertical velocity signal V is still positive (upward value) and the relative velocity (Δx−Δx$_0$) is switched from the negative value to the positive value (the phase with respect to the piston of the corresponding shock absorber SA is the extension phase). At this time, since the shock absorber SA is controlled in the mode of the extension phase hard region HS on the basis of the direction of the sprung mass vertical velocity signal Δx, the stroke direction of the corresponding shock absorber SA is the extension phase. Hence, at the region b, the extension phase side of the shock absorber SA provides the hard characteristic proportional to the value of the sprung mass vertical velocity signal Δx.

A region c denotes a region in which the sprung mass vertical velocity signal Δx is inverted from the positive value (upward) to the negative value (downward) and the relative velocity (Δx−Δx$_0$) still indicates positive (the phase of the corresponding one of the shock absorbers SA is extension phase). However, at this region c, since the corresponding shock absorber SA is controlled to the compression phase hard region SH on the basis of the direction (direction discriminating sign) of the sprung mass vertical velocity signal Δx, this region c provides the phase (in this region c, the extension phase is provided with the soft (predetermined low damping force) characteristic.

A region d denotes a region in which the sprung mass vertical velocity signal Δx is still at the negative value (downward) and the relative velocity (Δx−Δx$_0$) is changed from the positive value to the negative value (the phase at which the piston of the corresponding shock absorber SA is at the extension phase side). At this time, since the corresponding shock absorber SA is controlled at the compression phase hard region SH on the basis of the direction of the control signal. Hence, the stroke (phase) of the corresponding shock absorber SA is at the compression phase. In this region d, the compression phase provides the hard characteristic proportional to the value of the sprung mass vertical velocity signal Δx.

As described above with reference to FIGS. 16A through 16E, when the sprung mass vertical velocity Δx and relative velocity (Δx−Δx$_0$) and the relative velocity of (Δx−Δx$_0$) have the mutually the same direction discriminating signs (regions b and d), the instantaneous phase at which the piston of the shock absorber SA is moved is controlled at the hard characteristic mode. If the mutual signs thereof (Δx and (Δx−Δx$_0$)) are different from each other (regions a and c), the phase, at the time of these regions, at which the piston of the corresponding shock absorber SA is moved, is controlled in the soft characteristic. In the first embodiment, the damping force characteristic control based on the Sky Hook theorem (control theory) is carried out.

In the first embodiment, at a point of time when the phase at which the piston of the corresponding one of the shock absorbers SA is moved is ended, namely, when the region is transferred from the region a to the region b and from the region c to the region d (hard characteristic to the soft characteristic), the damping force characteristic position P$_T$ or P$_C$ at the phase to which the control is switched has already been switched to the hard characteristic side at the previous regions a and c. Consequently, the switching from the soft characteristic to the hard characteristic has been carried out without delay in time.

Figure 17:
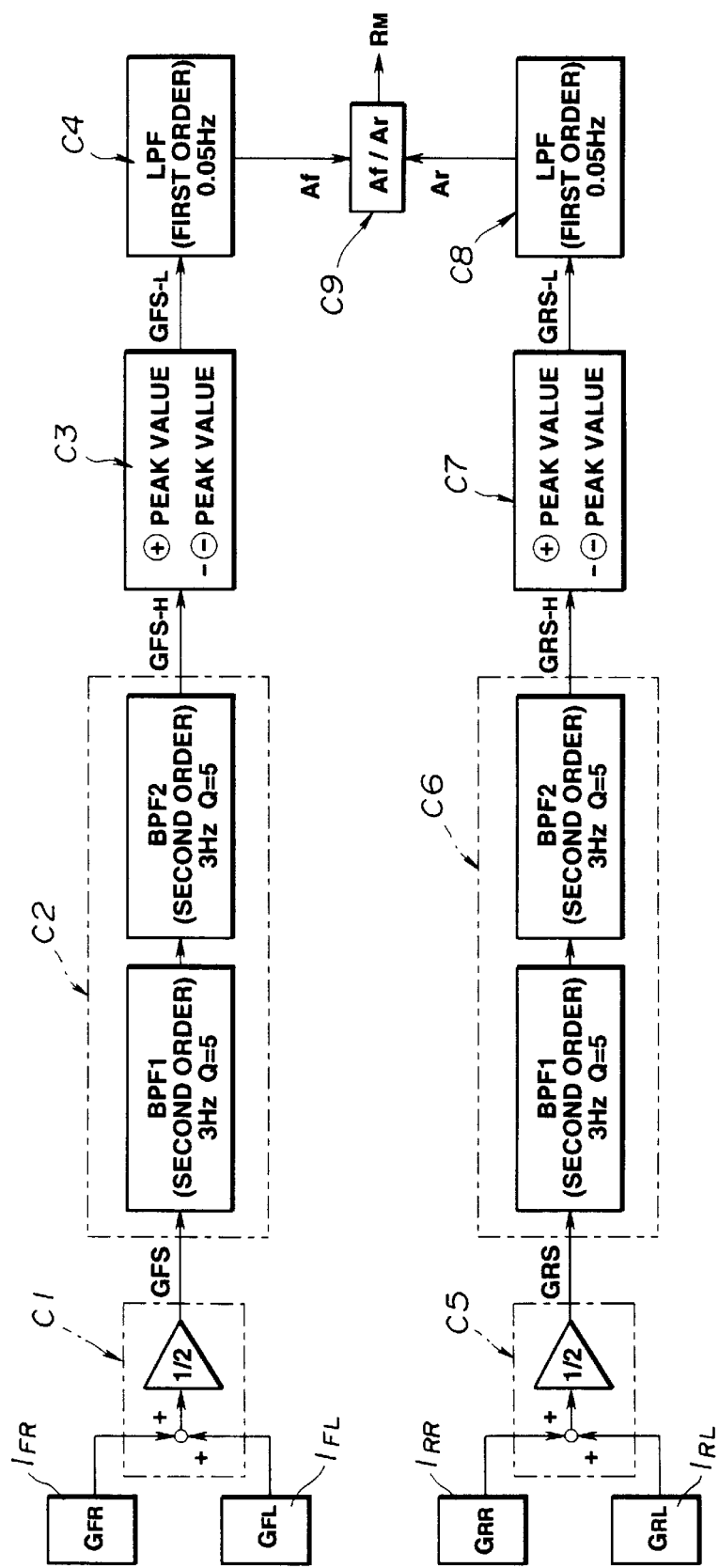
FIG. 17 is a circuit block diagram of a signal processing circuit for deriving a load mounted state determination signal ($R_M$) in the first embodiment shown in FIGS. 1 through 16E.

Next, FIG. 17 shows a configuration of a signal processing circuit arranged for generating the control gain δ based on the change in the weight of load applied to the vehicle body and for generating a load mounted state determination signal R$_M$ used in the determination of the change state of a total weight of load.

An originally designed vehicle weight is in a case where only a driver is seated on the driver's seat with no weight of load (no baggage) into a trunk compartment.

At a circuit block of C1, a first sprung mass vertical acceleration GFS at a first center position of the vehicle body between the front left and right road wheels is derived from an average value between the front left and right road wheel side sprung mass vertical acceleration signals G$_{FL}$ and G$_{FR}$ detected by the two sprung mass vertical G sensors (1$_{FL}$ and 1$_{FR}$). At a circuit block of C5, a second sprung mass vertical acceleration GRS at a second center portion of the vehicle body between the rear left and right road wheels is derived from an average value between the rear left and right road wheel side sprung mass vertical acceleration signals G$_{RL}$ and G$_{RR}$.

At each separate circuit block of C2 and C6, two stages of band pass filterings (BPF1 and BPF2) are carried out in order to extract high frequency components of the first and second sprung mass vertical accelerations GFS and GRS at the first and second center positions, respectively.

Each of the two cascade-connected band pass filters BPF1 and BPF2 includes first and second second-order band pass filters BPF1 and BPF2 each having an extracted frequency band around 3 Hz.

Figure 19A:
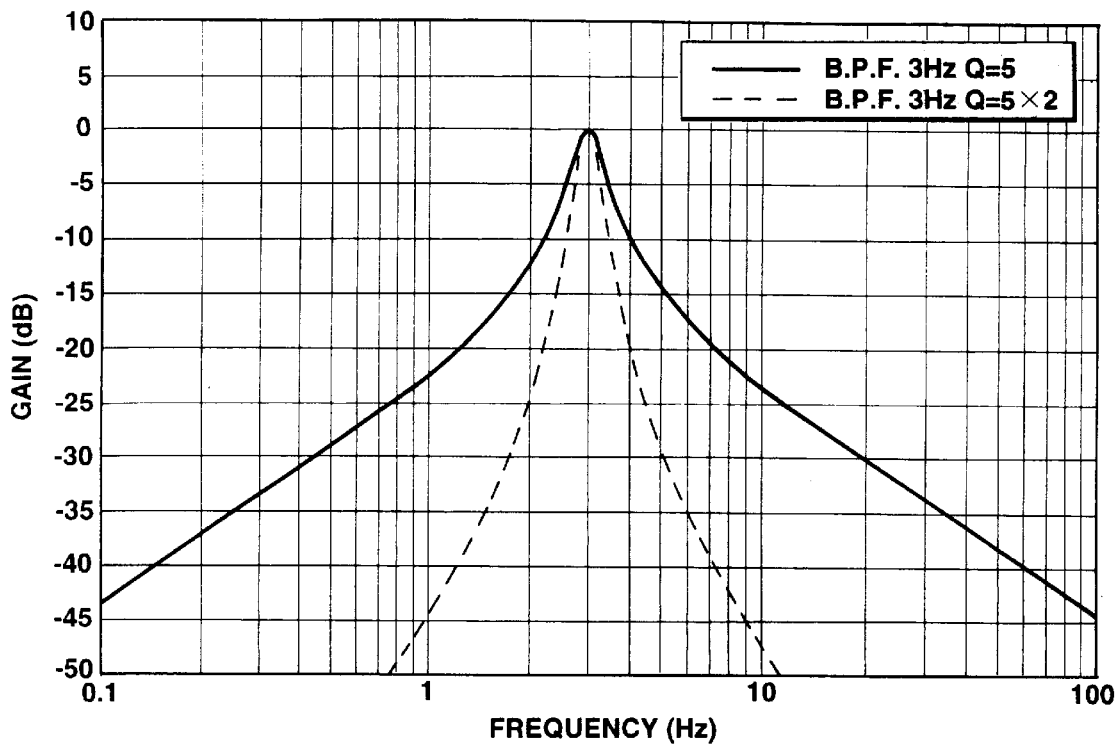
FIGS. 19A and 19B are semi-logarhythmic graphs of gain and phase characteristics of a band pass filter used in the first embodiment shown in FIG. 17.
Figure 19B:
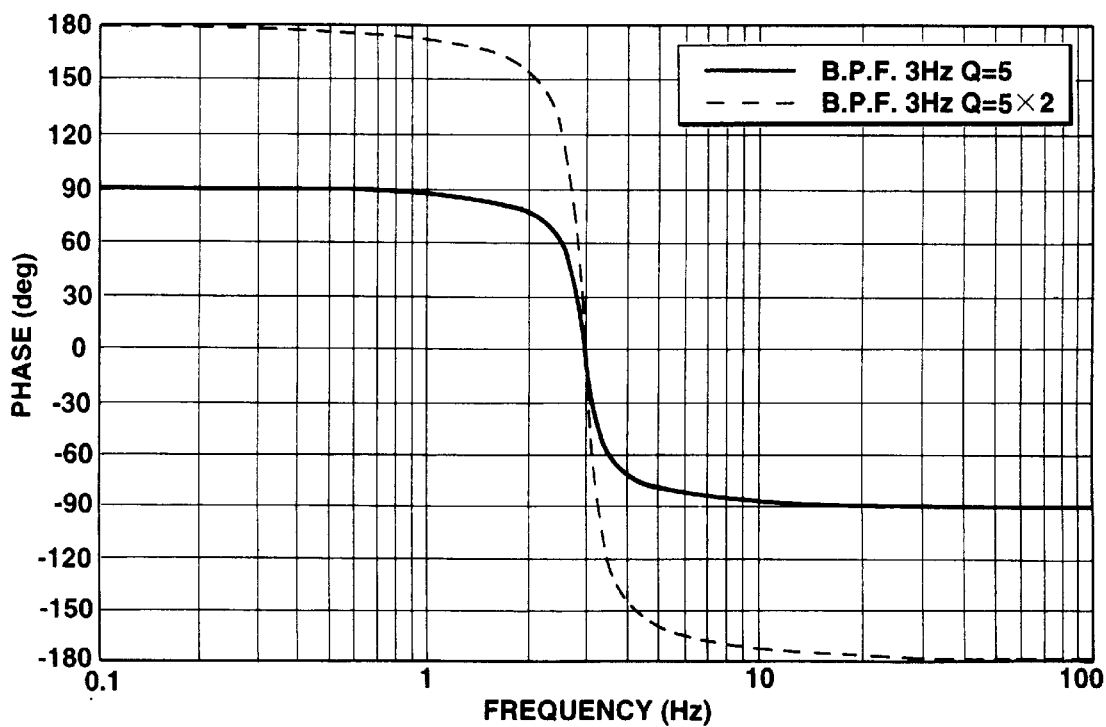

FIGS. 19A and 19B show the gain characteristics (FIG. 19A) and the phase characteristics (FIG. 19B) of each second-order band pass filter of either of BPF1 or BPF2 (denoted by the solid lines) of each of the two-cascaded band pass filters when connected together (dotted lines).

As shown in FIGS. 19A and 19B, such a band pass filter as to have a sharpness (selectivity) of Q equal to 5 is used for each of the two cascade-connected second-order band pass filters BPF1 and BPF2 to emphasize and sharpen the frequency band of 3 Hz.

At the subsequent circuit blocks of C3 and C7, low frequency wave processed signals GFS$_{-L}$ and GRS$_{-L}$ are derived indicating variation states of amplitudes between plus peak values and minus peak values of the high frequency signal components of GFS$_{-L}$ and GRS$_{-L}$, respectively.

That is to say, as shown in FIG. 20A, the peak value of each plus side and each minus side of the corresponding one of the high frequency signal components GFS$_{-H}$ and GRS$_{-H}$ is detected and held by means of a plus peak value hold circuit and a minus peak value hold circuit in a memory location and these held values are sequentially updated at a time when the subsequent peak values are detected. Then, whenever each peak value at the plus side and at the minus side is detected, the peak value at the minus side is subtracted from the peak value at the plus side and the subtracted peak value is memorized so that each of the low frequency signal components GFS$_{-L}$ and GRS$_{-L}$ is derived as shown in FIG. 20B.

Referring back to FIG. 17, at the subsequent circuit blocks of C4 and C8, first-order low pass filters LPFs having the cutoff frequencies of 0.05 Hz are provided for carrying out moving averages for the low frequency wave processed signals GFS$_{-L}$ and GRS$_{-L}$ to derive moving averaged signal components of Af and Ar, respectively.

At the last step C9, a load mounted state determination signal R$_M$ corresponding to an amplitude ratio of both sprung mass vertical acceleration signals at the front and rear (first and second) center positions of the vehicle body on the basis of the following equation (6).

$$R_M = Af/Ar \quad (6)$$

From the amplitude ratio between both sprung mass vertical acceleration signals at the first and second center portions of the vehicle body (load mounted state determination signal $R_M$), a front-and-rear weight ratio at the rear second center position with respect to the front first center position can simply be determined.

The reason will be described below.

Referring back to FIG. 18, in the one road wheel model, x denotes a sprung mass behavior (status variable), m denotes the sprung mass, K denotes the sprung constant of the suspension system, and u denotes a road surface input.

Figure 21A:
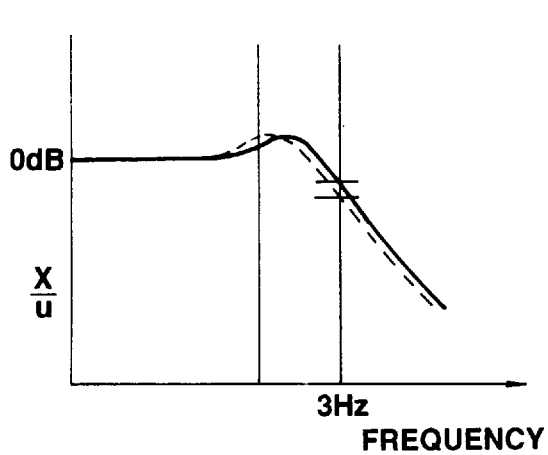
FIGS. 21A and 21B are characteristic graphs representing sprung mass transmissibilities for front and rear road wheels with respect to road surface inputs.
Figure 21B:
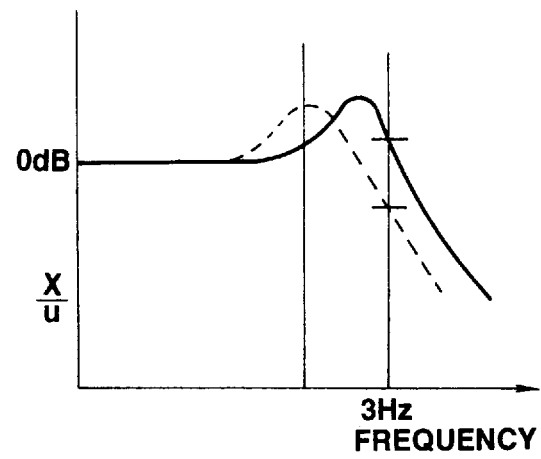

Supposing the vehicular behavior, a transmissibility x/u from the road surface input to the sprung mass will be described as shown in FIGS. 21A and 21B.

FIGS. 21A and 21B show the sprung mass transmissibility characteristic with respect to a road surface input frequency at the front road wheel side and that with respect to the road surface input frequency at the rear road wheel side.

In FIGS. 21A and 21B, solid lines denote the transmissibility characteristics when a standard weight of load is mounted on the vehicle body and dotted lines denote the transmissibility characteristics when a full weight of load is mounted in the vehicle body.

As appreciated from FIGS. 21A and 21B, when comparing the sprung mass transmissibilities, namely, levels of the sprung mass behaviors in the cases of the standard mounted state and of the fully mounted state, almost no level variation occurs as shown in FIG. 21A at the front road wheel side but a large level difference occurs as shown in FIG. 21B at the rear road wheel side.

Especially, as viewed from the road surface input frequency, the level difference occurs in the higher frequency side exceeding 2 Hz such that the transmissibility when the standard weight load state is indicated becomes higher (solid line of FIG. 21B) and that when the full weight load state is indicated becomes lower (dotted line of FIG. 21B). Especially, at a frequency placed in the vicinity to 3 Hz, the largest level difference occurs.

Then, if , e.g., 3 Hz frequency signal component is extracted from the sprung mass vertical behavior x, such a relationship as described below is established.

When the sprung mass m becomes larger (heavier), - - - the transmissibility (x/u) becomes smaller.

When the sprung mass m becomes smaller (lighter), - - - the transmissibility (x/u) becomes larger.

In addition, if a road surface input uf at the front road wheel side is the same as a road surface input ur, the front-and-rear weight ratio (mr/mf) can be replaced with mr/mf≈(xf/uf)/(xr/ur)=xf/xr.

The large level variation at 3 Hz in FIG. 21B corresponds to the moving averaged low frequency wave processed signal Ar at the rear road wheel side and the small level variation at 3 Hz in FIG. 21A corresponds to the moving averaged low frequency wave processed signal Ar at the front road wheel side. Hence, the value of the load mounted state determination signal $R_M$ becomes proportional to the variation in the weight of load in the vehicle.

Hence, the front-and-rear weight ratio between the front road wheel side weight and the rear road wheel side weight in the vehicle can be derived simply by the amplitude ratio (load mounted state determination signal $R_M$) between the sprung mass vertical accelerations at the front road wheel side and at the rear road wheel side (weight ratio≈amplitude ratio).

It is noted that FIGS. 23A through 23F integrally shows a timing chart indicating the variation state of the load mounted state determination signal $R_M$.

In FIG. 23A, a time zone (I) indicates the variation state of the load mounted state determination signal $R_M$ in a case of the weight of load wherein only one passenger of the vehicle rides on the vehicle body and no load is (neglibly) applied onto a trunk compartment and a time zone (II) indicates the variation state of the load mounted state determination signal $R_M$ in a case of the weight of load wherein five passengers (the full load of the vehicle is applied to the vehicle body, i.e., the full rated passenger capacity) rides on the vehicle body.

As appreciated from FIG. 23B, a clear difference in levels between the load mounted state determination signals $R_M$ is present according to the different number of the passengers (load mounted quantity).

For example, when three persons (passengers) have seated on a rear passenger seat, a ratio of the loaded weight acted upon the rear road wheel side with respect to the front road wheel is increased, the variation of the load mounted state determination signal $R_M$ frequently and largely occurs. This case applies equally well to the case where the load is mounted on the trunk compartment (a heavy weight such as baggages is loaded into the trunk compartment).

As shown in FIG. 23B, a threshold value of the load mounted state determination denoted by $R_{ML}$ is set and the changed state of the weight of load, i.e., the variation state of the load mounted state determination signal $R_M$ with reference to the load mounted state determination threshold value $R_{ML}$ is observed so that the change in the weight of load applied to the vehicle body can be determined.

Figure 22:
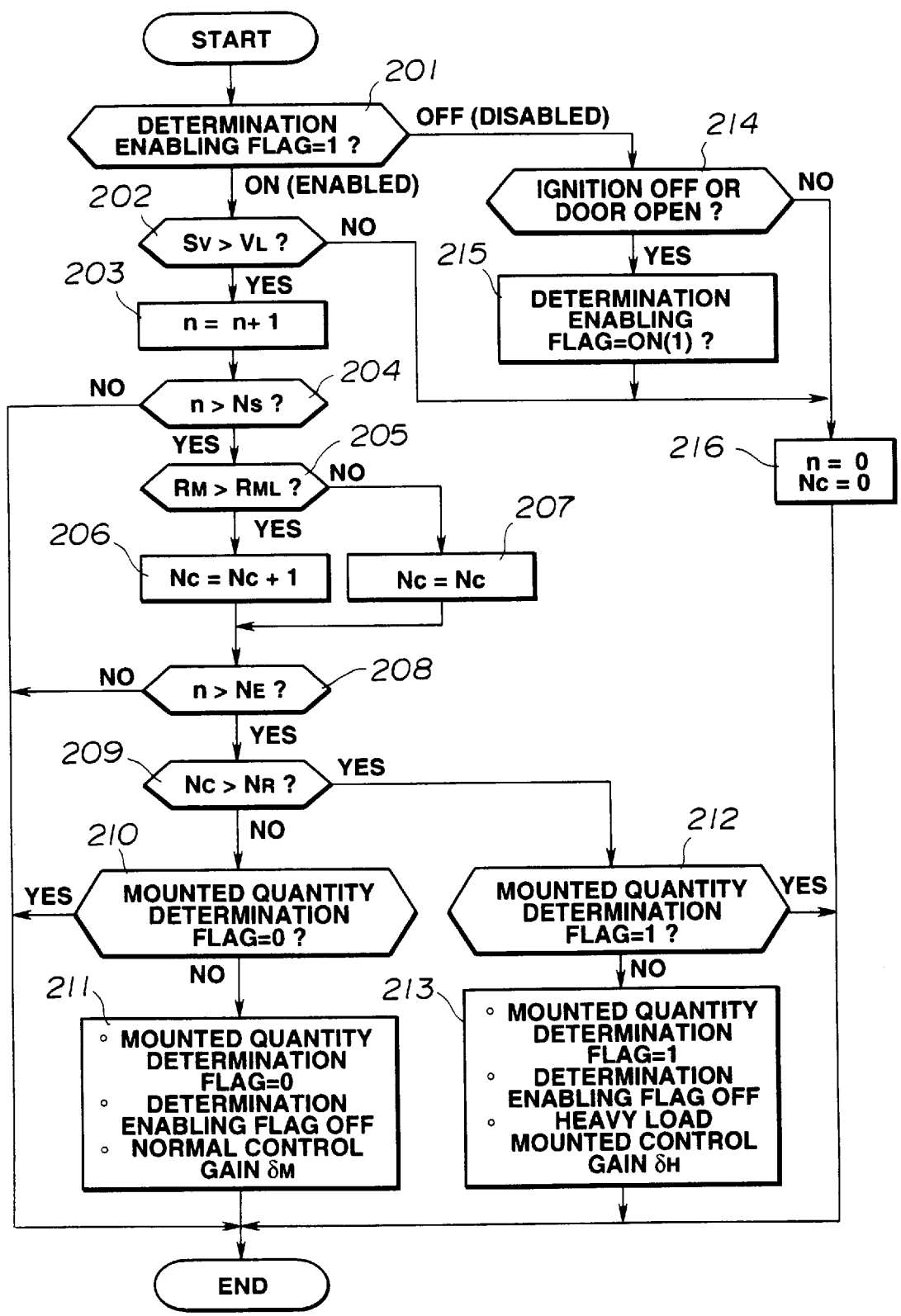
FIG. 22 is an operational flowchart for a switching control operation of a damping force characteristic (control gain) based on a variation in a weight of load applied to a vehicle body in the first embodiment.

FIG. 22 shows an operational flowchart representing the control of the control parameter δ variably set in the equations (4) and (5) to derive the target damping force characteristic positions $P_T$ and $P_C$ according to the change in the weight of load applied to the vehicle body.

FIGS. 23A through 23F show the timing charts of the signals processed in the control unit 4.

At a step 201, the CPU 4b determines whether a (load mounted state) determination enabling flag is set to ON (flag=1). If YES at the step 201, the routine goes to a step 202. It is noted that the determination enabling flag is initially set to ON (1).

At the step 201, the CPU 4b determines whether the vehicle speed Sv is in excess of a predetermined vehicle speed $V_L$, If YES (Sv≧$V_L$) at the step 202, the CPU 4b enters the step 203 in which the value of n (timer value) is incremented by one (n=n+1) and enters the subsequent step 204.

At the step 204, the CPU 4b determines whether the count value of the timer n is equal to or above a predetermined delay time count value Ns (=40=20 sec.). If YES (n≧Ns) at the step 204, the routine goes to a step 205 in which the level of the load mounted state determination signal $R_M$ is in excess of the predetermined threshold value $R_{ML}$. If YES ($R_M$≧$R_{ML}$) at the step 205, the routine goes to a step 206 in which the value of a rate measured count Nc is incremented by one (Nc=Nc+1) If NO ($R_M$<$R_{ML}$) at the step 205, the routine goes to a step 207 in which Nc=Nc.

If n>$N_E$ at a step 208, i.e, the present count of the rate n exceeds a predetermined time $N_E$ ($N_E$=140=50 sec.), the routine goes to a step 209. At the step 209, the CPU 4b determines whether the present count of the value of Nc exceeds the predetermined value $N_R$ (=70). If NO at the step 209 ($N_c$≦$N_R$), the routine goes to the step 210. If YES at the step 209, the routine goes to the step 212 in which the mounted quantity determination flag is set to ON (1) (Nc>$N_R$).

At the step 210, the CPU 211 determines whether the load mounted state determination flag is reset to zero. If NO at the step 210, the routine goes to the step 211 in which after a normal load mounted state control processing listed below of ①, ②, and ③, the present routine is ended.

① The mounted quantity (load state) determination flag is reset to zero:

② The determination enabling flag is reset to OFF:

③ The control parameter $\delta$ in the equations of (4) and (5) is set to the normal control gain $\delta_M$ used when only one passenger of the driver rides on the vehicle body.

If the CPU 4b determines that the mounted quantity determination flag is set to 1, the routine goes to the step 213 in which the large mounted state control processings of ①, ②, and ③ described below are carried out.

① The load mounted quantity (state) determination flag is set to 1:

② The determination enabling flag is reset to OFF:

③ The control parameter (gain) $\delta$ is set to $\delta_H$ when the full weight of load is applied to the vehicle body, $\delta_H$ being larger than $\delta_M$.

If YES (load quantity determination flag=1) at the step 212, the present routine is ended since it is not necessary to repeat the processing of the step 211.

In addition, when NO (determination enabling flag=OFF) is determined at the step 201, the routine goes to a step 214 in which the CPU 4b determines whether the signal derived from the ignition switch 6 is turned OFF (IGN=OFF) or whether the signal derived from the door open/closure sensor 5 indicates that any door of the vehicle, in the case of four-door vehicle, any one of front left and right doors and rear left and right doors is open.

If YES at the step 214, the present routine goes to a step 215 in which the mounted quantity determination enabling flag is turned to ON and thereafter the present routine goes directly to a step 216. If NO at the step 214, the routine directly goes to the step 216 in which the timer count value of n and the rate of the count value Nt is reset to zero (n=0, Nc=0).

In addition, when the CPU 4b determines that the vehicle speed Sv is equal to or below the predetermined vehicle speed $V_L$ (NO) at the step 203, the routine goes to the step 216.

Furthermore, if the CPU 4b determines NO (n<Ns, n<$N_E$) at the steps 204 and 208, the present routine is ended.

Next, the content of control operation to variably set the control parameter $\delta$ variably set according to the change in the load mounted quantity in the equations (4) and (5) deriving the target damping force characteristic positions $P_T$ and $P_C$.

(A) A case when the small weight of load is applied to the vehicle body, i.e., the weight of load applied to the vehicle body is only the driver's weight (originally designed weight of load).

In a case where the smallest quantity of weight of load is applied to the vehicle body, namely, the driver only and the baggage to be mounted in the trunk compartment is zero, the level of the load mounted quantity determination signal $R_M$ ($\approx$weight ratio) is so low that, as shown in the time zone (I) of the timing chart of FIG. 23B and is below the predetermined load quantity determination signal $R_{ML}$.

Then, when the vehicle speed Sv is equal to or above the predetermined threshold value $V_L$, the counting of the time of the timer is started.

The number of times, namely, the rate count value Nc, the load mounted state determination signal $R_M$ exceeds the predetermined load quantity determination threshold value $R_{ML}$ with a time duration from the time which corresponds to the count value of n which indicates the predetermined delay time count value (20 sec.) to the time at which the count value of time of the timer n indicates the predetermined measuring time count value $N_E$ (50 sec.) is equal to or below the predetermined rate value $N_R$ (70). Therefore, at this time, the normal load mounted state control processing is carried out at the step 211 of FIG. 22.

In details, the control parameter $\delta$ in the equations (4) and (5) to derive the target damping force characteristic positions $P_T$ and $P_C$ is set in the normal load mounted state control gain (parameter) $\delta_M$. This causes the comfort and steering stability of the vehicle to be achieved by carrying out the optimum damping force characteristic control based on the sky hook theory while the weight of load applied to the vehicle body is the smallest.

(B) A case where the number of passengers of the vehicle are five, namely, the weight of load applied to the vehicle body is the maximum (rated passenger capacity) (or a large quantity of baggages are mounted within the trunk compartment) and the vehicle runs.

The level of the load mounted state determination signal $R_M$ ($\approx$weight ratio) becomes high so that the rate of time at which the number of times the determination signal $R_M$ exceeds the predetermined threshold value $R_{ML}$. Since the rate of count Nc which indicates that the number of times the determination signal $R_M$ exceeds the predetermined threshold value $R_{ML}$ exceeds the predetermined rate value $N_R$ (70). Therefore, at this time, the largest weight of load mounted state control processing at the step 213 of FIG. 22 is executed.

That is to say, the control gain a included in the equations (4) and (5) deriving the target damping force characteristic positions is set variably to the larger weight of load applied state control gain $\delta_H$ than the smallest weight of load applied state control gain $\delta_M$. Consequently, as compared with the smallest weight of load mounted state control gain $\delta_H$, the target damping force characteristic positions $P_T$ and $P_C$ are set to larger values than those including the smallest one $\delta_H$.

In this case, since the increased weight percentage at the rear road wheel side becomes larger than that at the front road wheel side, the value of the large weight of load mounted state control parameter $\delta_H$ is set higher than that at the rear road wheel side.

In addition, once the switching of the control gain $\delta$ is carried out, the switched control gain is used until the ignition switch of the vehicle is, at least, turn off, or any one of the doors is opened.

Hence, the change of the control gain (parameter) due to the increased change in the weight of load applied to the vehicle body permits the prevention of the worsening of the comfort and steering stability by automatically varying the damping force characteristic to a higher value.

Second Embodiment

The difference in the structure of a second preferred embodiment from that of the first embodiment described above lies in the derivation of the load mounted state determination signal $R_M$ to determine the change in the weight of load applied to the vehicle body.

The other structure in the second embodiment is the same as the structure of the first embodiment.

Figure 24:
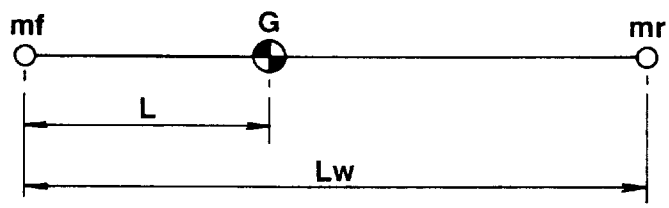
FIG. 24 is an explanatory view for deriving a distance from a front road mounted position to a weight center of the vehicle in a second embodiment of the control apparatus according to the present invention.

FIG. 24 is an explanatory view of the movement state of the position of a weight center G based on the change of the weight of load applied to the vehicle body in the second embodiment.

As shown in FIG. 24, a distance L of the front tower position (front left or right road wheel arranged position) to the weight center C position can be determined as described in the following equation (7).

It is noted that mf denotes a front road wheel side sprung mass and mr denotes a rear road wheel side sprung mass, and Lw denotes a length of a wheel base.

$$L=(mf/(mf+mr))\cdot Lw \tag{7}$$

Hence, in the same way as the weight ratio, the distance L can be approximated to the following equation (9).

$$L\approx\text{(rear road wheel side sprung mass vertical acceleration amplitude)}/\{\text{(front road wheel side sprung mass vertical acceleration amplitude)}+\text{(rear road wheel side sprung mass vertical acceleration amplitude)}\}\cdot Lw \tag{9}$$

In the first embodiment, the weight of load mounted state determination signal $R_M$ is determined from the amplitude ratio ($\approx$weight ratio) of the low frequency wave processing signals Af and Ar at the front road wheel side and at the rear road wheel side in the signal processing circuit of FIG. 17.

On the other hand, in the second embodiment, the load mounted state determination signal $R_M$ is the approximation value of the above-described distance L, i.e., the following equation (8).

$$L\approx(Af/(Af+Ar))\cdot Lw \tag{8}$$

That is to say, the distance L of the front tower position to the weight center G is the load mounted state determination signal $R_M$.

Third Embodiment

The difference in the structure of a third embodiment from that of the second embodiment lies in a variation of higher and lower cutoff frequencies of the band pass filter (BPF in the circuit block B2 of FIG. 13 since the sprung mass resonance frequency in the vehicle is varied due to the change in the sprung mass caused by the change in the weight of load applied to the vehicle body. That is to say, the cutoff frequencies of the BPF in the circuit block of B2 of FIG. 13 are changed from those when the weight of load applied to the vehicle body is the smallest to those when the weight of load applied to the vehicle body is the largest, i,e., between two stages. Consequently, the control parameter of the damping force characteristic of each or any one of the shock absorbers is varied.

In the normal weight of load mounted state - - - HPF ($f_H$=0.3 Hz), LPF ($f_L$=4 Hz), In the large weight of load mounted state - - - HPF ($f_H'$=0.2 Hz), LPF ($f_L'$=3 Hz).

Figure 25A:
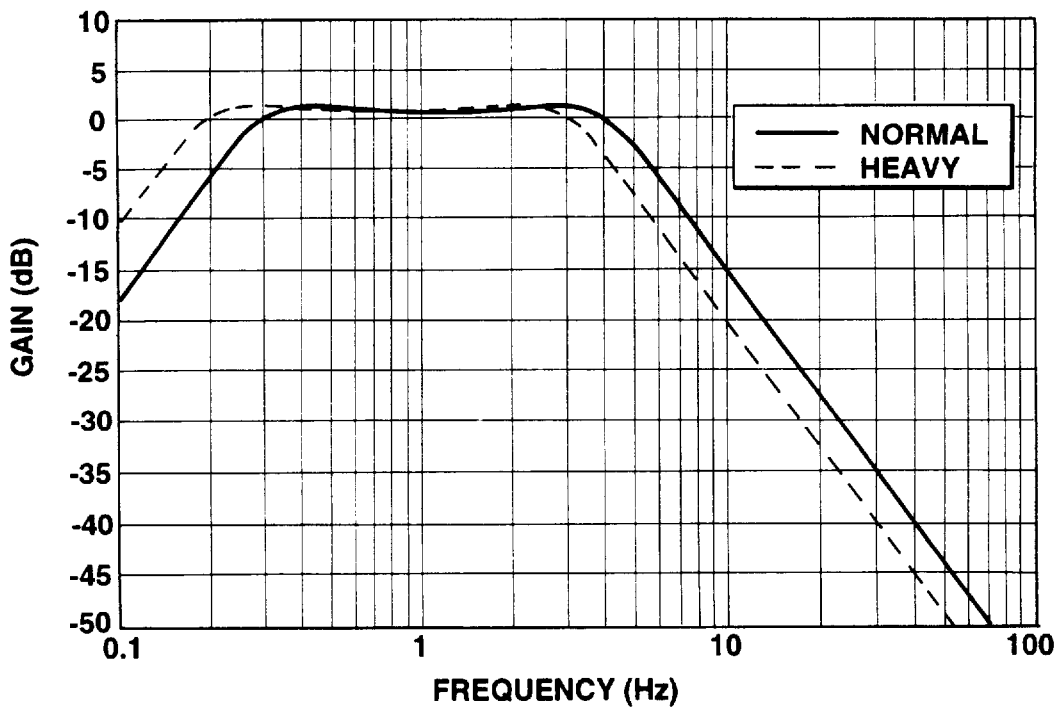
FIGS. 25A and 25B are characteristic graphs of gain and phase characteristics of the band pass filter in the semi-logarhythmic scale, in the case of a third embodiment.
Figure 25B:
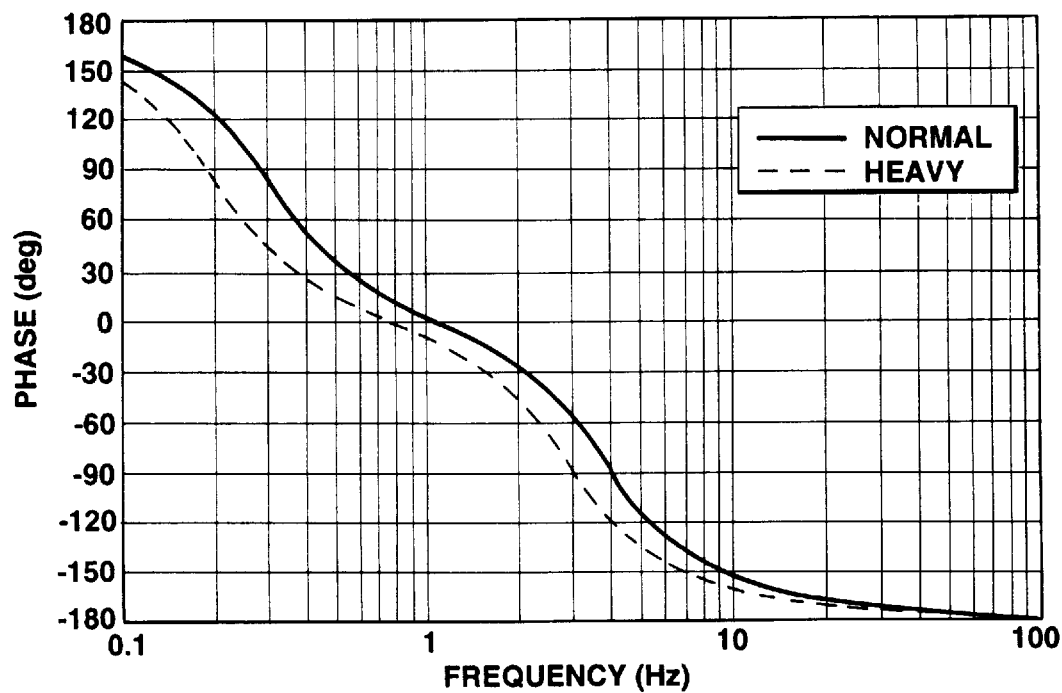

It is noted that FIG. 25A and 25B are gain and phase characteristics of the band pass filter BPF used in the circuit block of B2 in FIG. 13 in the third embodiment.

The solid lines of FIG. 25A and 25B denote the gain and phase characteristics of the band pass filter BPF with respect to the input frequency when the weight of load applied to the vehicle body is normal (smaller) (or minimum) and the dotted lines of FIGS. 25A and 25B denote the gain and phase characteristics of the band pass filter BPF with respect to the input frequency when the weight of load applied to the vehicle body is heavy (larger) (or the maximum).

The same advantages as those in the first embodiment can be achieved in the third embodiment.

Fourth Embodiment

Figure 26:
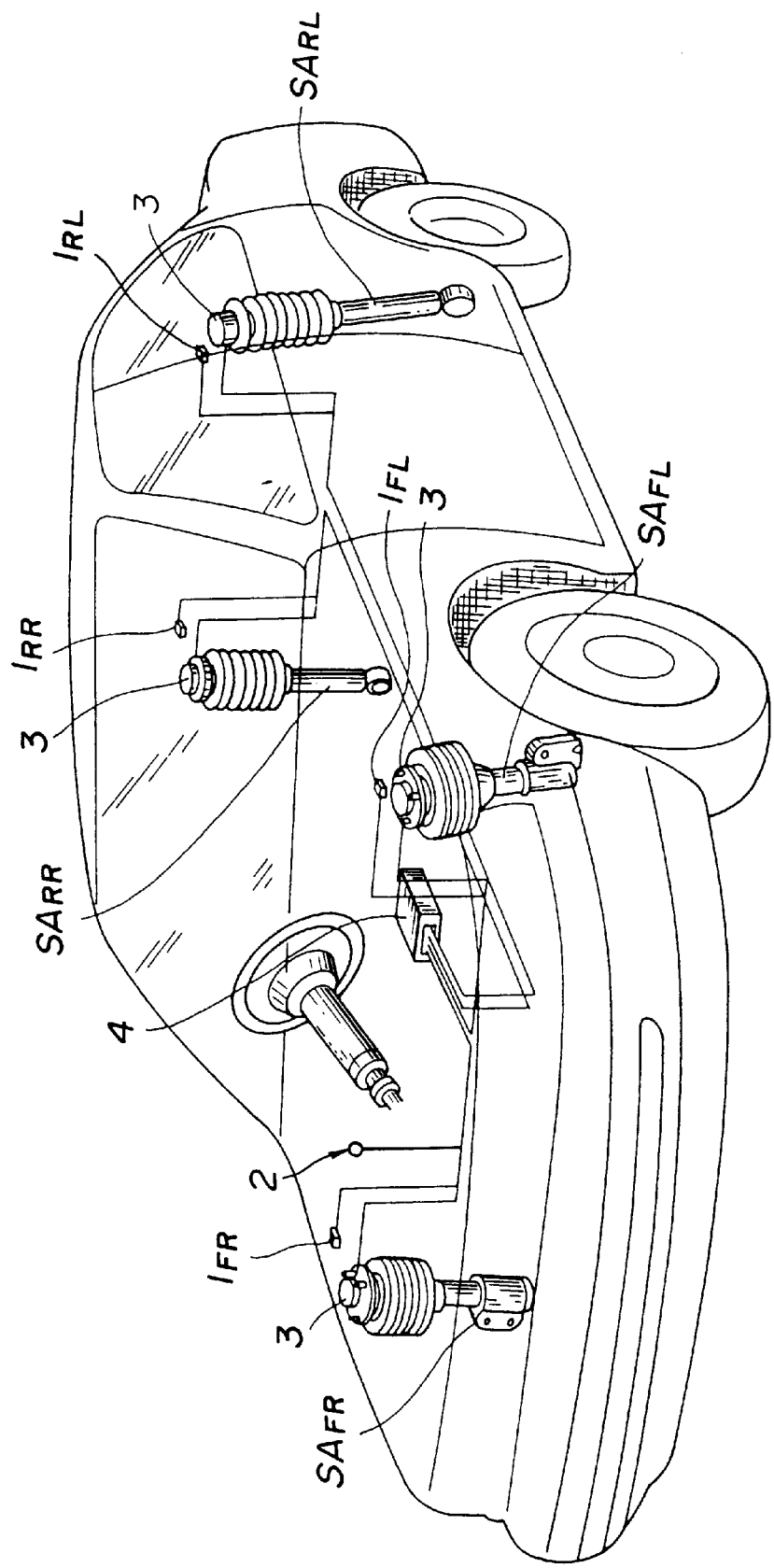
FIG. 26 is an explanatory view of the arrangement of the control apparatus for the vehicular suspension system in a fourth embodiment according to the present invention.
Figure 27:
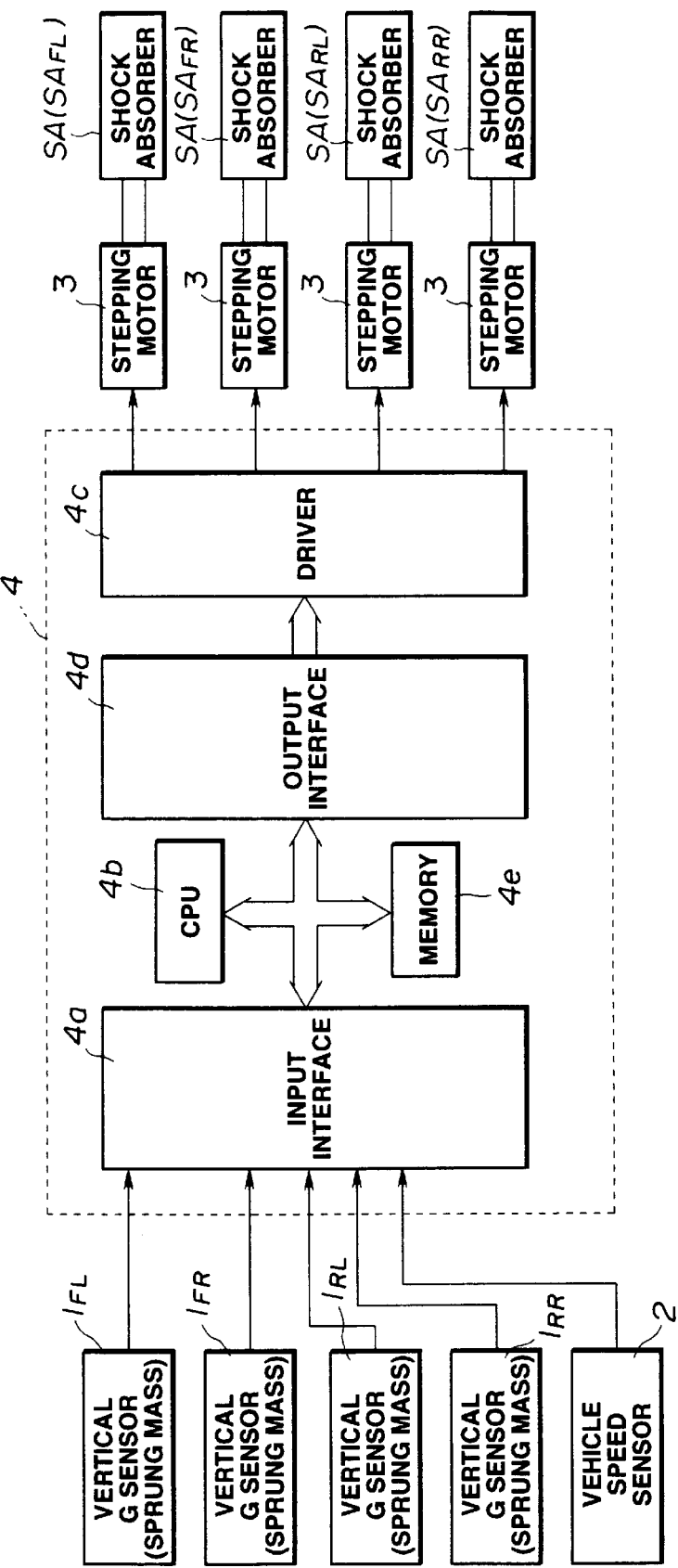
FIG. 27 is a circuit block diagram of the control unit and its peripheral circuits of the control apparatus for the vehicular suspension system in the fourth preferred embodiment according to the present invention.

FIGS. 26 and 27 show a system configuration of the control apparatus for a vehicular suspension system in a fourth preferred embodiment according to the present invention.

As shown in FIGS. 26 and 27, the structure of the control apparatus in the fourth embodiment is generally the same as that in the first embodiment expect the omission of the door open/closure sensor 5 and the ignition key switch 6.

However, since the derivation of the load mounted state determination signal $R_M$ is different from that in the case of the first, second, or third embodiment, the detailed explanation of the variation of the control gain δ will be made hereinbelow.

Figure 28:
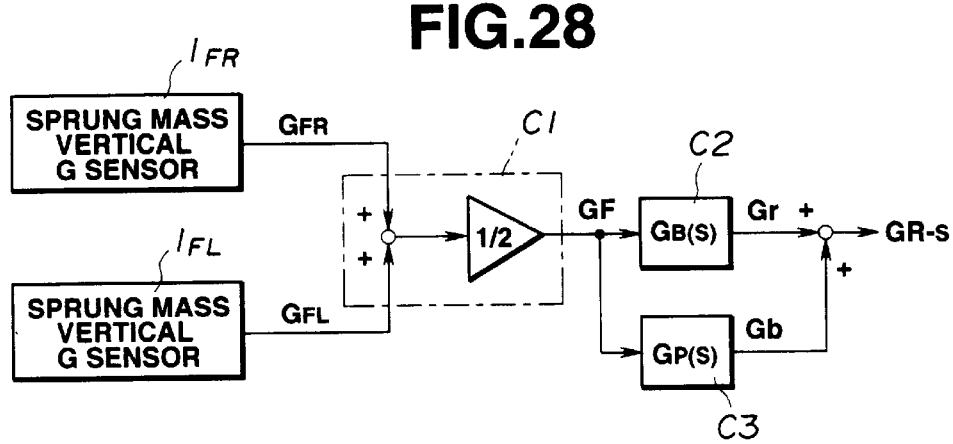
FIG. 28 is an explanatory circuit block diagram of a signal processing circuit in the control unit for deriving an estimated value of a rear road wheel sprung mass vertical acceleration signal $GR_{-S}$ at a second center portion of the vehicle body between rear left and right road wheels in the fourth embodiment shown in FIG. 27.
Figure 29:
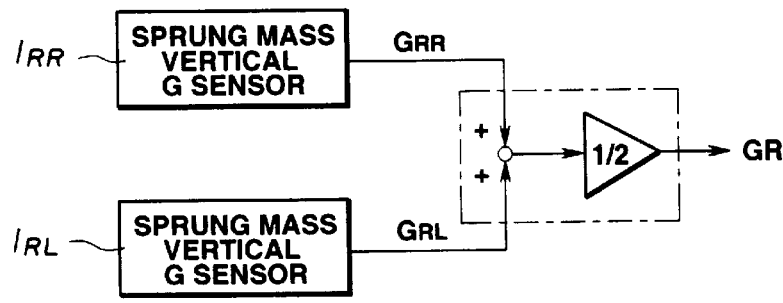
FIG. 29 is an explanatory circuit block diagram of a signal processing circuit arranged for deriving the rear road wheel side sprung mass vertical acceleration signal GR in the fourth preferred embodiment according to the present invention.
Figure 30:
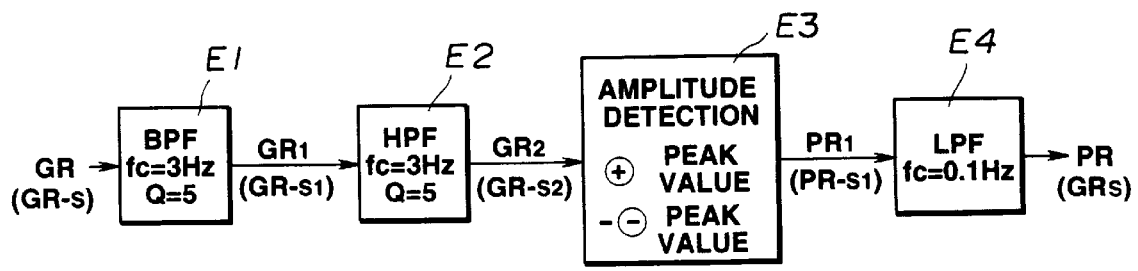
FIG. 30 is a circuit block diagram of a signal processing circuit arranged for deriving low pass filtered signal components PR ($PR_S$).

FIGS. 28, 29, and 30 show signal processing circuit in the control unit 4 used to determine the variation state of the load mounted state determination signal.

At a circuit block C1 of FIG. 28, the sprung mass vertical acceleration signal at the first center of the vehicle body between the front left and right road wheels is derived according to the average value of the sprung mass vertical sprung mass acceleration signals detected by means of the front left and right vertical sprung mass acceleration sensors $1_{FL}$ and $1_{FR}$, respectively.

$$GF=\tfrac{1}{2}\cdot(G_{FR}+G_{FL})$$

At the circuit block of C2, a sprung mass vertical acceleration signal component Gr at the second center of the vehicle body which is placed between the rear left and right road wheels is derived on the basis of a transfer function $G_{B(S)}$ defined between the front tower portion and the rear tower portion via a transmission route of a road surface input indicated in the following equation (10).

$$G_{B(S)}=G_{1(S)}\cdot G_{2(S)}\cdot G_{3(S)} \tag{10}$$

In the equation (10), $G_{1(S)}$ denotes a transfer function between the front road wheel side sprung mass (mf) and the road surface at the front road wheel side, $G_{2(S)}$ denotes a transfer function between the road surface at the rear road wheel side and the rear road wheel side sprung mass $G_{3(S)}$, and $G_{3(S)}$ denotes a delay transfer function on an input timing difference between the front-and-rear parts of the vehicle body./

Especially, the delay transfer function $G_{3(S)}$ is determined according to the length of the vehicular wheel base $W_B$ and vehicle speed Sv as denoted by the following equation (11).

$$G_{3(S)}=e^{-s(WB/Sv)} \tag{11},$$

wherein s denotes the Laplace operator, WB denotes the length of the wheel base, and Sv denotes the vehicle speed Sv.

At the circuit block C3 of FIG. 28, a sprung mass vertical acceleration signal component Gb at the second center of the vehicle body between the rear left and right road wheels to be transmitted from the first center to the second center with the sprung mass as the transmitted route on the basis of a transfer function $G_{P(S)}$ in a forward-and-rearward direction of the vehicle as the sprung mass being the transmission route.

$$Gb=G_{P(S)}\cdot GF.$$

A summer adds the value of Gr to that of Gb to derive an estimated value of the sprung mass vertical acceleration $GR_{—s}$ at the second center of the rear road wheel side vehicle body from the addition between the sprung mass vertical acceleration signal components Gb and Gr as the sprung mass being the transmission route and the road surface input being the transmission route.

Next, in the circuit blocks of FIG. 29, the actual sprung mass vertical acceleration signal GR at the second center of the vehicle body between the rear left and right road wheels is determined from the average value between the sprung mass vertical acceleration signals detected by the two sprung mass vertical acceleration sensors $1_{RL}$ and $1_{RR}$, respectively.

$$GR = \tfrac{1}{2} \cdot (G_{RL} + G_{RR}).$$

In the circuit blocks of the signal processing circuit shown in FIG. 30, the circuit block of E2 includes a band pass filter BPF used to extract a high frequency component $GR_1$ (or $GR_{-s1}$) of the sprung mass vertical acceleration detection value GR at the rear road wheel side center portion (second center) (or the estimated value of the sprung mass vertical acceleration signal at the second center $GR_{-s}$). Furthermore, the subsequent circuit block E2 includes a high pass filter HPF having the cutoff frequency of 3 Hz and the sharpness of Q (selectivity) indicating 5 used to eliminate completely the lower frequency components (especially, sprung mass resonance frequency components) from the band pass filtered signal component $GR_1$ (or $GR_{-s1}$).

It is noted that the transfer function of the band pass filter BPF at the block E1 and that of the high ass filter HPF at the block E2 are expressed as follows:

$$F_{B(S)} = (\omega/Q \cdot S)/(S^2 + \omega/Q \cdot S + \omega^2) \qquad (12)$$

$$F_{H(S)} = S^2/(S^2 + \omega/Q \cdot S + \omega^2) \qquad (13)$$

In the equations (12) and (13), $\omega = 2\pi f_c$.

Figure 31:
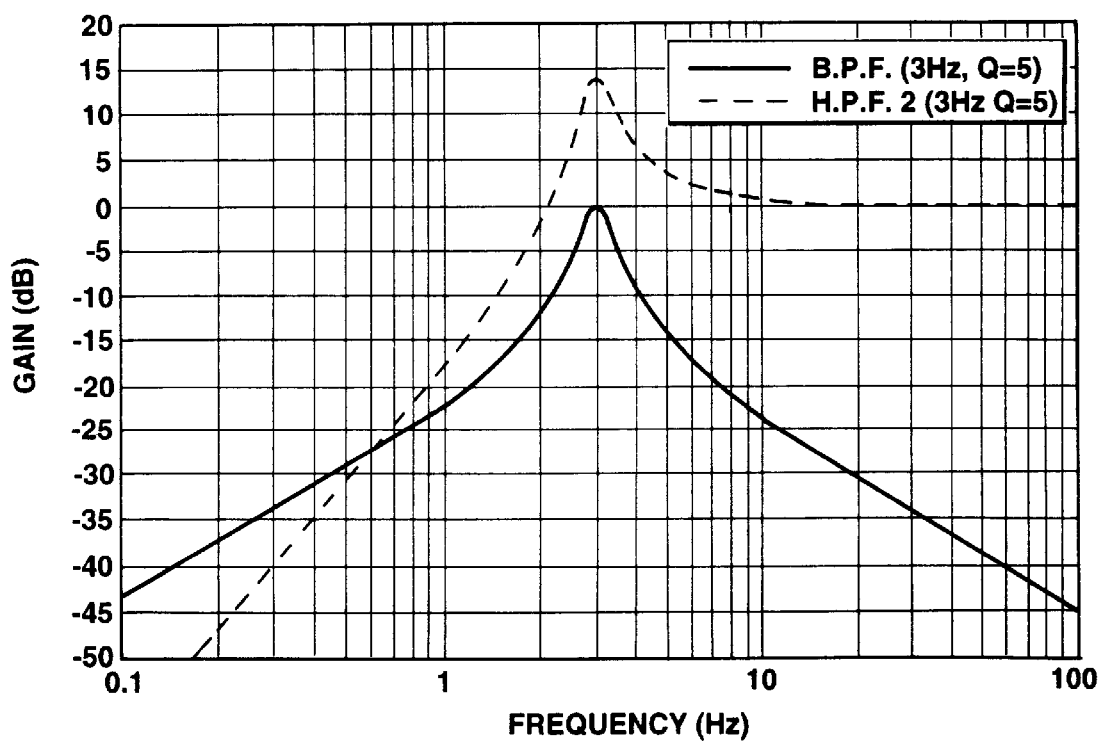
FIG. 31 is a characteristic graph of a gain of a band pass filter (BPF) used in the signal processing circuit shown in FIG. 30.

For the respective filters BPF and HPF in the blocks of E1 and E2, the gain characteristic graphs (solid line for BPF and dotted line for HPF) in FIG. 31 (Q=5) are used to emphasize the frequency of 3 Hz.

The subsequent circuit block E3 includes an amplitude detector of the plus peak value + and the minus peak value − of the high pass filtered signal component $GR_1$ (or $GR_{-s1}$) to derive a low frequency signal component $PR_2$ (or $PR_{-s2}$).

The plus and minus peak values of the high pass filtered signal component $GR_1$ (or $GR_{-s1}$) are derived and memorized into the memory locations and updated whenever the plus or minus peak value is detected as shown in FIGS. 32A and 32B.

Thus, the low pass filtered signal component $PR_1$ (or $PR_{-s1}$) is derived as shown in FIG. 32B.

At the last state of E4, the moving averaged signal component PR (or $PR_{-s}$) is derived by passing the low frequency signal component of $PR_1$ (or $GR_s$) through the low pass filter LPF having the cutoff frequency 0.1 Hz.

Then, the load mounted state determination signal $R_M$ is derived from the load mounted state determination signal $R_M$ on the basis of the following equation (14).

$$R_M = PR_{-s}/PR \qquad (14)$$

Figure 35:
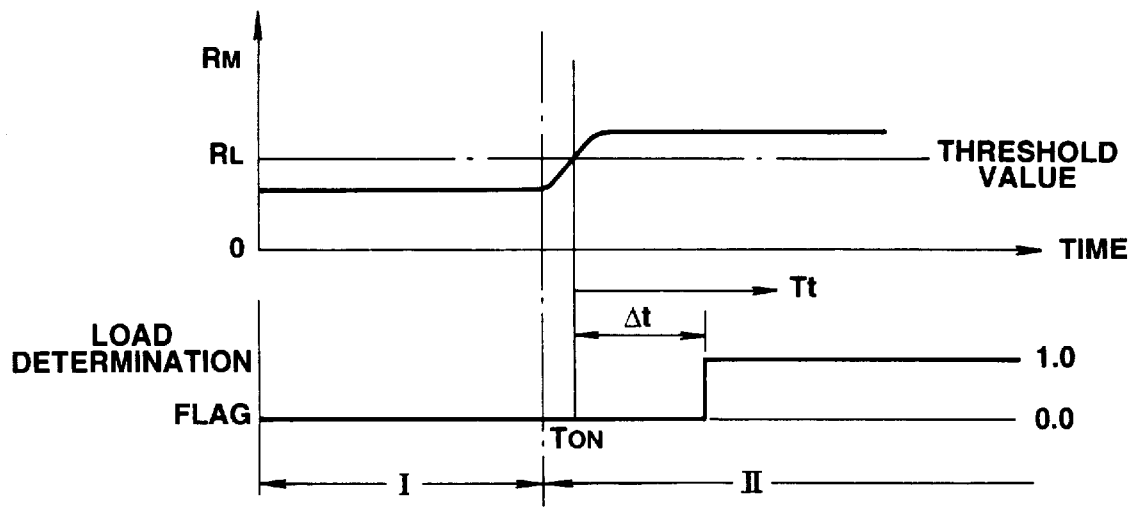
FIG. 35 is a signal timing chart of the load mounted state determination signal ($R_M$) and the load determination flag.

FIG. 35 shows timing charts of the load mounted state determination signal $R_M$ derived in the case of the fourth embodiment and of a variation of the load determination flag. It is noted that the load mounted state determination signal $R_M$ is the ratio between the estimated value and detected value.

In FIG. 35, in the time zone denoted by I, the load mounted state determination signal $R_M$ is varied when the number of the passenger is only one, i.e., the vehicle driver only and no load is mounted into the trunk compartment and in the time zone II the load mounted state determination signal $R_M$ is varied with the large quantity of loads mounted into the trunk compartment (maximum weight of load). As appreciated from FIG. 35, the level of the load mounted state determination signal $R_M$ is changed largely according to the quantity of loads mounted onto the vehicle body.

This phenomenon is caused by the increase in the weight of load acted upon the rear road wheel side with respect to the front road wheel side when the large quantity of weights is loaded into the trunk compartment and the vehicle runs. This can equally be applied well in the case where the passengers (occupants) are seated in the whole rear seats and the vehicle runs.

FIGS. 33A and 33B show the sprung mass transmissibility of the vehicular front road side with respect to the road surface input frequency. In addition, FIG. 33B shows the sprung mass transmissibility of the vehicular rear road wheel side with respect to the road surface input frequency.

In FIGS. 33A and 33B, solid lines denote the sprung mass transmissibility characteristics when the normal weight of load is applied to the vehicle body and dotted lines denote those when the full weight of load is applied to the vehicle body.

The normal weight of load means that only the driver only rides on the vehicle and the full weight of load means that the five persons (occupants) ride on the vehicle or that the large quantity of loads are mounted into the trunk compartment placed at the rearward of the passenger compartment.

As shown in FIGS. 33A and 33B, the gains of the sprung mass transmissibilities when the normal weight of load is applied and when the full weight of load is applied are varied mutually to some degrees at the road surface input frequencies exceeding 1 Hz in the case of the front road wheel side sprung mass and those when the normal weight of load is applied and when the full weight of load is applied are varied mutually with large level difference at the road surface input frequencies abound 1 Hz in the case of the rear road wheel side sprung mass.

Especially, with respect to the road surface input frequencies at higher frequencies than 2 Hz, the gain of the sprung mass transmissibility when the full load is applied becomes higher than that the normal load is applied which becomes lower. Furthermore, the level difference becomes most remarkable in the frequency of about 3 Hz.

In the equation of (12), the large level variation at 3 Hz of FIG. 33B corresponds to the variation in the low pass filtered signal component PR at the rear road wheel side based on the actual detected value at the rear road wheel side. In addition, the small level variation at the front road wheel side of FIG. 33A corresponds to the variation in the low pass filtered signal component $PR_{-s}$ at the rear road wheel side based on the estimated value from the detected value at the front road wheel side. Hence, the value of the load mounted state determination signal $R_M$ derived in the fourth embodiment is varied in proportion to the variation in the weight of load applied to the vehicle body.

Then, as shown in FIG. 35, the load mounted state determination threshold value $R_L$ is set and the load mounted state determination signal $R_M$ is compared with the load mounted quantity determination threshold value $R_L$ so as to determine the changed state of weight of load applied to the vehicle body.

Figure 34:
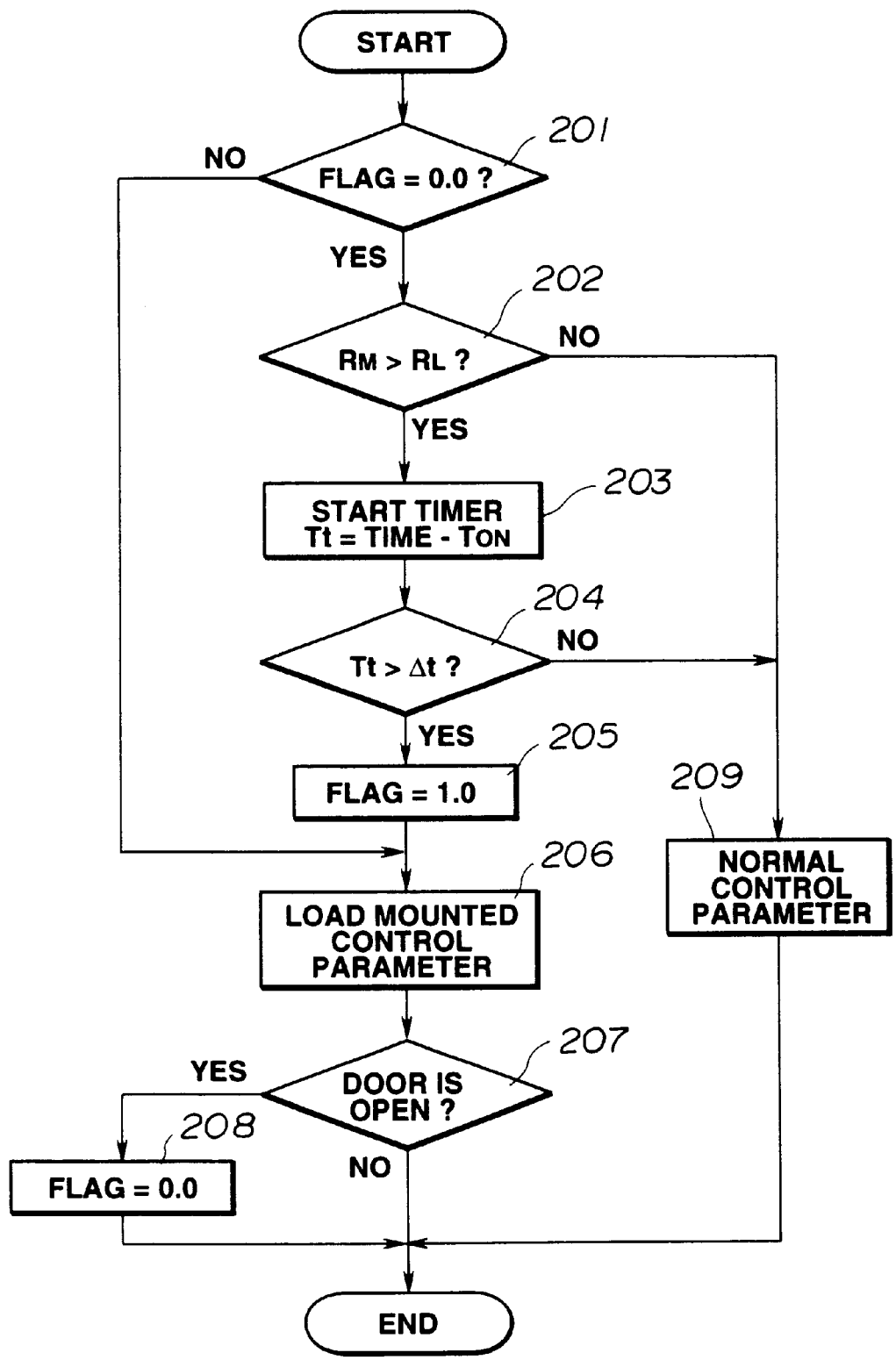
FIG. 34 is an operational flowchart for explaining the content of the switching operation control of the damping force characteristic (control parameter) based on the change in the weight of load applied to the vehicle body.

FIG. 34 shows an operation flowchart for deriving the control parameter to change the damping force characteristic of each shock absorber SA on the basis of the derived load mounted state determination signal $R_M$.

At a step 201 of FIG. 34, the CPU 4b determines a load mounted state determination flag Flag is reset to 0.0. If the Flag is reset to 0.0 at the step 201 of FIG. 34, the CPU 4b determines whether the load mounted state determination signal $R_M$ is in excess of the load mounted state determination threshold value $R_L$ at the next step 202 of FIG. 34. If YES ($R_M$>$R_L$ at the step 202 of FIG. 34, there is a possibility of the increase in the weight of load on the vehicle body and the routine goes to a step 203 of FIG. 34. At the step 203 of FIG. 34, the CPU 4b starts a timer stored in the memory 4e and the routine goes to a step 204 of FIG. 34 (Tt=TIME–$T_{ON}$).

At the step 204 of FIG. 34, the CPU 4b determines whether the count value of the timer Tt is in excess of a predetermined determination time delta t.

If YES at the step 204 of FIG. 34 and the CPU 4b assures that the increase of the weight of load on the vehicle body occurs, the routine goes to a step 205 of FIG. 34 in which the load mounted state determination flag Flag is set to 1.0 (FLAG=1.0).

After the CPU 4b sets the flag Flag to 1.0 at the step 205, the routine goes to a step 206 of FIG. 34 in which the control parameter is switched to the load mounted control parameter. Thereafter, the routine goes to a step 207 of FIG. 34 in which the CPU 4b determines whether any door of the vehicle is open.

If the door is open (opened) at the step 207, the CPU 4b determines that there is a possibility of changing the weight of load applied to the vehicle body and resets the above-described flag FLAG to 0.0 in order to restart the load mounted state determination of the steps 201 to 205 of FIG. 34 at the next control routine of FIG. 34. Then, the present routine is ended.

On the other hand, if NO at the step 201 of FIG. 34 (FLAG=1.0), the routine jumps to the step 206 of FIG. 34 in order to continue the control of the damping force at the large weight of load applied to the vehicle body omitting the steps of 202 to 205 of FIG. 34.

In addition, if NO at either of the steps of 202 or 204 of FIG. 34, the routine goes to a step 209 of FIG. 34 in which the control parameter at the normal weight of load is set since no increase in the weight of load from the normal weight of load occurs. Thereafter, the control flow of FIG. 34 is once ended.

Next, the content of the control operation of the switching control of the damping force characteristic based on the variation in the weight of load with reference to FIG. 35.

(A) The case where the occupant of the passenger compartment is only one, i.e., the driver only and no weight of load is mounted into the trunk compartment and the vehicle runs.

In this case, as shown in the timing chart of FIG. 35, the load mounted state determination signal $R_M$ is below the predetermined threshold value $R_L$ in the time zone I.

At this time, at the step 209 of FIG. 34, the control parameter is switched to the control parameter at the normal weight of load applied to the vehicle body. In details, the control gain included in the equations (4) and (5) to derive the target damping positions $P_T$ and $P_C$ described in the first embodiment is set to the basic gain. Consequently, the optimum damping force characteristic control is carried out on the basis of the Sky Hook control theory when the minimum weight of load is applied to the vehicle body. Thus, the vehicular comfort and steering stability can be assured.

(B) The case where a large quantity of weight of load is applied to the vehicle body (i.e., mounted into the trunk compartment).

In this case, as shown in FIG. 35, the time duration during which the level of the load mounted state determination signal is in excess of the predetermined threshold value $R_L$ is continued over the predetermined period of time $\Delta t$. At this time, the control parameter is switched to the control parameter at the full weight of load applied to the vehicle body at the step 209 of FIG. 34.

In details, the control gain included in the equations (4) and (5) used to derive the target damping force characteristic positions $P_T$ and $P_C$ is changed from the basic control gain to a corrected control gain whose value is larger than the basic control gain. Consequently, the values of $P_T$ and $P_C$ become larger.

It is noted that since the weight increase rate at the rear road wheel side becomes larger than that at the front road wheel side, the value of the corrected control gain for each of the two shock absorbers $SA_{FL}$ and $SA_{FR}$ located at the front left and right road wheels is smaller than that for each of the two shock absorbers $SA_{RL}$ and $SA_{RR}$ located at the rear left and right road wheels. In addition, once the control parameter is switched to either of the basic control gain or the corrected control gain, the switched control parameter remain unchanged at least until any door is opened. Hence, the worsening of the comfort and steering stability due to the increase in the weight of load can automatically be prevented.

Fifth Embodiment

The structure of the control apparatus for the vehicular suspension system in a fifth preferred embodiment is generally the same as that in the fourth embodiment.

In the fifth embodiment, however, the control parameter is continuously varied according to the variation in the load mounted state determination signal $R_M$ although, in the fourth embodiment, the control parameter is switched at the two values of the basic control gain and the corrected control gain.

Figure 36:
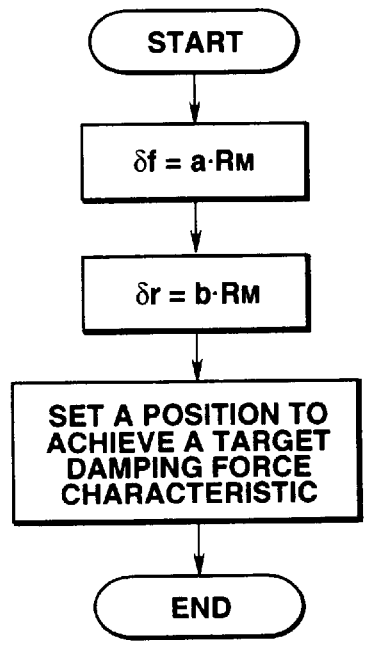
FIG. 36 is an operational flowchart for explaining the content of the switching control operation of the damping force characteristic (control parameter) based on the change in the weight of load applied to the vehicle body in a fifth preferred embodiment according to the present invention.
Figure 37:
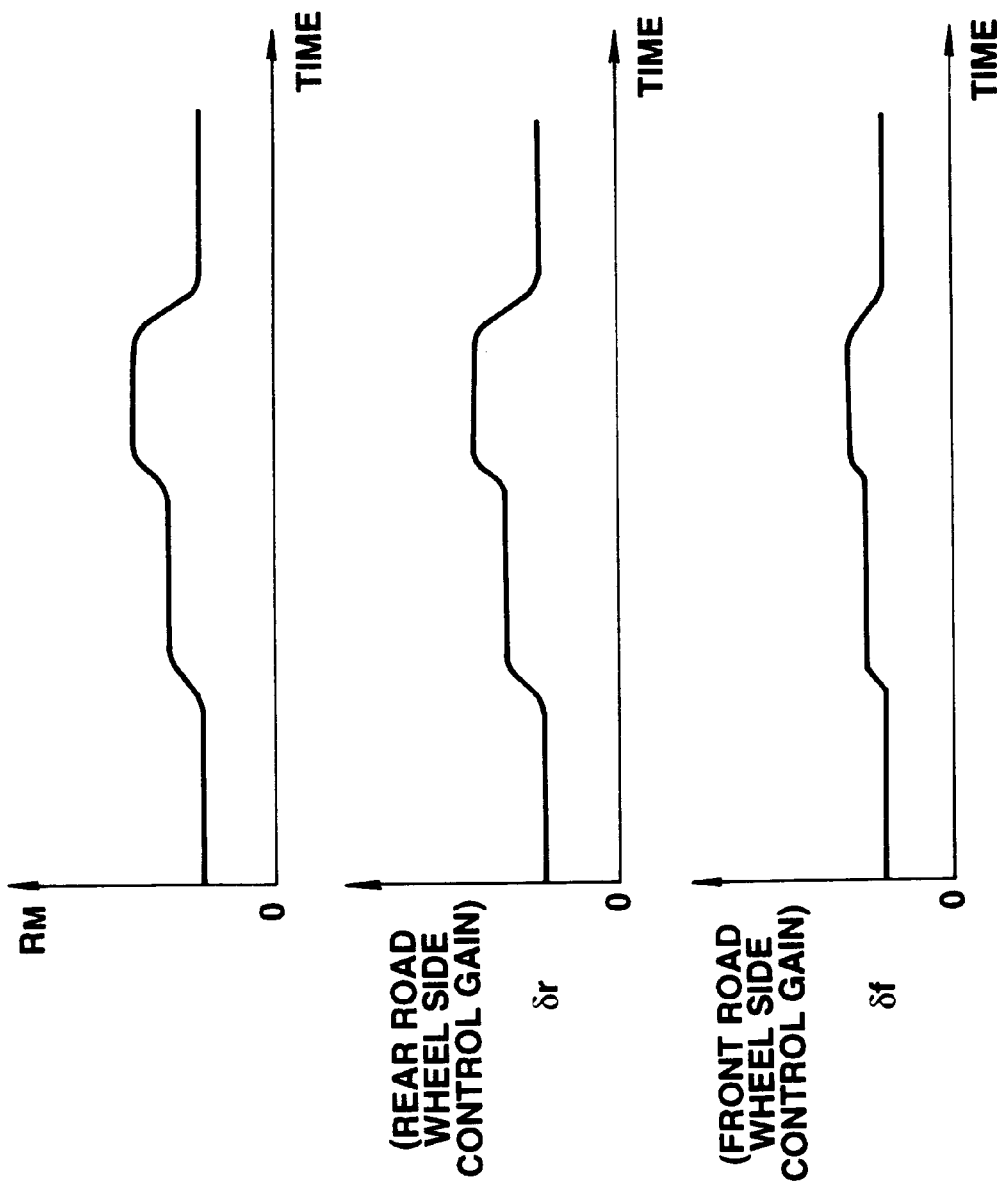
FIGS. 37A, 37B, and 37C are signal waveform charts for explaining the load mounted state determination signal ($R_M$), the control parameter ($\delta_r$) and the control parameter ($\delta_f$) in the fifth embodiment according to the present invention.

FIG. 36 shows an operational flowchart executed in the control unit 4 in the fifth embodiment and FIGS. 37A, 37B, and 37C show signal timing charts of the load mounted state determination signal $R_M$, rear road wheel side control gain, and the front road wheel side control gain, respectively.

At the first step of FIG. 36, the CPU 4b sets as the control gain of the target damping force characteristic position $P_T$ or $P_C$ applied to each of the two shock absorbers $SA_{FL}$ and $SA_{FR}$ the value of the load mounted state determination signal $R_M$ derived in the fourth embodiment multiplied by a front road wheel side constant a (=a×$R_M$). At the second step of FIG. 36, the CPU 4b sets as the control gain of the target damping force characteristic position $P_T$ or $P_C$ applied to each of the two shock absorbers $SA_{RR}$ and $SA_{RL}$ the value of the load mounted state determination signal $R_M$ multiplied by a rear road wheel side constant b (=b×$R_M$). It is noted that both constants a and b are positive constants and 0<a<b.

At the last step of FIG. 36, the CPU 4b derives the target damping force characteristic positions of $P_T$ and $P_C$ at both of the extension and compression phases by applying the derived control gains in FIG. 36 to the equations of (4) and (5) described in the first embodiment.

As described above, when the control gains are changed and set, the changes of the control gains are continuously varied according to the variation in the level of the load mounted state determination signal $R_M$.

Sixth Embodiment and Seventh Embodiment

In the fourth and fifth embodiments, the control gain is varied with respect to the variation in the load mounted state determination signal $R_M$ based on the change in the weight of load so that the control parameter is switched when the normal weight of load is applied and when the full weight of load is applied or according to the weight of load applied to the vehicle body.

In sixth and seventh preferred embodiments of the control apparatus for the vehicular suspension system, since the weight of load on the vehicle body is changed and the sprung mass resonance frequency is accordingly varied, the cutoff frequencies of the band pass filtered BPFs (B2 in FIG. 13) are switched in accordance with the variation of the sprung mass resonance frequency so that the control parameter is accordingly also switched.

Each of the other structures of the sixth and seventh embodiments is the same as those in the fourth embodiment.

That is to say, in the sixth embodiment, the cutoff frequencies that the above-described band pass filter BPF of the circuit block B2 in FIG. 13 are switched to the two stages.

Normal load mounted state - - - HPF ($f_H$=0.3 Hz), LPF ($f_L$=4 Hz)

Full load mounted state - - - HPF ($f_H'$=0.2 Hz), LPF ($f_L'$=3 Hz).

On the other hand, in the seventh embodiment, the cutoff frequencies of the band pass filter BPF of the circuit block B2 are varied at the unlimited stage according to the variation in the load mounted state determination signal $R_M$ based on the change in the load mounted state according to the following equations (15), (16), and equations (17) and (18).

$$f_H' = \gamma \times f_H \quad (15)$$

$$f_L' = \epsilon \times f_L \quad (16)$$

$$\gamma = m/\sqrt{R_M} \quad (17)$$

$\epsilon = n/\sqrt{R_M}$, wherein $\gamma$, $\epsilon$, m and n denote the positive constants.

The same advantages as those in the fourth and fifth embodiment can be achieved in the sixth and seventh embodiments.

Eighth Embodiment

Figure 38:
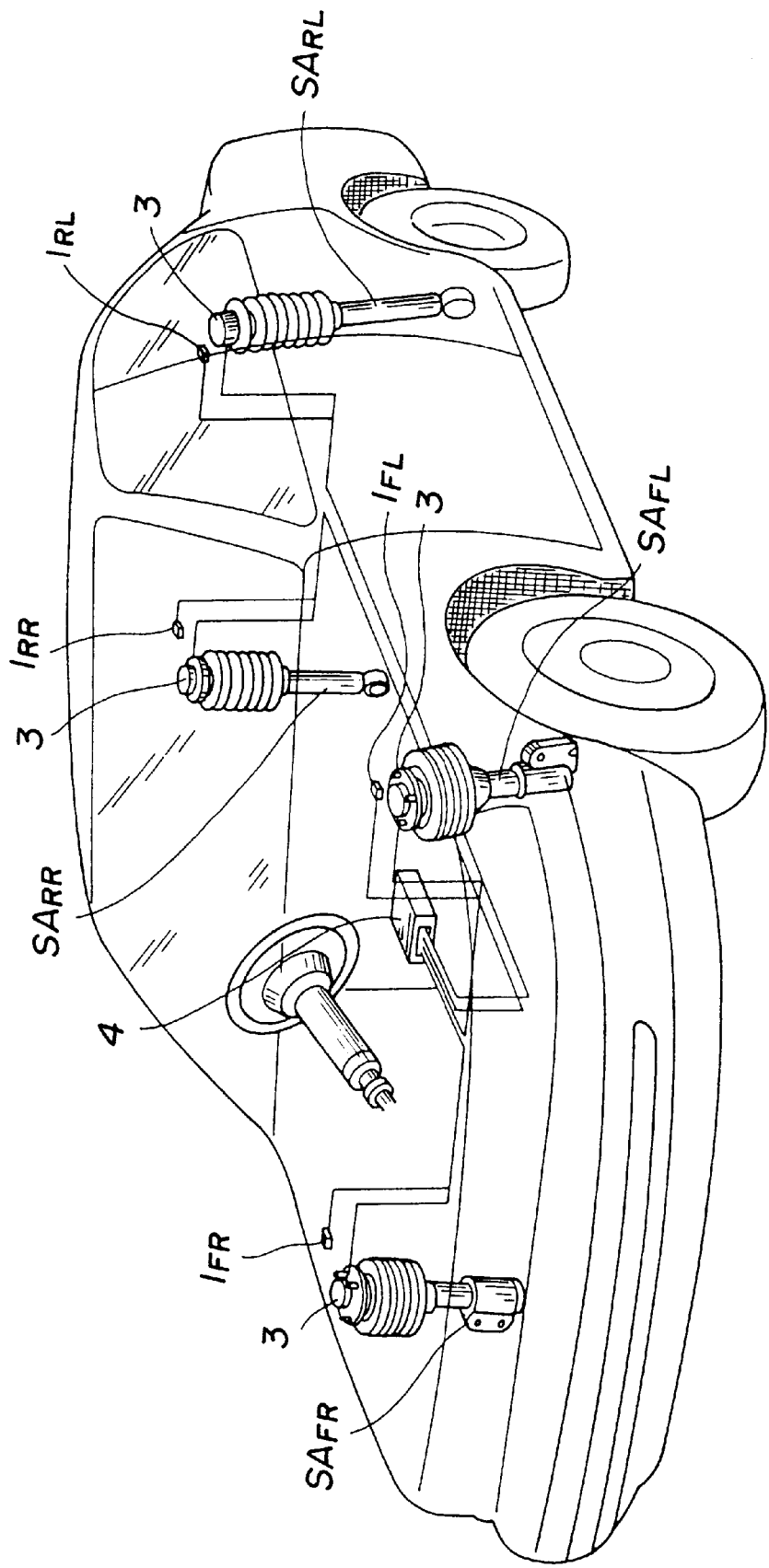
FIG. 38 is an explanatory view of the arrangement of the control apparatus for the vehicular suspension system in an eighth preferred embodiment according to the present invention.
Figure 39:
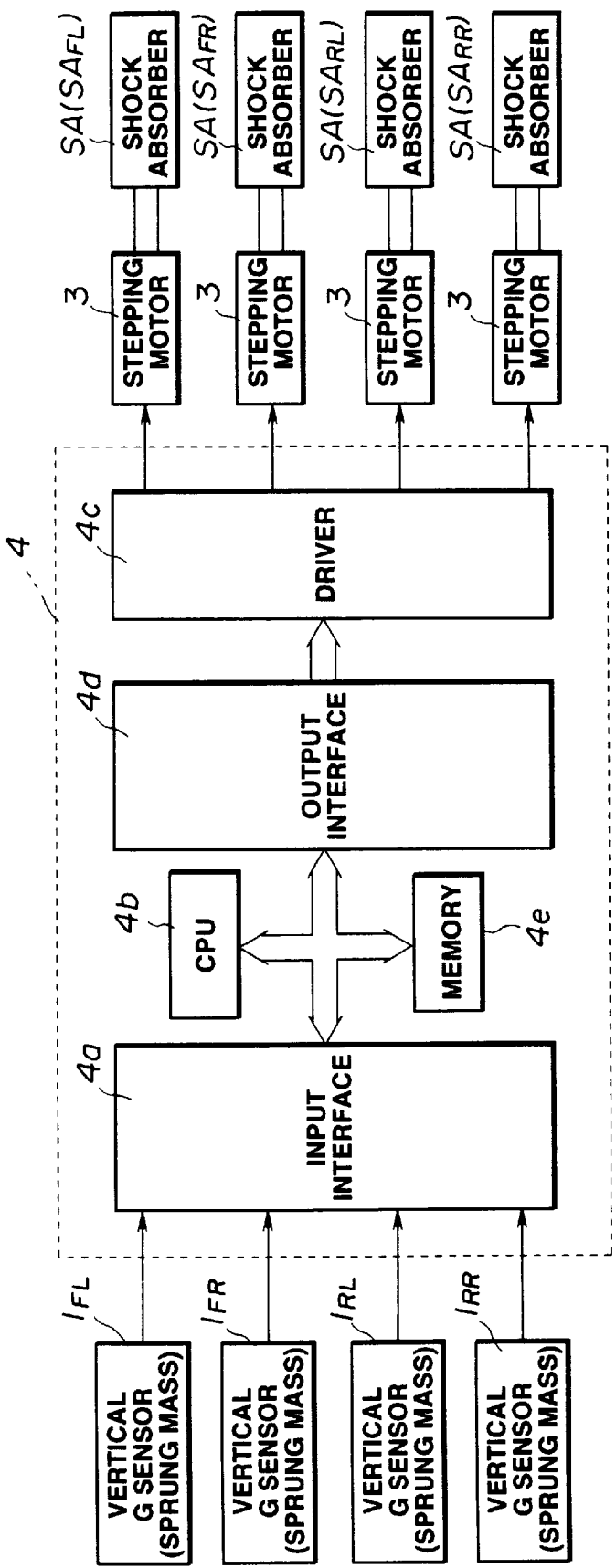
FIG. 39 is a circuit block diagram of the control apparatus for the vehicular suspension system in the eighth embodiment according to the present invention.

FIGS. 38 and 39 show the system configuration of the control apparatus for the vehicular suspension system in an eighth preferred embodiment according to the present invention.

As shown in FIGS. 38 and 39, the structure of the control apparatus for the vehicular suspension system according to the present invention is generally the same as that in the first preferred embodiment.

However, since the derivation of the load mounted state determination signal $R_M$ is different from that in the case of the first embodiment, the derivation of the load mounted state determination signal $R_M$ will be described below with reference to FIG. 40.

Figure 40:
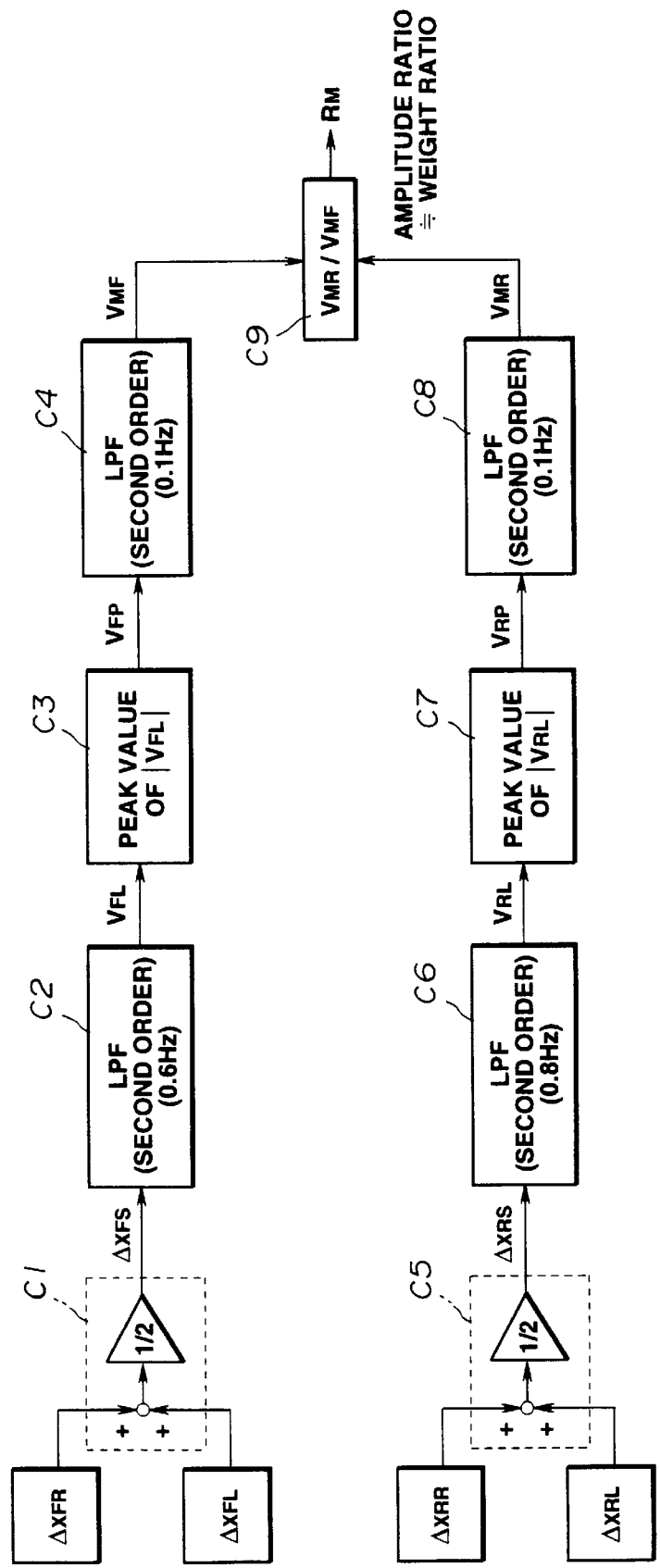
FIG. 40 is a circuit block diagram of a signal processing circuit of the control unit for deriving the load mounted state determination signal ($R_M$) in the case of the eighth preferred embodiment.

In details, in FIG. 40, the sprung mass vertical velocity $\Delta x_{FL}$ at the vehicle body located at the front left road wheel and derived from the band pass filter of the circuit block B2 of FIG. 13 is added into the sprung mass vertical velocity $\Delta x_{FR}$ at the vehicle body located at the front right road wheel and derived from the band pass filter of the circuit block B2 of FIG. 13 by means of a summer of FIG. 40 and both vertical velocity values are averaged to derive the sprung mass vertical velocity $\Delta xFS$ at the center position of the vehicle body between the front left and right road wheels at the circuit block of C1 of FIG. 40.

On the other hand, at a circuit block of C5, the sprung mass vertical velocity $\Delta x_{RL}$ at the vehicle body located at the rear left road wheel and derived from the circuit block B2 of FIG. 13 is added to the sprung mass vertical velocity $\Delta x_{RR}$ at the vehicle body located at the rear right road wheel and derived at the rear right road wheel by means of the summer and both velocity signals are averaged to derive the sprung mass vertical velocity signals $\Delta xRS$ at the vehicle body located at the center position of the vehicle body in the same way as the circuit block C2 of FIG. 40.

A circuit block C2 of FIG. 40 includes a second-order low pass filter (LPF) having a cutoff frequency of 0.6 Hz used to derive the low pass filtered signal component of $V_{FL}$ (the signal component equal to or below the sprung mass resonance frequency) from the $\Delta xFS$.

A circuit block C6 of FIG. 40 includes a second-order low pass filter (LPF) having a cutoff frequency of 0.8 Hz used to derive the low pass filtered signal component of $V_{RL}$ (the signal component equal to or below the sprung mass resonance frequency) from the $\Delta xRS$.

A circuit block C3 of FIG. 40 includes an absolute value detector used to derive the peak value $V_{FP}$ of the absolute value of the low pass filtered signal $V_{FL}$. A circuit block C7 of FIG. 40 includes an absolute value detector used to derive the peak value $V_{RP}$ of the absolute value of the low pass filtered signal component $V_{RL}$. The peak value derived at either of the circuit blocks C3 or C7 corresponds to the amplitude of the vertical status variable of the vehicle.

A circuit block of C4 in FIG. 40 includes a second-order low pass filter having a cutoff frequency of 0.1 Hz used to derive a moving average $V_{MF}$ of the peak value of the absolute value of the low pass filtered signal component $V_{FL}$. A circuit block of C8 of FIG. 40 includes a second-order low pass filter having a cutoff frequency of 0.1 Hz used to derive a moving average $V_{MR}$ of the peak value of the absolute value of the low pass filtered signal component $V_{RL}$.

Then, at a circuit block C9 of FIG. 40, the signal ratio of $V_{MR}/V_{MF}$ is derived to determine the weight ratio ($R_M$) indicating the amplitude ratio between the respective sprung mass vertical velocity signals at the first and second center positions between the front left and right road wheels and between the rear left and right road wheels.

The amplitude ratio approximately equals to the weight ratio denoted by $R_M$. In this way, the load mounted state determination signal $R_M$ is determined in the eighth embodiment.

From the amplitude ratio $R_M$ of both sprung mass vertical velocity signals at the first and second center positions of the vehicle body, the front-and-rear weight ratio of the second center position to the first center position can simply be determined from the amplitude ratio $R_M$ of both sprung mass vertical velocity signals at the first and second center positions of the vehicle body on the basis of the following reason.

Referring back to FIG. 18, the amplitude of x of the sprung mass behavior can be represented in an equation (18). In FIG. 18, u denotes the road surface input and expressed as u=A sinωt, (ω=2πf).

$$x = A\sqrt{\{(k^2+(c\omega)^2)/((k-m\omega)^2+(c\omega)^2)\}} \quad (18)$$

In the equation (18), if k−mω²>0 - - - (19), as the sprung mass m is increased, the value of (k−mω²) is reduced, and the amplitude x of the sprung mass x is increased. On the contrary, as the sprung mass m is reduced, the value of ($k-m\omega^2$) is increased and the amplitude x of the sprung mass behavior x is reduced.

The inequality condition of the equation of (19) can be replaced with the following numerical equations (20) and (21).

$$\omega < \sqrt{k/m} \tag{20}$$

$$f < (1/2\pi)\sqrt{k/m} (=\text{resonance frequency}) \tag{21}$$

Hence, if the frequency component below the sprung mass resonance frequency is limited, as the front road wheel side sprung mass/rear road wheel side sprung mass is increased, the amplitude of the front road wheel side displacement/the amplitude of the sprung mass displacement at the rear road wheel side is increased, and the amplitude of the sprung mass front road wheel side vertical velocity/the amplitude of the sprung mass vertical velocity at the rear road wheel side is decreased.

The front-and-rear road wheel side weight ratio between the front road wheel side weight and the rear road wheel side weight can simply be determined by the amplitude ratio $R_M$ between the front road wheel side sprung mass vertical velocity and the rear road wheel side sprung mass vertical velocity (weight ratio is approximately equal to the amplitude ratio ($R_M$).

The timing chart of FIG. 35 is applicable to the eighth embodiment and the operational flowchart of FIG. 34 is applicable to the eighth embodiment.

Ninth Embodiment

In a ninth preferred embodiment of the control apparatus for the vehicular suspension system, the derivation of the load mounted state determination signal $R_M$ is different from that derived in the eighth embodiment.

Figure 41:
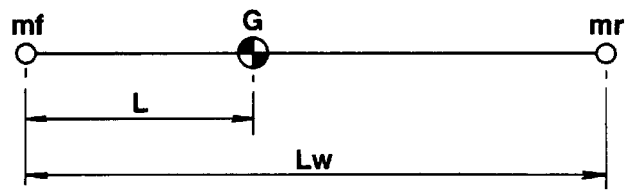
FIG. 41 is an explanatory view for explaining the distance of the weight center of the vehicle from the front road wheel mounted position to derive the load mounted state determination signal in a ninth preferred embodiment according to the present invention.

FIG. 41 shows the movement of the weight center G position based on the change in the weight of load applied to the vehicle body.

The distance L from the front tower position to the position of the weight center G can be determined in the following equation (22).

$$L = (mr/(mf+mr)) \cdot Lw \tag{22}$$

Hence, the length L can be approximated in the same way as the weight ratio with the numerical equation.

$$L \approx \text{(amplitude of the rear road wheel side sprung mass vertical velocity)/(amplitude of the front road wheel side sprung mass vertical velocity)+(amplitude of the rear road wheel side sprung mass vertical velocity)} \cdot Lw \tag{23}$$

In details, in the ninth embodiment, the approximation value of the distance L (variation state of the weight center position) from the front road wheel side tower position upto the weight center position G can be determined.

$$L \approx (V_{MF}/(V_{MF}+V_{MR})) \cdot Lw \tag{24}$$

Then, at the step 202 of FIG. 34, in the ninth embodiment, the distance L is compared with the reference value so as to determine the changed state of the weight of load applied to the vehicle body.

Tenth Embodiment

The structure of the control apparatus for the vehicular suspension system in a tenth preferred embodiment is generally the same as that in the first embodiment.

However, since the derivation of the load mounted state determination signal $R_M$ is different from that in the case of the eighth embodiment, the derivation of the load mounted state determination signal $R_M$ will be described with reference to FIG. 42.

Figure 42:
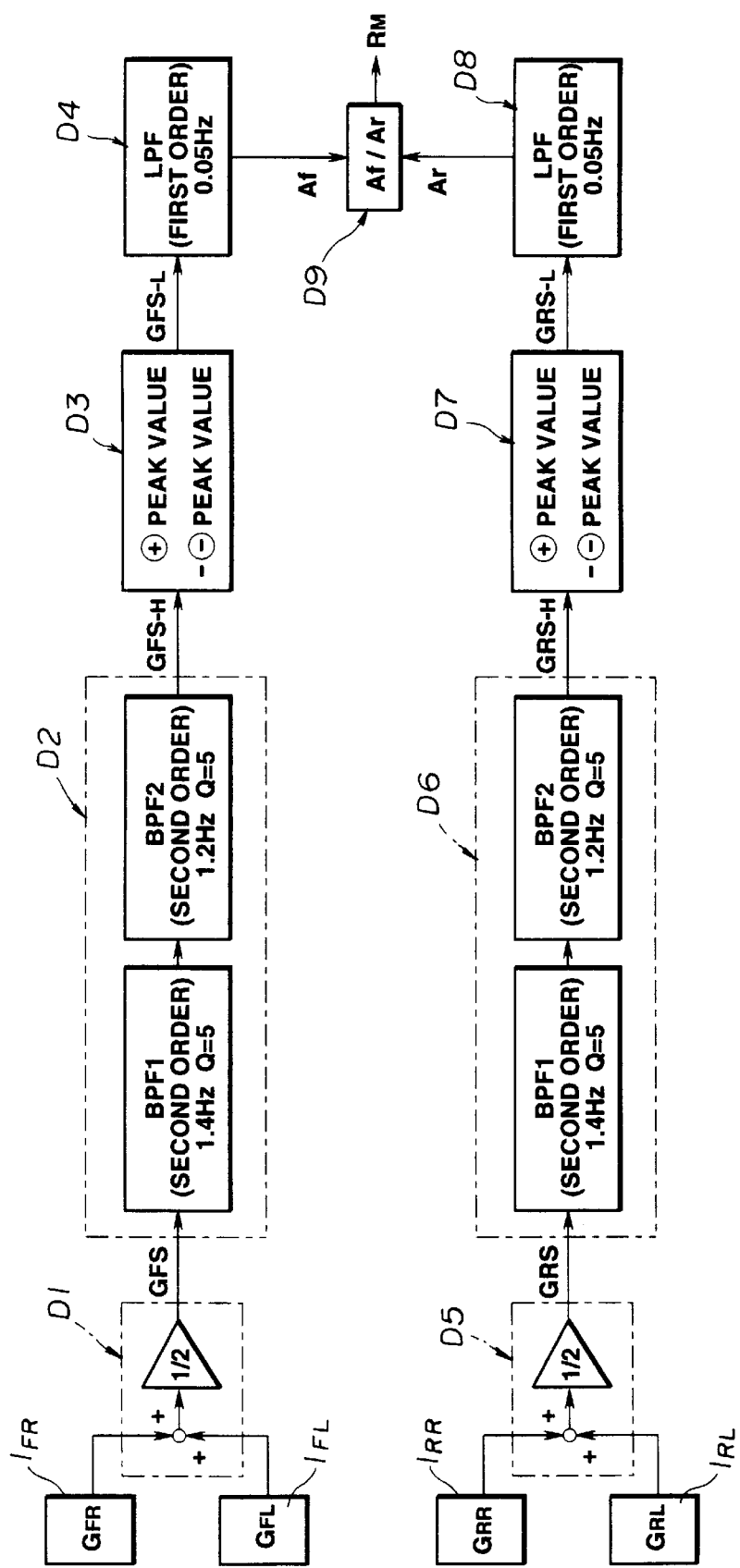
FIG. 42 is a circuit block diagram of a signal processing circuit arranged for deriving the load mounted state determination signal ($R_M$) as an amplitude ratio (Ar/Ar) in a tenth preferred embodiment of the control apparatus for the vehicular suspension system according to the present invention.

FIG. 42 shows the circuit block diagram of the signal processing circuit in a tenth preferred embodiment according to the present invention.

At a circuit block D1 of FIG. 42, the sprung mass vertical acceleration GFS at the first center position of the vehicle body is derived according to the average value between the sprung mass vertical acceleration signals $G_{FR}$ and $G_{FL}$ detected by the sprung mass vertical acceleration sensors located at the front left and right road wheels.

At a circuit block D5 of FIG. 42, the sprung mass vertical acceleration GRS at the second center position of the vehicle body is derived according to the average value between the sprung mass vertical acceleration signals $G_{RR}$ and $G_{RL}$ detected by the sprung mass vertical acceleration sensors located at the rear left and right road wheels.

At a circuit block D2 of FIG. 42, the two-cascade connected band pass filters BPF1 and BPF2 are included so as to extract dead point frequency components $GFS_{-H}$ and $GRS_{-H}$ of the sprung mass vertical acceleration signals GFS and GRS at the first and second center positions. That is to say, the second-order band pass filter BPF1 having the cutoff frequency of 1.4 Hz and having the sharpness (selectivity) of Q (=5) is used and the second-order band pass filter BPF2 having the cutoff frequency of 1.2 Hz and having the sharpness (selectivity) of Q (=5) is used.

In details, the second-order band pass filter BPF1 has the lower frequency side cutoff frequency of 1.4 Hz which is a dead point frequency when the normal weight of load is applied to the vehicle body and the second-order band pass filter BPF2 has the lower frequency side cutoff frequency of 1.2 Hz which is a dead point frequency when the full weight of load is applied to the vehicle body.

Figure 43:
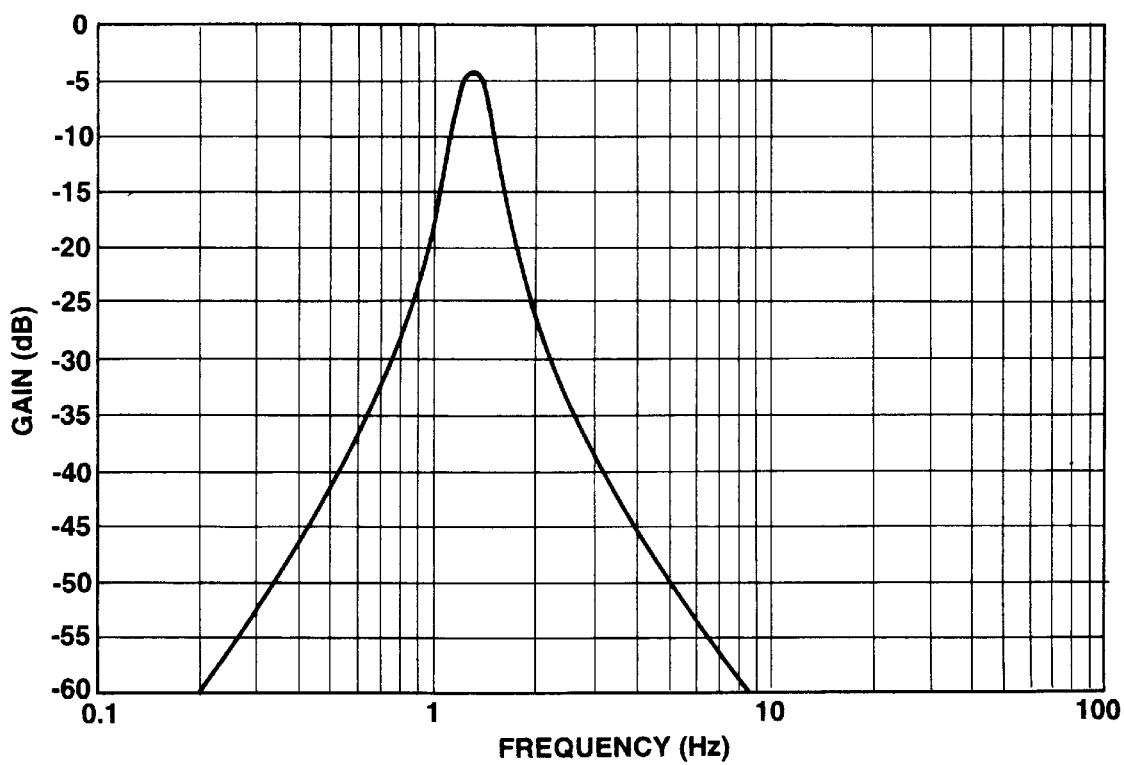
FIG. 43 is a characteristic graph of the gain of the band pass filters (BPF1 and BPF2) used in the tenth embodiment.

FIG. 43 shows the gain characteristic of each of the two-cascade connected band pass filters BPF1 and BPF2.

As shown in FIG. 43, the gain is emphasized at the frequency band from 1.2 Hz to 1.4 Hz.

At a circuit block D6 of FIG. 42, the two-cascade connected band pass filters BPF1 and BPF2 are included in the same way as the circuit block D2 of FIG. 42.

At respective circuit blocks D3 and D7 of FIG. 42, the low frequency wave processed signals $GFS_{-L}$ and $GRS_{-L}$ indicating variation states of the amplitudes between the plus peak value and the minus peak value of the band pass filtered signal components $GFS_{-H}$ and $GRS_{-H}$ are determined.

That is to say, the peak values at each of the plus side and the minus side of the band pass filtered frequency components $GFS_{-H}$ and $GRS_{-H}$ are detected and updated. Until the subsequent peak value is detected, its peak value is updated. Then, the subtractions of the minus peak values from the plus peaks value are carried out and memorized so that the low frequency wave processed signals $GFS_{-L}$ and $GRS_{-L}$ are derived.

A circuit block D4 has the first-order low pass filter LPF having the cutoff frequency of 0.05 Hz.

A circuit block D8 has the first-order low pass filter LPF having the cutoff frequency of 0.05 Hz.

The low pass filtered moving averaged signal components Af and Ar derived by the first-order low pass filters LPFs and corresponding to the amplitudes of the sprung mass vertical velocity signals are derived and used to derive the load mounted state determination signal $R_M$.

$$R_M = Af/Ar \tag{22}$$

FIGS. 44A and 44B show the band pass filtered signal components GFS$_H$ (GRS$_H$) and the peak value detection values of GFS$_L$ and GRS$_L$, respectively.

Suppose the vehicular behavior in the model of FIG. 18. The sprung mass transmissibility x/u from the road surface input u is appreciated from FIGS. 45A and 45B.

FIGS. 45A and 45B show the sprung mass transmissibility characteristics of the road surface input frequency at the front road wheel side and the sprung mass transmissibility characteristics of the road surface input frequency at the rear road wheel side, respectively.

The solid lines of FIGS. 45A and 45B denote the sprung mass transmissibility characteristics when the normal weight of load is applied to the vehicle body and the dotted lines of FIGS. 45A and 45B denote the sprung mass transmissibility characteristics when the full weight of load is applied to the vehicle body.

When the normal weight of load is applied to the vehicle body, there is almost no variation in the level from the sprung mass transmissibility when the full weight of load is applied to the vehicle body, as shown in FIG. 45A.

On the other hand, in the case of the rear road wheel side, the gain of the sprung mass transmissibility when the normal weight of load is applied to the vehicle body becomes remarkably different from that when the full weight of load is applied to the vehicle body, as shown in FIG. 45B.

Then, when the vehicular behavior x, for example, the 1.4 Hz frequency component is extracted, the following relationships are established:

When the sprung mass m becomes larger, the transmissibility (x/u) becomes smaller.

When the sprung mass m becomes smaller, the transmissibility (x/u) becomes larger.

If the front road wheel side road surface input uf is the same as the rear road wheel side road surface input ur, weight ratio (mr/mf)≈(xf/uf)/(xr/ur)=xf/xr.

The level variation in the frequency range from 1.2 Hz to 1.4 Hz in FIG. 45B corresponds to the low pass filtered moving average processed signal component Ar at the rear road wheel side and the level variation in the frequency range from 1.2 Hz to 1.4 Hz corresponds to the low pass filtered moving average processed signal component Af at the front road wheel side.

The value of the load mounted state determination signal R$_M$ (=Af/Ar) is varied proportionally with the change in the weight of load applied to the vehicle body.

Hence, the front-and-rear weight ratio between the front road wheel side weight and the rear road wheel side weight can simply be determined according to the amplitude ratio (load mounted state determination signal R$_M$) between the amplitudes of the front road wheel side sprung mass vertical acceleration and the rear road wheel side sprung mass vertical acceleration.

(Weight ratio≈amplitude ratio)

The dead point frequency means the road surface input frequency at which the transmissibility from the road surface input to the sprung mass is not changed although the damping force characteristic exhibited by the shock absorber SA is varied.

Figure 46:
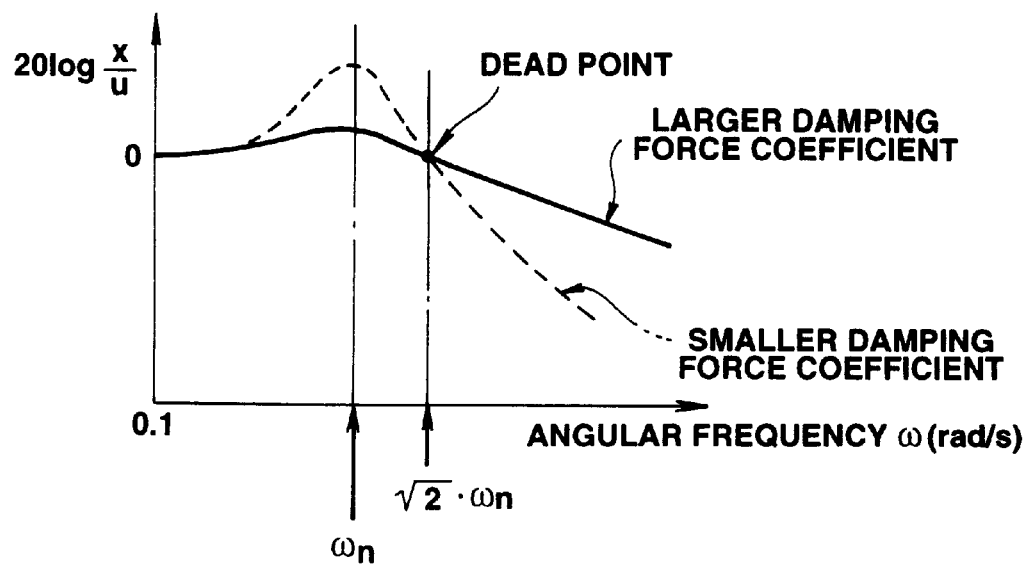
FIG. 46 is an explanatory view of the sprung mass resonance frequency and dead point frequency to explain an operation in an eleventh embodiment of the control apparatus for the vehicular suspension system according to the present invention.

FIG. 46 shows the sprung mass transmissibility characteristic with respect to the road surface input frequency. The dotted line in FIG. 46 denotes the sprung mass transmissibility characteristic when the damping force characteristic becomes large and the solid line in FIG. 46 denotes the sprung mass transmissibility characteristic when the damping force characteristic becomes small.

Suppose the model of FIG. 18. In this case, the dead point frequency can be determined by the following equation (22).

$$\text{Dead point frequency} = \sqrt{2} \cdot \omega_n \quad (23),$$

wherein $\omega_n$ denotes the sprung mass resonance frequency.

The sprung mass transmissibility of the dead point frequency indicates 0 [dB].

Hence, in the tenth embodiment, in a case where the load mounted state is determined by the amplitude level of the sprung mass, the determination of the load mounted state is carried out by using the frequency component placed in the vicinity to the dead point frequency without effect of the damping force characteristic of the corresponding one of the shock absorbers SA to carry out the more accurate determination of the change in the weight of load applied to the vehicle body.

Eleventh Embodiment

In an eleventh embodiment of the control apparatus for the vehicular suspension system, the control gain δ is varied in proportion to the magnitude of the load mounted state determination signal R$_M$ derived in the eighth, the ninth, or tenth embodiment as shown in FIG. 36.

FIG. 36 is already explained in the case of the sixth embodiment according to the present invention.

Alternatives

The amplitude of the vertical status variable may include that of the sprung mass vertical velocity, that of the sprung mass vertical acceleration, that of the relative velocity between the sprung mass and unsprung mass, and that of the relative acceleration between the sprung mass and unsprung mass.

It is noted that by utilizing the relation in the case of A (equation (24)) used in the equation (18), the determination of the load mounted state may be carried out by extracting the further high frequency side.

$$\omega > \sqrt{k/m} \quad (24)$$

In addition, when the variation rate of the vehicle speed is derived and the derived variation rate is in excess of the predetermined threshold value, the determination of the change in the weight of load applied to the vehicle body may be halted.

Although the variable setting of the control gain is carried out for all of the shock absorbers SA, the variable setting of the control gain may be carried out for either the front road wheel side shock absorbers or the rear road wheel side shock absorbers.

It is also noted that although the soft region SS is entered only when the sprung mass vertical velocity signal indicates zero, a predetermined dead zone is provided with zero as a center. While the sprung mass vertical velocity is maintained within the dead zone, the damping force characteristics at both extension and compression phases are maintained in the soft region SS so that the control hunting can be prevented.

In summary, in an apparatus for a vehicular system according to the present invention, a control gain of the control signal to be outputted to the vehicular system is varied according to the determination of whether a weight of a load applied to a vehicle body is changed from the originally designed weight of load to a present weight of load applied to the vehicle body.

Although the present invention is applicable to the vehicular suspension system as in each of the embodiments, the present invention in which the determination of whether the change in weight of load applied to the vehicle body occurs is also applicable to an anti-skid control system or another vehicular system.

What is claimed is:

1. An apparatus for an automotive vehicle, comprising:

at least two vehicular vertical acceleration detecting devices, a first of the vehicular vertical acceleration devices being arranged at one of a front left road and a front right road wheel side for detecting a vertical acceleration of a first vehicle body portion at the front road wheel side, and a second of the vehicular vertical acceleration devices being arranged at one of a front left and a front right rear road wheel side for detecting a vertical acceleration of a second vehicle body portion at the rear road wheel side; and a control unit arranged for generating a load mounted state determination signal on a basis of the respective vertical accelerations at the front and rear road wheel sides, determining whether a change in a weight of load applied to a vehicle body between an originally designed vehicular weight and a present vehicular weight occurs on the basis of the generated load mounted state determination signal, and generating and outputting a control parameter as a control signal to a vehicular system, the control parameter being varied when determining that the change in the weight of load applied to the vehicle body occurs.

2. An apparatus for an automotive vehicle as claimed in claim 1, wherein said control unit sets a predetermined threshold value, calculates a number of times the load mounted state determination signal has exceeded the predetermined threshold value within a predetermined load mounted state determination period of time, and determines whether the change in the weight of load applied to the vehicle body between the originally designed weight of load and the present weight of load occurs according to the number of times calculated.

3. An apparatus for an automotive vehicle as claimed in claim 1, wherein said control unit determines amplitudes of the respective vertical accelerations detected by said at least two vehicular vertical acceleration detecting devices, determines a varied state of a front-road-wheel-side-and-rear-road-wheel-side weight ratio in the vehicle according to a compared value of front-road-wheel-side-and-rear-road-wheel-side amplitudes which is a comparison between the amplitudes of the respective vertical accelerations, and generates the load mounted state determination signal which is derived from the determined varied state of the front-road-wheel-side-and-rear-road-wheel-side weight ratio.

4. An apparatus for an automotive vehicle as claimed in claim 1, wherein said control unit determines amplitudes of signals corresponding to the respective vehicle accelerations detected by said at least two vehicular vertical acceleration detecting devices, determines a varied state of a center of gravity of the vehicle according to the amplitudes of the signals corresponding to the respective vehicle accelerations, and generates the load mounted state determination signal which is derived from the varied state of the center of gravity of the vehicle.

5. An apparatus for an automotive vehicle as claimed in claim 1, wherein said control unit estimates a vertical acceleration of the vehicle body at the rear road wheel side on the basis of predetermined transfer functions from the detected vertical accelerations at the front road wheel side, derives a compared value between the estimated vertical acceleration and the actually detected vertical acceleration at the rear road wheel side, and generates the load mounted state determination signal which is derived from the compared value therebetween.

6. An apparatus for an automotive vehicle as claimed in claim 1, wherein said control unit calculates a distance from a reference position of the vehicle to an instantaneous rotation center of the vehicle body according to the detected vertical accelerations, derives a moving average of the distance from the reference position to the instantaneous rotation center, and generates the load mounted state determination signal which is derived from the moving average of the distance.

7. An apparatus for an automotive vehicle as claimed in claim 1, wherein said control unit determines variation rates of both of plus and minus peak values of the vertical accelerations at the front and rear road wheel side, derives a compared value between the variation rates of the respective plus and minus peak values, and generates the load mounted state determination signal which is derived from the compared value therebetween.

8. An apparatus for an automotive vehicle as claimed in claim 1, wherein said vehicular system comprises a vehicular suspension system having a plurality of shock absorbers, each shock absorber being interposed between a sprung mass of the vehicle body and an unsprung mass of a corresponding one of the front left and right road wheels and the rear left and right road wheels, and a plurality of actuators, each actuator being connected to a corresponding one of the shock absorbers and being responsive to the control signal so as to control a damping force characteristic of the corresponding one of the shock absorbers to exhibit a target damping force characteristic according to the control signal, and wherein said apparatus for the automotive vehicle comprises four vehicular vertical acceleration detecting devices, wherein a third of said vehicular vertical acceleration detecting devices is arranged at the other of the front left and right road wheels and wherein a fourth of said vehicular vertical acceleration detecting devices is arranged at the other of the rear left and right road wheels for detecting a vertical acceleration of the vehicle body at the other of the front left and right road wheel sides and the other of the rear left and right road wheel sides, and said control unit generates and outputs the control signal on the basis of the detected vertical accelerations of the four vehicular vertical acceleration detecting devices, the control signal having a control gain varied when the change in the weight of load applied to the vehicle body occurs.

9. An apparatus for an automotive vehicle as claimed in claim 8, wherein said control unit derives a first sprung mass vertical velocity signal ($\Delta_{XFS}$) at a first center portion of the vehicle body between first and second sprung mass vertical acceleration devices respectively arranged at the front left and right road wheels from an average of first and second sprung mass vertical acceleration signals respectively output by the first and second vertical sprung mass acceleration devices arranged at the front left and right road wheels, derives a first low pass filtered signal component ($V_{FL}$) from the first sprung mass vertical velocity signal ($\Delta_{XFS}$), derives each peak value of an absolute value of the first low pass filtered signal component, derives a first moving averaged signal component ($V_{MF}$) from the peak value of the absolute value of the first low pass filtered signal component, derives a second sprung mass vertical velocity signal ($\Delta_{XRS}$) at a second center portion between third and fourth sprung mass vertical acceleration devices respectively arranged at the rear left and right road wheels and which respectively output third and fourth sprung mass vertical acceleration signals, derives a second low pass filtered signal component ($V_{RL}$)

from the third and fourth sprung mass vertical acceleration signals, derives a second moving averaged signal component ($V_{MR}$) from each peak value of the absolute value of the first low pass filtered signal component, and derives the load mounted state determination signal ($R_M$) from both of the first and second moving averaged signal components.

10. An apparatus for an automotive vehicle as claimed in claim 9, wherein said load mounted state determination signal $R_M$ is expressed as follows: $R_M = V_{MF}/V_{MR}$.

11. An apparatus for an automotive vehicle as claimed in claim 9, wherein said load mounted state determination signal $R_M$ is expressed as follows:

$$R_M = (V_{MF})/(V_{MF}+V_{MR}) \cdot Lw,$$

wherein Lw denotes a wheel base length.

12. An apparatus for an automotive vehicle as claimed in claim 8, wherein said control unit sets a predetermined threshold value ($R_L$) and determines whether a level of said load mounted state determination signal ($R_M$) exceeds the predetermined threshold value and whether a time duration during which the level of the load mounted state determination signal is continued for a predetermined period of time ($\Delta t$) to determine whether the change in the weight of load applied to the vehicle body occurs from the originally designed weight of load applied to the vehicle body.

13. An apparatus for an automotive vehicle as claimed in claim 8, wherein said four vehicular vertical acceleration detecting devices comprise four sprung mass vertical accelerations sensors, each sensor being arranged at the corresponding one of the front left and right road wheels and the rear left and right road wheels for detecting a vertical acceleration of the sprung mass and for outputting a respective sprung mass vertical acceleration signal, and wherein said control unit determines whether the change in the weight of load applied to the vehicle body occurs according to the sprung mass vertical accelerations detected by the first and second vehicular vertical acceleration detecting devices respectively arranged at the front left and right road wheels and one of the third and fourth vehicular vertical acceleration detecting devices respectively arranged at the rear left and right road wheels.

14. An apparatus for an automotive vehicle as claimed in claim 13, wherein said control unit determines a sprung mass vertical velocity ($\Delta x$) and a relative velocity ($\Delta x - \Delta x_0$) between the sprung mass and the unsprung mass according to a signal indicating the detected sprung mass vertical acceleration by the corresponding one of the sprung mass vertical acceleration sensors and outputs the control parameter as a control signal to the corresponding one of the actuators according to the determined sprung mass vertical velocity and of the determined relative velocity and according to the determination of whether the change in the weight of load applied to the vehicle body occurs.

15. An apparatus for an automotive vehicle as claimed in claim 14, wherein said control unit derives a first sprung mass vertical acceleration signal ($G_{FS}$) at a first center portion of the vehicle body between the sprung mass vertical accelerations detected by the first and second sprung mass vertical acceleration sensors respectively arranged at the front left and right road wheels and a second sprung mass vertical acceleration signal ($G_{RS}$) at a second center portion of the vehicle body between the third and fourth sprung mass vertical acceleration sensors respectively arranged at the rear left and right road wheels, derives a first band pass filtered signal component ($GFS_H$) from the first sprung mass vertical acceleration signal and derives a second band pass filtered signal component ($GRS_H$) from the second sprung mass vertical acceleration signal, derives a first low pass filtered signal component ($GFS_L$) indicating an amplitude between a peak value and a minus peak value of the first band pass filtered signal component and derives a second low pass filtered signal component ($GRS_L$) indicating an amplitude between a plus peak value and a minus peak value of the second band pass filtered signal component, derives a first moving averaged signal component (Af) from the first low pass filtered signal component ($GFS_L$) and a second moving averaged signal component (Ar) from the second low pass filtered signal component ($GRS_L$), derives the load mounted state determination signal ($R_M$) from a distance of L between a position of the vehicle body at which the front left or right road wheel is mounted and a position of the vehicle body which is a center of gravity of the vehicle, the distance L being expressed as L=(Af/(Af+Ar))*Lw, wherein Lw denotes a wheel base length.

16. An apparatus for an automotive vehicle as claimed in claim 14, wherein said control unit outputs the respective control signals to two of the actuators for the shock absorbers arranged at the front left and right road wheels, each control signal therefor having a control gain ($\delta_f$) which is varied according to the level of the load mounted state determination signal ($R_M$) multiplied by a constant a, and wherein said control unit outputs the respective control signals to two of said actuators for the shock absorbers arranged at the rear left and right road wheels, each control signal having the control parameter which is varied according to the level of the load mounted state determination signal ($R_M$) multiplied by a constant b (0<a<b).

17. An apparatus for an automotive vehicle as claimed in claim 16, which further comprises a vehicle speed sensor arranged for detecting a vehicle speed (Sv) and wherein said first transfer function $G_{B(S)}$ is expressed as follows:

$$G_{B(S)} = G_{1(S)} \cdot G_{2(S)} \cdot G_{3(S)},$$

wherein $G_{1(S)}$ denotes a transfer function from the portion of the vehicle body arranged at the first center of the front left and right road wheels to the road surface on which the vehicle is running, $G_{2(S)}$ denotes a transfer function from the road surface to the portion of the vehicle body arranged at the second center of the rear left and right road wheels to the road surface on which the vehicle is running, $G_{2(S)}$ denotes a transfer function from the road surface to the portion of the vehicle body arranged at the second center of the rear left and right road wheels, and $G_{3(S)}$ denotes $e^{-s(WB/Sv)}$, wherein e denotes an exponent, s denotes a Laplace operator, and WB denotes a wheel base length.

18. An apparatus for an automotive vehicle as claimed in claim 14, wherein said control unit generates and outputs the control signal to the corresponding one of the actuators when the direction of the sprung mass vertical velocity indicates upward with respect to a road surface on which the vehicle is running as follows:

$$P_T = \alpha \cdot \Delta x \cdot K \cdot \delta,$$

wherein $\alpha$ denotes a constant of an extension phase of the corresponding one of the shock absorbers, K denotes a gain set variably according to the determination of the relative velocity between the sprung mass and the unsprung mass, and $\delta$ denotes the control gain whose value is varied when determining that the change in the weight of load applied to the vehicle body occurs, and said control unit outputs the control signal to the corresponding one of the actuators when the direction of the sprung mass vertical velocity indicates downward with respect to the road surface on which the vehicle is running as follows:

$$P_T = \beta \cdot \Delta x \cdot K \cdot \delta,$$

wherein β denotes a constant of a compression phase of the corresponding one of the shock absorbers.

19. An apparatus for an automotive vehicle as claimed in claim 18, wherein said control unit derives a first sprung mass vertical acceleration signal ($G_{FS}$) at a first center portion of the vehicle body between the sprung mass vertical accelerations detected by the first and second vehicular vertical acceleration detecting devices respectively located at the front left and right road wheels and a second sprung mass vertical acceleration signal ($G_{RS}$) at a second center portion of the vehicle body between the sprung mass vertical accelerations detected by the third and fourth vehicular vertical acceleration detecting devices respectively located at the rear left and right road wheels, derives a first band pass filtered signal component ($GFS_{-H}$) from the first sprung mass vertical acceleration signal and a first low pass filtered signal component $GFS_{-L}$ indicating an amplitude between a plus peak value and a minus peak value of the first band pass filtered signal component, derives a second band pass filtered signal component ($GRS_{-H}$) from the second sprung mass vertical acceleration signal and a second low pass filtered signal component $GRS_{-L}$ indicating an amplitude between a plus peak value and a minus peak value of the second band pass filtered signal component, derives a first moving averaged signal component (Af) from the first low pass filtered signal component ($GFS_{-L}$) and derives a second moving averaged signal component (Ar) from the second low pass filtered signal component ($GRS_{-L}$), and derives the load mounted state determination signal ($R_M$) from a ratio (Af/Ar) between the first and second moving averaged signal components.

20. An apparatus for an automotive vehicle as claimed in claim 19, wherein said control unit changes the value of the control gain (δ) from its original value ($\delta_M$) to a larger value ($\delta_H$) when determining that the change in the weight of load applied to the vehicle body from its original value in which only a vehicle driver rides on the vehicle and to a full weight of load applied to the vehicle body in which the number of occupants becomes a rated passenger capacity.

21. An apparatus for an automotive vehicle as claimed in claim 19, wherein said control unit is provided with a pair of two cascade-connected second-order band pass filters (BPF1, BPF2) arranged for passing a frequency band of 3 Hz of the first and second vertical sprung mass acceleration signals to extract the first and second band pass filtered signal components ($GFS_{-H}$, $GRS_{-H}$).

22. An apparatus for an automotive vehicle as claimed in claim 21, wherein said control unit is provided with a pair of first-order low pass filters (LPFs) having a cutoff frequency of 0.5 Hz and arranged for taking moving averages of the first and second low pass filtered signal components ($GFS_{-L}$, $GRS_{-L}$) to extract the first and second moving averaged signal components (Af, Ar).

23. An apparatus for an automotive vehicle as claimed in claim 19, wherein said control unit is provided with a pair of two cascade-connected second-order band pass filters (BPF1 and BPF2) arranged for extracting the first and second band pass filtered signal components ($G_{FS-H}$, $G_{RS-H}$) from the first and second sprung mass vertical acceleration signals ($G_{FS}$, $G_{RS}$) at the first and second center portions, said first and second band pass filtered signal components ($G_{FS-H}$, $G_{RS-H}$) being dead point frequency components of the first and second sprung mass vertical acceleration signals, respectively.

24. An apparatus for an automotive vehicle as claimed in claim 23, wherein each of said dead point frequency components is expressed as follows: $\omega_n$ is $2\pi f_c$, wherein $f_c$ denotes a sprung mass resonance frequency.

25. An apparatus for an automotive vehicle as claimed in claim 24, wherein each of the pair pf the two-cascade connected band pass filters has a sharpness of Q=5 and has extracted frequency range from 1.2 Hz to 1.4 Hz.

26. An apparatus for an automotive vehicle as claimed in claim 24, wherein each of the pair of the two cascade-connected band pass filter has the sharpness of Q=5 and has extracted frequency range of about 3 Hz.

27. An apparatus for an automotive vehicle as claimed in claim 23, wherein each of the second-order band pass filters have a transfer function $F_{B(S)}$ expressed as follows:

$$F_B = (\omega/Q \cdot S)/(S^2 + \omega/Q \cdot S + \omega^2),$$

wherein $\omega = 2\pi f_c$, wherein S denotes a Laplace operator and $f_c$ denotes cutoff frequencies of the second-order band pass filters.

28. An apparatus for an automotive vehicle as claimed in claim 13, wherein said control unit determines a sprung mass vertical velocity (Δx) by passing the sprung mass vertical acceleration signal derived from the corresponding one of the sprung mass acceleration sensors through a band pass filter (BPF) having a first low pass filter and a first high pass filter, said first low pass and high pass filters having cutoff frequencies having cutoff frequencies whose values are varied when the control unit determines that the change in the weight of load applied to the vehicle body occurs.

29. An apparatus for an automotive vehicle as claimed in claim 28, wherein said first low and high pass filters have cutoff frequencies, both cutoff frequencies thereof respectively being 0.3 Hz and 4 Hz when determining that the weight of load applied to the vehicle body corresponds to a vehicle driver's weight of load applied to the vehicle body, and respectively being 0.2 Hz and 3 Hz when determining that the weight of load applied to the vehicle body is increased to a full weight of load applied to the vehicle body.

30. An apparatus for an automotive vehicle as claimed in claim 13, wherein said control unit derives a first sprung mass vertical acceleration signal ($G_F$) at a first center portion of the vehicle body between two of the sprung mass vertical acceleration sensors arranged at the front left and right road wheels from an average of the two sprung mass vertical acceleration signals generated by the two sprung mass vertical acceleration sensors arranged at the front left and right road wheels, derives a second sprung mass vertical acceleration signal component (Gr) to be transmitted from the first sprung mass vertical acceleration signal ($G_F$) to a second center portion of the vehicle body between the two of the sprung mass vertical acceleration sensors arranged at the front left and right road wheels as a function of a first transfer function ($G_{B(S)}$) between the first and second center portions, derives a third sprung mass vertical acceleration signal component (Gb) to be transmitted from the first sprung mass vertical acceleration signal component ($G_b$) to be transmitted from the first sprung mass vertical acceleration sensors as a function of a second transfer function between the first and second center portions as the sprung mass, adds the second and third sprung mass vertical acceleration signal components (Gr+Gb) together to derive a fourth sprung mass vertical acceleration signal component as a sprung mass vertical acceleration estimated value ($G_{R-s}$), derives a fifth sprung mass vertical sprung mass acceleration signal ($G_R$) from an average of two sprung mass vertical acceleration signals detected by two of the sprung mass vertical acceleration signals arranged at the rear left and right road wheels, derives first and second band pass filtered signal components ($G_{R1}$ and $G_{R\text{-}s1}$) from the fifth and fourth sprung mass vertical acceleration signals ($G_R$ and $G_{R\text{-}s}$), derives first and second high pass filtered signal components ($G_{R2}$ and $G_{R\text{-}s2}$) from the first and second band pass filtered signal components, derives first and second low pass filtered signal components ($P_{R1}$ and $P_{R\text{-}s1}$) indicating amplitudes between plus peak values and minus peak values of the first and second high pass filtered signal components (PR and $PR_s$) from the first and second low pass filtered signal components, and derives the load mounted state determination signal ($R_M$) from the first and second moving averaged signal components.

31. An apparatus for an automotive vehicle as claimed in claim 30, wherein said control unit sets a predetermined threshold value ($R_L$), determines whether a level of the load mounted state determination signal ($R_M$) exceeds the predetermined threshold value ($R_L$), and determines whether a time duration during which the load mounted state determination signal ($R_M$) exceeds the predetermined threshold value is continued for a predetermined period of time ($\Delta t$) to determine whether the weight of load applied to the vehicle body is changed to an increased direction.

32. An apparatus for an automotive vehicle as claimed in claim 31, wherein said load mounted state determination signal $R_M$ is expressed as follows:

$$R_M = PR_{\text{-}s}/P_R.$$

33. An apparatus for an automotive vehicle as claimed in claim 32, wherein said control unit determines each of sprung mass vertical velocity signals ($\Delta x$) according to the corresponding one of the sprung mass vertical acceleration signals generated by the corresponding one of the sprung mass vertical acceleration sensors and passed through a band pass filter having a high pass filter and a low pass filter, said high pass filter having a cutoff frequency ($f_H$) of 0.3 Hz when said control unit determines that only the vehicle driver rides on the vehicle and of 0.2 Hz ($f'_H$) when a full weight of load is applied to the vehicle body, and said low pass filter having a cutoff frequency of 4 Hz ($f_L$) when said control unit determines that only the vehicle driver rides on the vehicle and of 3 Hz when said control unit determines that the full weight of load is applied to the vehicle body.

34. An apparatus for an automotive vehicle as claimed in claim 32, wherein each of the sprung mass vertical velocity signals generated by the corresponding one of the sprung mass vertical acceleration signals is passed through a band pass filter having a high pass filter and a low pass filter, said high pass filter having a cutoff frequency ($f_H$) of 0.3 Hz when said control unit determines that only the vehicle driver rides on the vehicle and of $f'_H$ which is expressed as follows: $f'_H = \gamma \cdot f_H$, wherein $\gamma = m \sqrt{R_M}$ and m denotes a positive constant, and said low pass filter having a cutoff frequency $f_L$ of 4 Hz when said control unit determines that only the vehicle driver rides on the vehicle and of $f'_L$ which is expressed as $f'_L = \epsilon \cdot f_L$, wherein $\epsilon = n/\sqrt{R_M}$, wherein n denotes a positive constant.

35. An apparatus for an automotive vehicle as claimed in claim 1, wherein said control unit sets a predetermined threshold value ($R_{ML}$), measures a number of times the load mounted state determination signal has exceeded the predetermined threshold value ($R_{ML}$) within a predetermined load weight change determination period of time ($N_E$) and determines that the change in the weight of load applied to the vehicle body from the originally designed weight of load to a full weight of load applied to the vehicle body occurs when the measured number of times (Nt) has exceeded a predetermined number of times ($N_R$).

36. An apparatus for an automotive vehicle as claimed in claim 35, which further comprises a vehicle speed sensor arranged for detecting a vehicle speed, and wherein said control unit determines whether the change in the weight of load applied to the vehicle body occurs when the detected vehicle speed is above a predetermined vehicle speed, and inhibits the determination of the change in the weight of load applied to the vehicle body when the detected vehicle speed is below the predetermined vehicle speed.

37. An apparatus for an automotive vehicle as claimed in claim 36, which further comprises a door open or closure sensor arranged for detecting whether any door of the vehicle is opened, and wherein said control unit maintains the value of the control parameter after the change in the value of the control parameter has been carried out when determining that the change in the weight of load applied to the vehicle body occurs, restarts the determination of whether the change in the weight of load applied to the vehicle body occurs when the door open or closure sensor detects that any door is opened, and changes the value of the control parameter only when the determination result of the change in the weight of load applied to the vehicle body is different from a previous determination result of the change in the weight of load applied to the vehicle body.

38. An apparatus for a vehicular suspension system as claimed in claim 36, which further comprises an ignition switch arranged for detecting whether an ignition switch of the vehicle is turned off, and wherein said control unit maintains the value of the control parameter after the change in the value of the control parameter has been carried out when determining that the change in the weight of load applied to the vehicle body occurs when the ignition switch is turned off, and changes the value of the control parameter only when the determination result of the change in the weight of load applied to the vehicle body is different from a previous determination result of the change in the weight of load applied to the vehicle body.

39. A method for controlling a vehicular system comprising the steps of:

detecting a vertical status variable of a front road wheel side and a vertical status variable of a rear road wheel side;

generating and outputting a control signal to the vehicular system so as to control a variable of the vehicular system to achieve a target variable;

determining a load mounted state determination signal on the basis of the vertical status variables;

determining whether a change in a weight of load applied to a vehicle body between an originally designed weight of load applied to the vehicle body and a present weight of load applied to the vehicle body occurs on the basis of the load mounted state determination signal; and varying a control parameter determining the control signal when the change in the weight of load applied to the vehicle body occurs.

* * * * *